United States Patent
Pan

(10) Patent No.: US 9,175,631 B2
(45) Date of Patent: Nov. 3, 2015

(54) VEHICLE CONTROL SYSTEM

(71) Applicant: DENSO CORPORATION, Kariya, Aichi-pref. (JP)

(72) Inventor: Liangchen Pan, Chiryu (JP)

(73) Assignee: DENSO CORPORATION, Kariya (JP)

( * ) Notice: Subject to any disclaimer, the term of this patent is extended or adjusted under 35 U.S.C. 154(b) by 396 days.

(21) Appl. No.: 13/721,852

(22) Filed: Dec. 20, 2012

(65) Prior Publication Data

US 2013/0166181 A1 Jun. 27, 2013

(30) Foreign Application Priority Data

Dec. 21, 2011 (JP) ................................. 2011-280193
Jan. 16, 2012 (JP) ..................................... 2012-6446
Aug. 10, 2012 (JP) ................................. 2012-178543

(51) Int. Cl.
*F02D 45/00* (2006.01)
*B60H 1/32* (2006.01)
*B60W 30/188* (2012.01)
*F02D 41/14* (2006.01)

(52) U.S. Cl.
CPC ............. *F02D 45/00* (2013.01); *B60H 1/3208* (2013.01); *B60H 1/3211* (2013.01); *B60H 1/3216* (2013.01); *B60W 30/1886* (2013.01); *F02D 41/1406* (2013.01); *B60H 2001/3266* (2013.01); *F02D 2200/0625* (2013.01); *F02D 2250/24* (2013.01)

(58) Field of Classification Search
CPC .. B60H 1/3208; B60H 1/3211; B60H 1/3216; B60W 30/1886

USPC ..................... 701/36, 101, 102; 123/480, 486
See application file for complete search history.

(56) References Cited

U.S. PATENT DOCUMENTS

| | | | |
|---|---|---|---|
| 5,924,406 A | * 7/1999 | Kinugasa et al. | 123/436 |
| 2006/0276937 A1 | 12/2006 | Yamashita | |
| 2008/0011005 A1 | * 1/2008 | Obayashi et al. | 62/243 |
| 2008/0319595 A1 | * 12/2008 | Yamamoto et al. | 701/22 |

FOREIGN PATENT DOCUMENTS

| | | |
|---|---|---|
| EP | 2014491 | 1/2009 |
| JP | 2000-356149 | 12/2000 |
| JP | 2005-207321 | 8/2005 |

(Continued)

OTHER PUBLICATIONS

Office Action (2 pages) dated Apr. 1, 2014, issued in corresponding Japanese Application No. 2012-178543 and English translation (4 pages).

*Primary Examiner* — Mahmoud Gimie
(74) *Attorney, Agent, or Firm* — Nixon & Vanderhye PC

(57) ABSTRACT

A vehicle control system includes an engine control device, an auxiliary control device adapted to control an auxiliary driven by power of an engine, a device for estimating a plurality of drive patterns for controlling the auxiliary, a fuel consumption rate relating value calculation device, and a selection device. The fuel consumption rate relating value calculation device calculates fuel consumption rate relating values of the engine required to drive the auxiliary by the engine according to the respective estimated plurality of drive patterns by use of characteristic data of the engine. The selection device selects a single drive pattern for driving the auxiliary based on the estimated plurality of drive patterns by use of the calculated fuel consumption rate relating values.

12 Claims, 24 Drawing Sheets

(56) References Cited

FOREIGN PATENT DOCUMENTS

| JP | 2007-239528 | 9/2007 |
| JP | 2007-269255 | 10/2007 |
| JP | 2007-269256 | 10/2007 |
| JP | 2007-269257 | 10/2007 |
| JP | 2007-269528 | 10/2007 |
| JP | 2009-029344 | 2/2009 |
| JP | 2010-030497 | 2/2010 |
| JP | 2011-088621 | 5/2011 |
| JP | 2011088621 A * | 5/2011 |
| JPm | 2012-041830 | 3/2012 |

* cited by examiner

S52 → S53a: CALCULATE ESTIMATED FUEL CONSUMPTION/TORQUE WHEN ENGINE OUTPUTS REQUIRED TORQUE
ESTIMATED FUEL CONSUMPTION/TORQUE
= [(ENGINE ESTIMATED FUEL CONSUMPTION AT TIME OF OUTPUT OF REQUIRED TORQUE)
− (ESTIMATED FUEL CONSUMPTION WHEN REQUIRED TORQUE IS NOT OUTPUTTED)]
/REQUIRED TORQUE + Ac

→ S55

VEHICLE CONTROL SYSTEM

CROSS REFERENCE TO RELATED APPLICATION

This application is based on Japanese Patent Application No. 2011-280193 filed on Dec. 21, 2011, Japanese Patent Application No. 2012-6446 filed on Jan. 16, 2012, and Japanese Patent Application No. 2012-178543 filed on Aug. 10, 2012, the disclosures of which are incorporated herein by reference.

TECHNICAL FIELD

The present disclosure relates to a vehicle control system in which an auxiliary control device for controlling auxiliaries including a vehicular air conditioner, a generator, and the like and an engine control device optimize a fuel consumption consumed at the time of driving the auxiliaries.

BACKGROUND

A vehicle control system described in patent document 1 (JP-A-2009-029344) has been known. The patent document 1 discloses the vehicle control system that increases a period of time in which the engine is in the state of coast lock up and fuel cut at the time of deceleration to thereby improve a fuel consumption rate and that stops the operation of a vehicular air conditioner at the time of acceleration.

A vehicle control system described in patent document 2 (JP-A-2009-012721) has been known. The patent document 2 discloses the vehicle control system that controls the activating and stopping of a compressor on the basis of the amount of cold energy stored in a cold energy storage unit and a fuel consumption necessary for generating a unit amount of cold energy (cold energy generation rate).

Next, a patent document 3 (JP-A-2010-030497) discloses a brake control device for inhibiting an increase in a braking distance and the discomfort of an occupant, the increase in a braking distance being caused by "torque lost by the deceleration of a compressor" which is developed when the compressor stops supplying refrigerant while a clod energy is stored in a cold energy storage unit of an air conditioner during the deceleration of a vehicle.

When the cold energy cannot be further stored while the cold energy is stored in the cold energy storage unit and hence the operation of the compressor is stopped, this brake control device transmits a signal to a transmission control device from an air conditioning control device to increase a speed reducing ratio of a continuously variable transmission, thereby compensating a shortage of a final deceleration torque caused by the "torque lost by the deceleration of the compressor".

Further, a patent document 4 (JP-A-2005-207321) discloses a control device of an internal combustion engine capable of efficiently utilizing cold energy stored in a cold energy storage unit. The control device of the internal combustion engine is a device for cooperatively controlling the internal combustion engine mounted in a vehicle and a vehicular air conditioner.

The control device of an internal combustion engine disclosed in the patent document 4 includes: a cold energy storage unit for storing at least a portion of cold energy generated by a vehicular air conditioner; a cold energy storage amount detection means for detecting an amount of cold energy (amount of absorption of heat) stored in the cold energy storage unit; an environment condition detection means for detecting a vehicle environment condition (vehicle compartment temperature, vehicle compartment humidity, outside temperature, amount of solar radiation, set temperature of air conditioner); a necessary-amount-of-cold-energy calculation means for calculating an amount of cold energy necessary for air conditioning on the basis of the detection result of the environment condition detection means; and a control means for controlling the operating state of the internal combustion engine on the basis of the amount of storage of cold energy and the necessary amount of cold energy.

In a patent document 5 (JP-A-2007-032387) is described a generator control device for calculating an increment of fuel consumption per unit electricity generated and an increment of fuel consumption of a target and for controlling an alternator (generator) on these increments.

The cold energy generation rate in the patent document 2 and the increment of fuel consumption per unit amount of electricity generated in the patent document 5 form unique targets for optimizing a fuel consumption for respective energies (cold energy or electricity) outputted by the compressor or the alternator.

For this reason, when the fuel consumption/torque of the compressor or the alternator, to which power is supplied from the engine, and performance (performance of acceleration or the like) other than the fuel consumption/torque is considered totally, their evaluation indexes are different from each other and hence it is not easy to evaluate an overall trade-off and to make an optimum evaluation. Further, as to this issue, the patent document 1, the patent document 3, and the patent document 4 do not disclose means for solving the issue.

The contents described in the patent documents listed as the conventional technologies can be hereby introduced and used by reference so as to describe technical elements disclosed in the detailed description.

Further, the control device disclosed in the patent document 2 does not perform a cooperative control with an auxiliary other than the compressor, for example, a generator. In other words, in the case where there are a plurality of auxiliaries, the patent document 2 does not disclose how the device performs a cooperative control between them. Hence, it is also desired to provide a method of easily realizing a cooperative control between a plurality of auxiliaries provided in a vehicle.

SUMMARY

The present disclosure addresses at least one of the above issues existing in these conventional technologies.

According to the present disclosure, there is provided a vehicle control system for a vehicle, including an engine control device adapted to control an engine, an auxiliary control device adapted to control an auxiliary driven by power of the engine, a means provided for at least one of the engine control device and the auxiliary control device, for estimating a plurality of drive patterns for controlling the auxiliary, a fuel consumption rate relating value calculation means, and a selection means. The fuel consumption rate relating value calculation means is provided for the engine control device, for calculating fuel consumption rate relating values of the engine required to drive the auxiliary by the engine according to the respective estimated plurality of drive patterns by use of characteristic data (ECD) of the engine. The selection means is provided for the engine control device, for selecting a single drive pattern for driving the auxiliary based on the estimated plurality of drive patterns by use of the calculated fuel consumption rate relating values.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Hereinafter, a plurality of embodiments will be described with reference to the drawings. In the respective embodiments, parts corresponding to matters described in a preceding embodiment are denoted by the same reference signs and their duplicate descriptions will be omitted in some cases. In the case where only a portion of a construction is described in the respective embodiments, the other embodiments described previous to the embodiments can be applied to the other portions of the construction.

In addition to the combination of parts, which is clearly described in each of the embodiments, even if a partial combination of the embodiments is not clearly described, the partial combination of the embodiments can be made if the partial combination functions well.

First Embodiment

Figure 1:
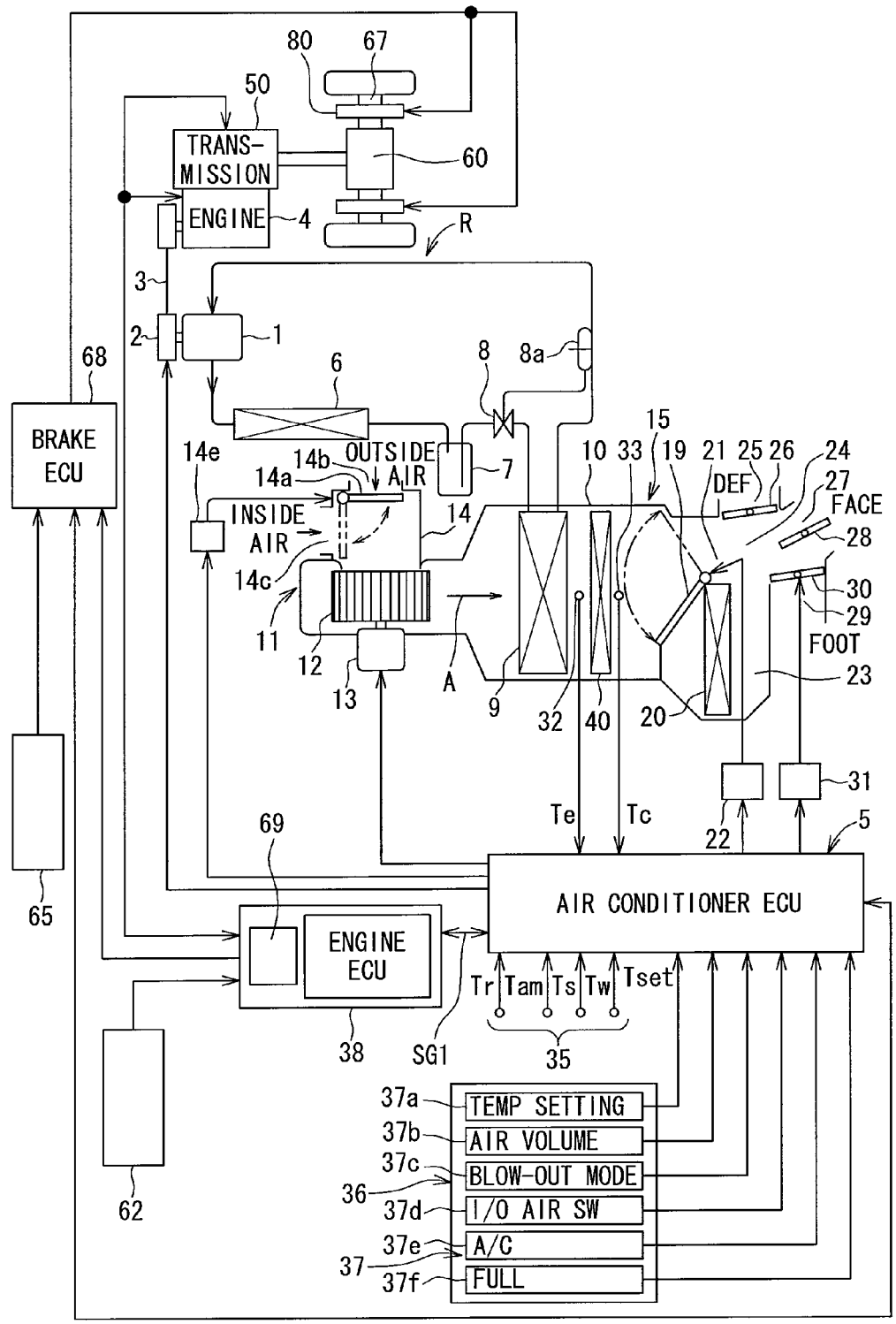
FIG. 1 is a general construction diagram of a vehicle control system including an air conditioner and a brake control device in a first embodiment.

Hereinafter, a first embodiment will be described in detail with reference to FIG. 1 to FIG. 8. FIG. 1 is a general construction diagram of a vehicle control system including an air conditioner and a brake control device of a vehicle in the first embodiment. In this embodiment, a vehicular air conditioner 15 is provided with a cold energy storage unit 40 and a refrigeration cycle R is operated by a compressor 1 of a variable displacement type. A continuously variable transmission is used as a transmission 50 of the vehicle.

(Construction of System)

First, the vehicular air conditioner 15 will be described. The refrigeration cycle R of the vehicular air conditioner 15 is provided with the compressor 1 for sucking, compressing, and discharging refrigerant. The compressor 1 is a compressor of a variable displacement type and has a refrigerant flow rate controlled continuously on the basis of a discharge volume control current from an air conditioning control device (also referred to as an "air conditioner ECU") 5 for controlling the vehicular air conditioner 15.

Here, the power of an engine 4 is transmitted to the compressor 1 via a pulley 2 and a belt 3. A superheated gas refrigerant discharged from the compressor 1 and having high temperature and high pressure flows into a condenser 6 and exchanges heat with outside air sent from a cooling fan (not shown), thereby being cooled and condensed. The refrigerant condensed in the condenser 6 flows into a liquid reservoir 7 and the gas and the liquid of the refrigerant is separated from each other in the liquid reservoir 7 and the excess refrigerant (liquid refrigerant) in the refrigeration cycle R is stored in the liquid reservoir 7.

The liquid refrigerant from the liquid reservoir 7 has its pressure reduced by an expansion valve 8, thereby being brought into a gas-liquid two-phase state of low pressure. The expansion valve 8 is a temperature type expansion valve having a temperature sensing part 8a for sensing the temperature of the refrigerant at an exit of an evaporator 9 forming a heat exchanger for cooling. The low-pressure refrigerant from the expansion valve 8 flows into the evaporator 9.

The evaporator 9 is set in an air conditioner case 10 of the vehicular air conditioner 15 and the low-pressure refrigerant flowing into the evaporator 9 absorbs heat from the air in the air-conditioner case 10, thereby being evaporated. The exit of the evaporator 9 is coupled to the suction side of the compressor 1. In this way, a closed circuit is constructed of constituent parts of the refrigeration cycle described above.

A blower 11 is disposed on the upstream side of the evaporator 9 in the air conditioner case 10. The blower 11 has a centrifugal blower fan 12 and a drive motor 13. An inside/outside air switching box 14 is disposed on the suction side of the blower fan 12 and an inside/outside air switching door 14a in the inside/outside air switching box 14 selectively opens or closes an outside air introduction port 14b and an inside air introduction port 14c.

In this way, the outside air (air outside a vehicle compartment) or the inside air (air inside the vehicle compartment) is selectively introduced into the inside/outside air switching box 14. The inside/outside air switching door 14a is driven by an electric drive device 14e made of a servomotor.

In the air conditioner case 10, the cold energy storage unit 40 which will be described later and an air mixing door 19 are disposed in sequence on the downstream side of the evaporator 9. On the downstream side of the air mixing door 19 is disposed a heating heat exchanger (hot-water type heater core) 20 for heating air by using the hot water (cooling water) of the engine 4 as a heat source.

A bypass passage 21 for bypassing the hot-water type heater core 20 and flowing air (cold air) is formed on the side (upper side) of the hot water type heater core 20. The air mixing door 19 is a turnable plate-shaped door and is driven by an electric drive device 22 made of a servomotor as shown by an arrow.

The air mixing door 19 is a door for regulating a ratio of the volume of hot air passing through the hot water type heater core 20 to the volume of cold air passing through the bypass passage 21 and regulates the temperature of air to be blown off into a vehicle compartment by regulating a ratio of the volume of hot air to the volume of cold air. Hence, in this embodiment, a means for regulating a temperature of air blown off into the vehicle compartment is constructed of the air mixing door 19.

A hot air passage 23 extending upward from below is formed on the downstream side of the hot water type heater core 20. The hot air from the hot air passage 23 is mixed with the cold air from the bypass passage 21 in an air mixing part 24, whereby air having a desired temperature is produced.

Further, a blowoff mode switching part is constructed on the downstream side of the air mixing part 24 in the air conditioner case 10. That is, a defroster opening part 25 is formed in a top face of the air conditioner case 10. The defroster opening part 25 blows off air to the inner surface of the front glass of the vehicle via a defroster duct (not shown). The defroster opening part 25 is opened or closed by a turnable plate-shaped defroster door 26.

Further, a face opening part 27 is formed in a portion closer to the rear side of the vehicle than the defroster opening 25 in the top face of the air conditioner case 10. The face opening part 27 blows off air to the upper half body of an occupant in the vehicle compartment via a face duct (not shown). The face opening part 27 is opened or closed by a turnable plate-shaped face door 28.

Further, a foot opening part 29 is formed in a portion below the face opening part 27 in the air conditioner case 10. The foot opening part 29 blows off air to the feet of the occupant in the vehicle compartment. The foot opening part 29 is opened or closed by a turnable plate-shaped foot door 30.

Further, a temperature sensor 32 of the evaporator 9 is disposed in a portion right behind an air blowoff port of the evaporator 9 in the air conditioner case 10 and detects an evaporator blowoff temperature Te. Still further, a temperature sensor 33 of the cold energy storage unit 40 is disposed in a portion right behind an air blowoff port of the cold energy storage unit 40 and detects a cold energy storage unit blowoff temperature Tc.

A detection signal (cold energy storage unit blowoff temperature Tc) of the temperature sensor 33 of the cold energy storage unit 40 is used for determining that the storage of cold energy is completed and for controlling the opening of the air mixing door 19. The opening of the air mixing door 19 is corrected by the value of the cold energy storage unit blowoff temperature Tc.

The air conditioning control device (also referred to as an "air conditioner ECU") 5 has detection signals inputted thereto not only from the temperature sensor 32 of the evaporator 9 and the temperature sensor 33 of the cold energy storage unit 40 but also from a group of publicly known sensors 35 for detecting an inside air temperature Tr, an outside air temperature Tam, an amount of solar radiation Ts, a hot water temperature Tw, and the like for controlling the air conditioning. Further, an air conditioning control panel 36 disposed near an instrument panel in the vehicle compartment is provided with a group of operation switches 37 operated by the occupant and also the operation signals of the group of operation switches 37 are inputted to the air conditioning control device 5.

The group of operation switches 37 includes: an air conditioning temperature setting switch 37a for producing a temperature setting signal Tset; an air volume switch 37b for producing an air volume switching signal; a blowoff mode switch 37c for producing a blowoff mode signal; an inside/outside air selector switch 37d for producing an inside/outside air selecting signal; and an air conditioning switch 37e for producing an on/off signal of the compressor 1.

Here, when a full air conditioning switch 37f is turned on, the air conditioning control device 5 outputs the "ON" signal of the compressor 1 and always outputs a drive request signal of the engine 4 to thereby continue the driving state of the engine 4 even when the vehicle is stopped. In contrast to this, when the air conditioning switch 37e is turned on, the air conditioning control device 5 outputs only the "ON" signal of the compressor 1 and does not output the drive request signal of the engine 4.

Further, the air conditioning control device 5 is connected to an engine control device (also referred to as "an engine ECU") 38, and the air conditioning control device 5 has SG1 inputted thereto from the engine control device 38, the SG1 including a rotation speed signal of the vehicle engine 4, a vehicle speed signal, a signal of the amount of depression of an accelerator pedal, and the like.

The engine control device 38, as is publicly known, controls the amount of fuel injected into the engine 4, an ignition timing, and the like in a comprehensive manner on the basis of signals from a group of sensors (not shown) for detecting the driving conditions of the engine 4 and controls also the transmission 50. Further, in an economy running vehicle and a hybrid vehicle, in the case where the full air conditioning switch 37f is not turned on, when the engine control device 38 determines that the vehicle is in the state of a halt on the basis of the rotation speed signal of the engine 4, the vehicle speed signal, and a brake signal, the engine control device 38 intercepts power to the ignition units and stops injecting fuel, thereby automatically stopping the engine 4.

Further, when a driver performs a starting operation such as depressing an accelerator pedal after the engine 4 is stopped, the engine control device 38 determines the state of the starting operation of the vehicle on the basis of an accelerator signal from an accelerator pedal sensor 62, thereby automatically starting the engine 4. Here, when the full air conditioning switch 37f is turned on, the air conditioning control device 5 outputs a signal of a request of restarting the engine on the basis of an increase in the cold energy storage unit blowoff temperature Tc after the halt of the vehicle engine 4. Further, each of the air conditioning control device 5 and the engine control device 38 is constructed of a publicly known microcomputer made of a CPU, a ROM, and a RAM and a peripheral circuit of the microcomputer.

Next, in FIG. 1, the engine 4 transmits power to an axle 67 via the continuously variable transmission 50 and a differential gear unit 60. The continuously variable transmission 50 changes a speed reducing ratio (transmission gear ratio) by a signal from the engine control device 38. An accelerator pedal (not shown) depressed by the occupant when the occupant accelerates the vehicle is provided with an accelerator pedal sensor 62. The signal of the accelerator pedal sensor 62 is inputted to the engine control device 38.

Further, a brake pedal (not shown) depressed by the occupant when the occupant decelerates the vehicle is provided with a brake pedal sensor 65 and the signal of the brake pedal sensor 65 is inputted to a brake ECU 68. The brake ECU 68 controls a hydraulic pressure to thereby activate a brake 80 near the axle 67. Next, the continuously variable transmission 50 that transmits the power of the engine 4 to the axle 67 of the vehicle by changing speed is controlled by a transmission control part 69 constructed of a microprocessor and the like in the engine control device 38. The output of the transmission 50 is transmitted to the axle 67 through a differential gear in the differential gear unit 60.

Figure 2:
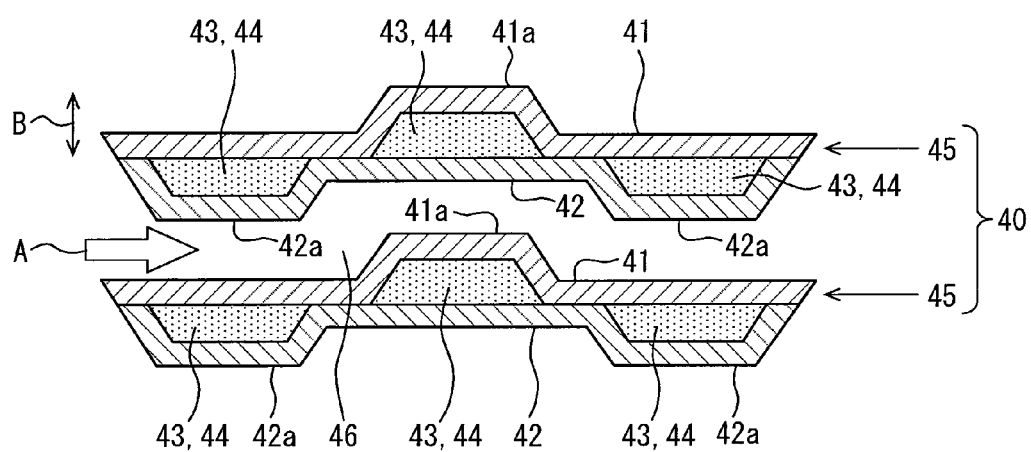
FIG. 2 is a partial section view to show a structure of a cold energy storage unit used for the first embodiment.

FIG. 2 is a partial section view to show the structure of the cold energy storage unit 40 used in the first embodiment. In FIG. 2, a specific construction of the cold energy storage unit 40 will be described. The cold energy storage unit 40, as shown in FIG. 1, is constructed of a heat exchanger which has a shape of the same front area as the evaporator 9 and through which the total amount of cold air passing through the evaporator 9 (total amount of air in the air conditioner case 10) passes. In this way, the cold energy storage unit 40 can be formed in a thin structure having a thin thickness with respect to an air flow direction A in the air conditioner case 10.

FIG. 2 illustrates a specific heat exchanger construction of the cold energy storage unit 40. Two heat transfer plates 41, 42 have projected parts 41a, 42a formed thereon respectively alternately along the air (cold air) flow direction A. The faces (plane faces) of the heat transfer plates 41, 42, on which the projected parts 41a, 42a are not formed, are made to abut on and joined to the faces of the opposite heat transfer plates 41, 42 by brazing or the like. In this way, a tube 45 having a closed space 43 is formed inside the projected parts 41a, 42a and a cold energy storing agent 44 is received in the closed space 43.

Further, only two sets of tubes 45 are shown in FIG. 2, but actually, the cold energy storage unit 40 has the same front area as the evaporator 9, so that many sets of tubes 45 are stacked in a direction shown by an arrow B (in a direction perpendicular to the air flow direction A) in FIG. 2.

On the upper/lower end portions of each tube 45 of the many sets of tubes 45 are formed abutting parts abutting on other tube 45 opposite thereto, whereby an air passage 46 having a given gap is formed between the tubes 45. The heat transfer plates 41, 42 of each of the tubes 45 and the abutting parts of each of the tubes 45 are integrally joined (brazed) to each other, whereby the whole of the cold energy storage unit 40 is integrated as a heat exchanger structure.

Next, in the above construction, the operation of the vehicular air conditioner 15 of the first embodiment will be described. In FIG. 1, when the compressor 1 is driven by the engine 4, the refrigeration cycle R is operated and the gas-liquid two-phase refrigerant, which has pressure reduced by the expansion valve 8 and is hence brought into the state of low temperature and low pressure, flows into the evaporator 9. In the evaporator 9, the refrigerant having low pressure absorbs heat from air sent from the blower 11, thereby being evaporated. In this way, the air sent from the blower 11 is cooled and dehumidified, thereby being brought into cold air.

The cold air passing through the evaporator 9 passes through the air passages 46 formed between the many sets of tubes 45 of the cold energy storage unit 40 and having the given gap. In the air passage 46, the cold air flow is disturbed by a snaked shape of the air passage 46 and hence a heat transfer coefficient on the air side is improved. Thus, while the cold air passes through the air passages 46, the cold energy storing agent 44 is effectively cooled via the heat transfer plates 41a, 42a.

In the vehicular air conditioner 15, firstly, the air sent from the blower 11 is cooled and dehumidified by the evaporator 9, and then the cold air is mixed with hot air by regulating the opening of the air mixing door 19, whereby a blowoff temperature into the vehicle compartment is controlled to a target blowoff temperature TAO. In this case, for example, even if TAO is a comparatively high temperature as 12° C., in order to complete the storage of cold energy by the cold energy storing agent 44 in a short period of time, a target evaporator temperature TEO needs to be set at as a low temperature as possible.

(Control of Air Conditioning Control Device)

Next, the specific control of the air conditioning control device 5 according to the first embodiment will be described. When an air conditioning switch 37e of the group of operation switches 37 of the air conditioning control panel 36 shown in FIG. 1 is turned on in the state where an ignition switch of the engine 4 is turned on to supply electric power to the air conditioning control device 5, the control is started. First, flags and timers are initialized, and then the air conditioning control device 5 reads detection signals from the group of sensors, operation signals of the group of operation switches, and vehicle driving signals (an amount of depression of the accelerator pedal) from the engine control device 38.

Next, the target blowoff temperature TAO of the air-conditioned air blown off into the vehicle compartment is calculated. The target blowoff temperature TAO is a blowoff temperature necessary for keeping the interior of the vehicle compartment at the set temperature Tset of the temperature setting switch even if the air conditioning heat load conditions of the vehicle are changed and is calculated on the basis of the following mathematical formula 1, $$TAO = Kset \times Tset - Kr \times Tr - Kam \times Tam - Ks \times Ts + C \quad \text{(Mathematical formula 1)}$$

where Tr: inside air temperature detected by an inside air temperature sensor, Tam: outside air temperature detected by an outside air temperature sensor, Ts: amount of solar radiation detected by a solar radiation sensor, Kset, Kr, Kam, Ks: control gain, and C: constant for correction. Here, the target blowoff temperature TAO, as is publicly known, is used for the control of switching the respective blowoff port doors and for the control of opening of the air mixing door 19.

(Block Construction of System)

Figure 3:
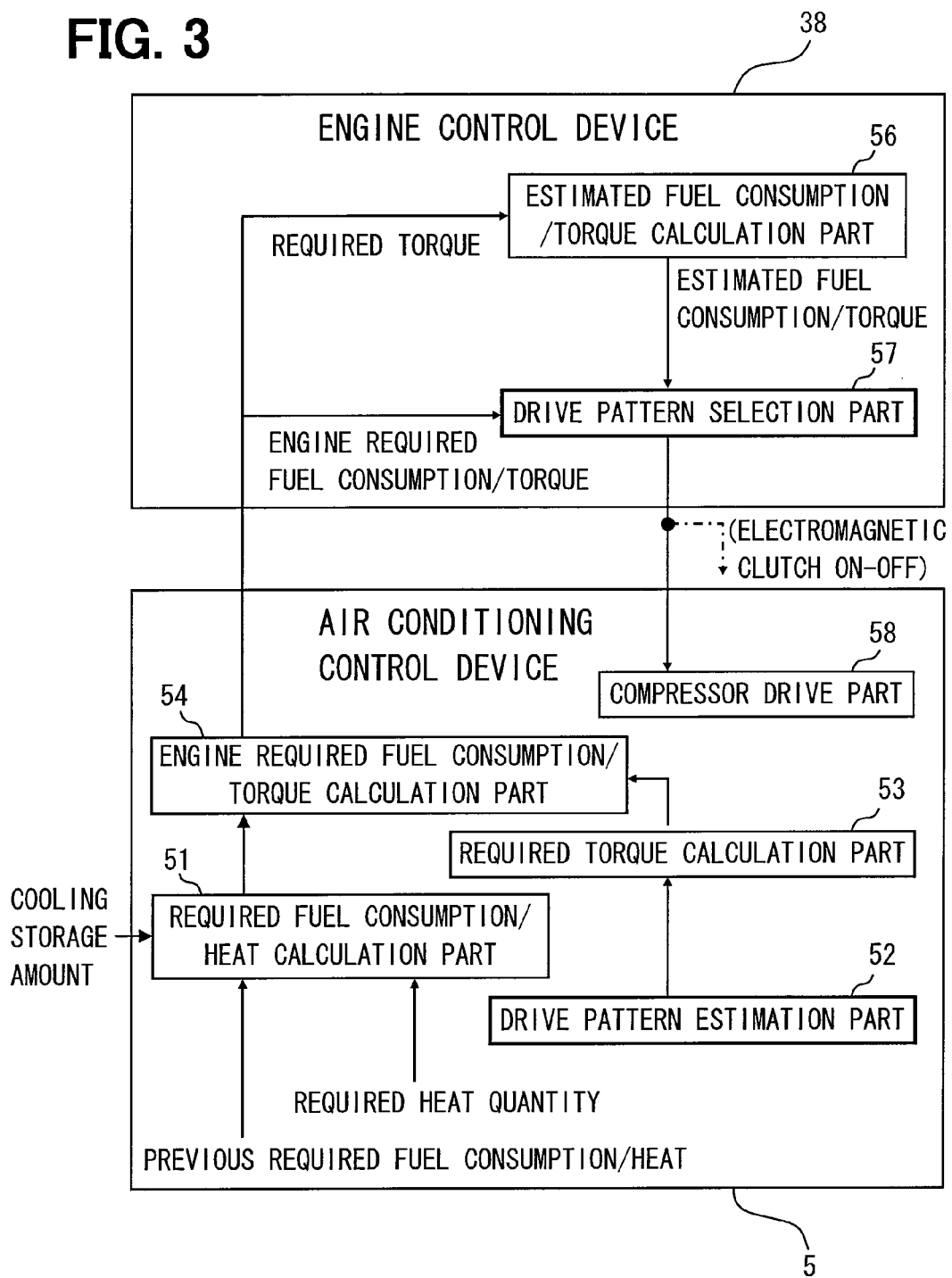
FIG. 3 is a block diagram to show a system construction of the first embodiment.
Figure 4:
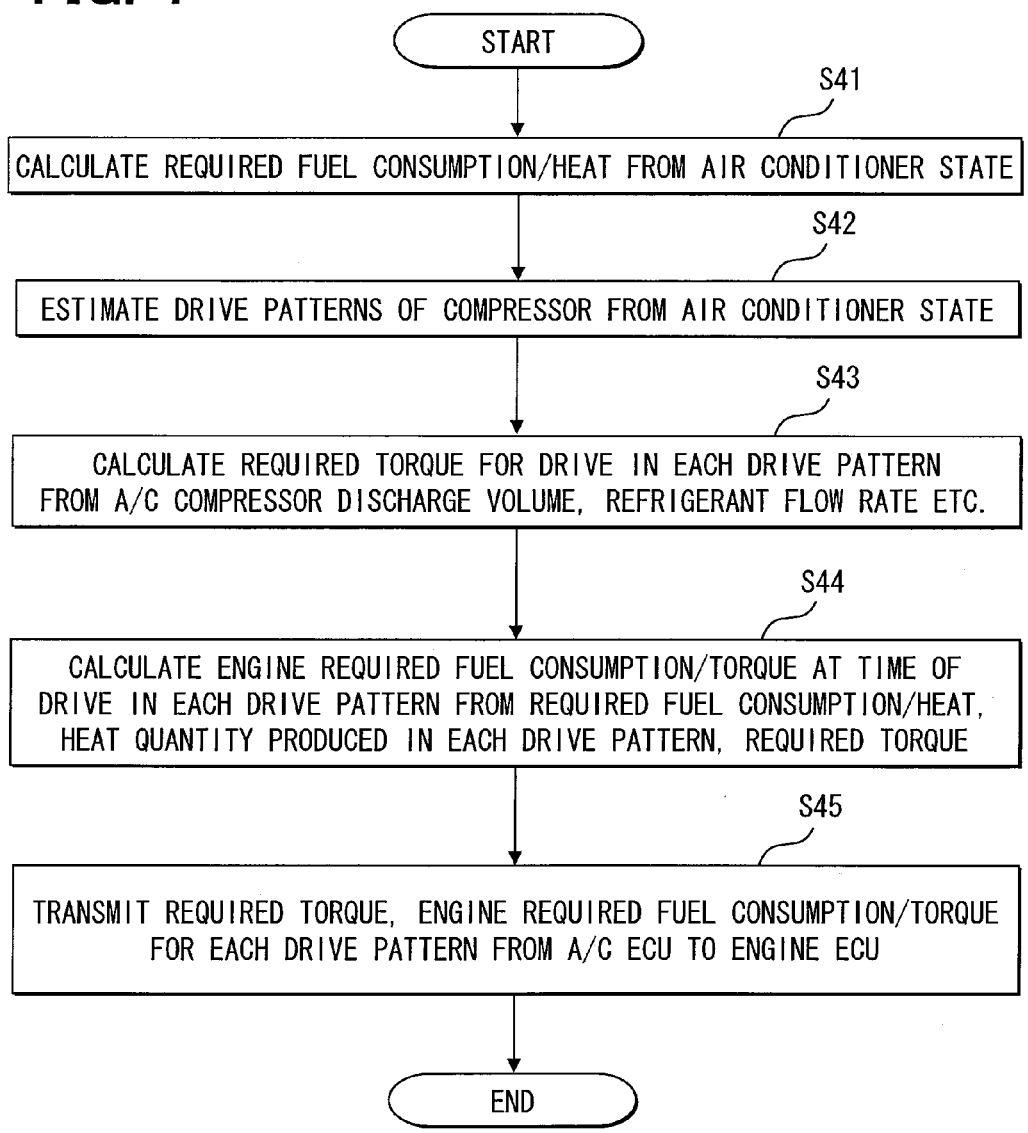
FIG. 4 is a flow chart to show a flow of control on an air conditioning control device side in the first embodiment.
Figure 5:
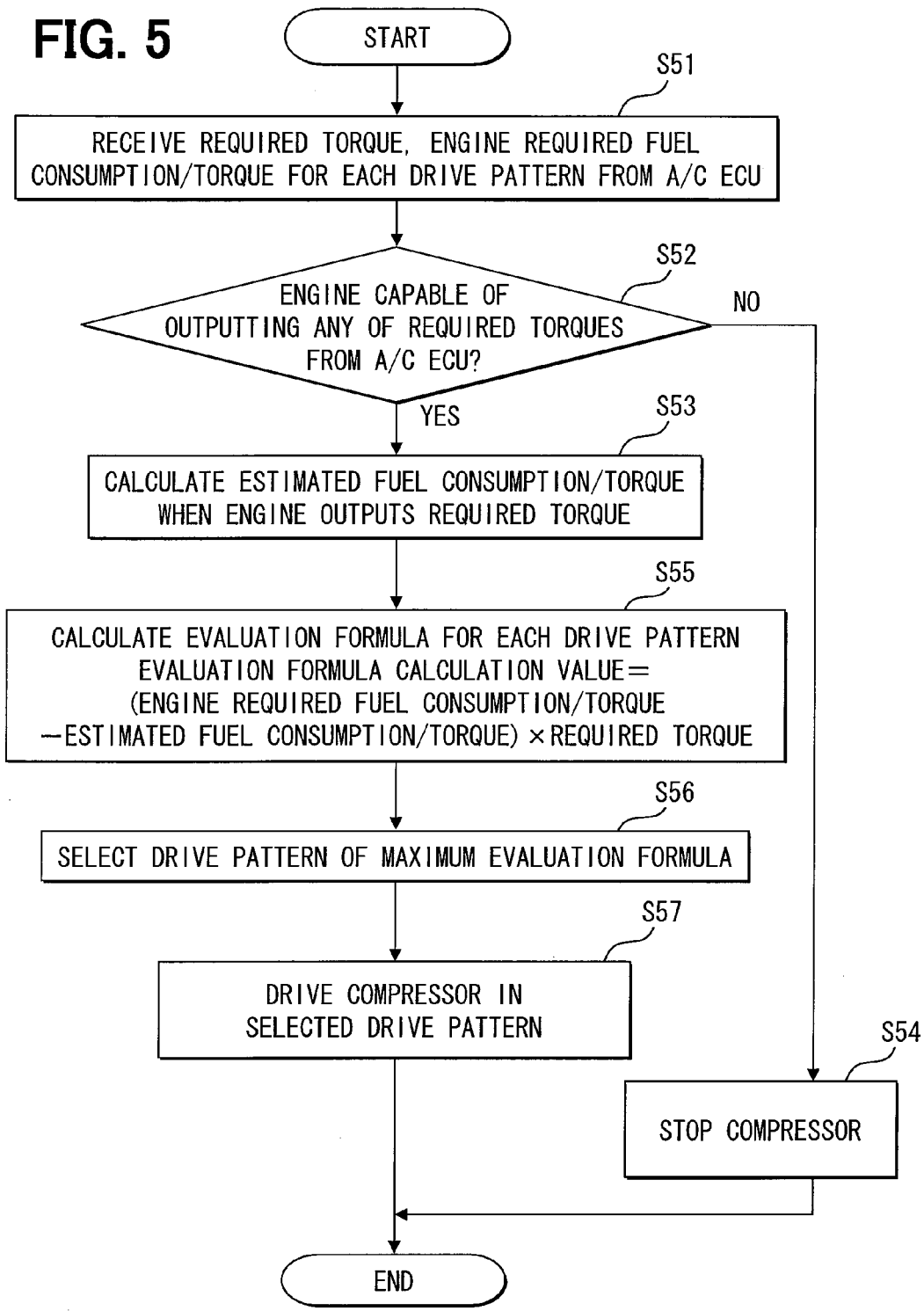
FIG. 5 is a flow chart to show a flow of control on an engine control device side in the first embodiment.

FIG. 3 is a block diagram to show a system construction of the first embodiment. FIG. 4 is a flow chart to show a control flow on an air conditioning control device side in the first embodiment. FIG. 5 is a flow chart to show a control flow on an engine control device side in the first embodiment.

Figure 6:
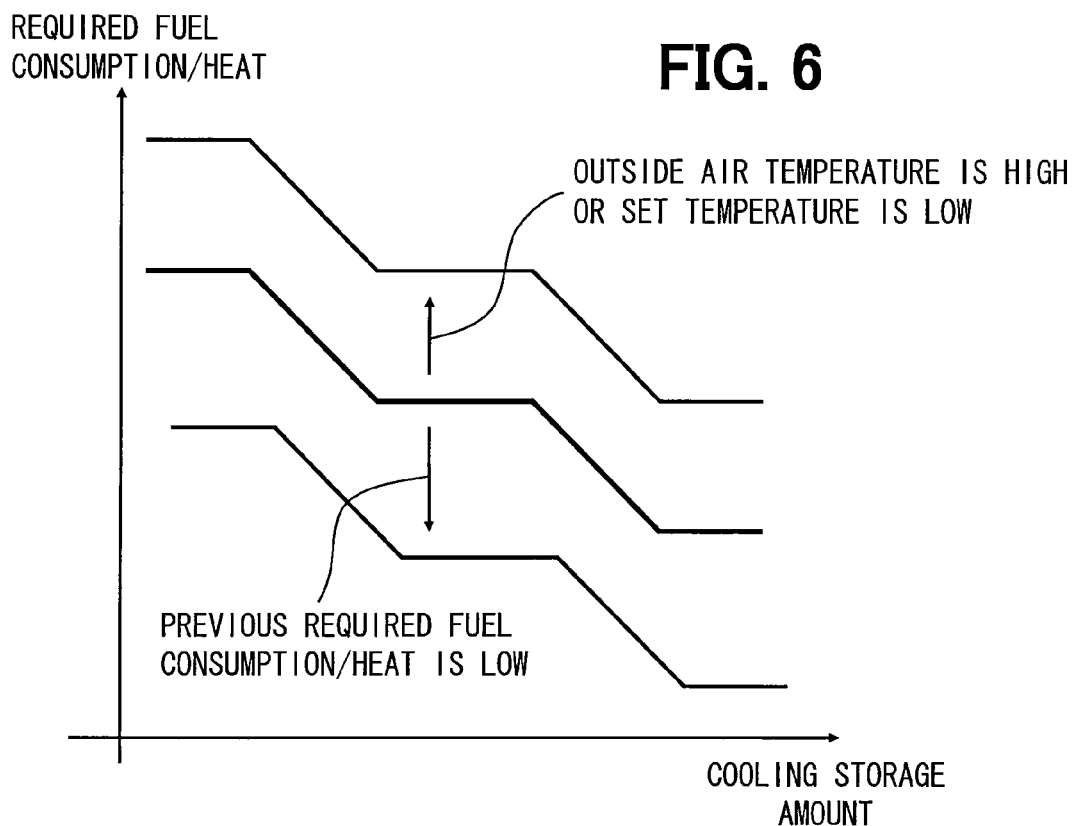
FIG. 6 is a characteristic map used for calculating a required fuel consumption/heat in the first embodiment.
Figure 7:
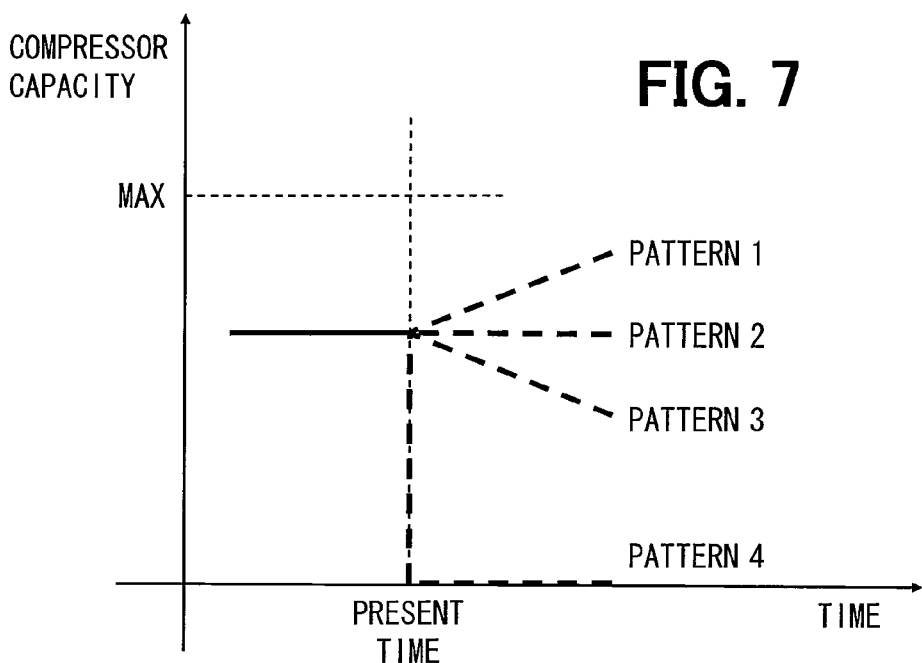
FIG. 7 is a characteristic map to show an example of estimating a drive pattern in the first embodiment.
Figure 8:
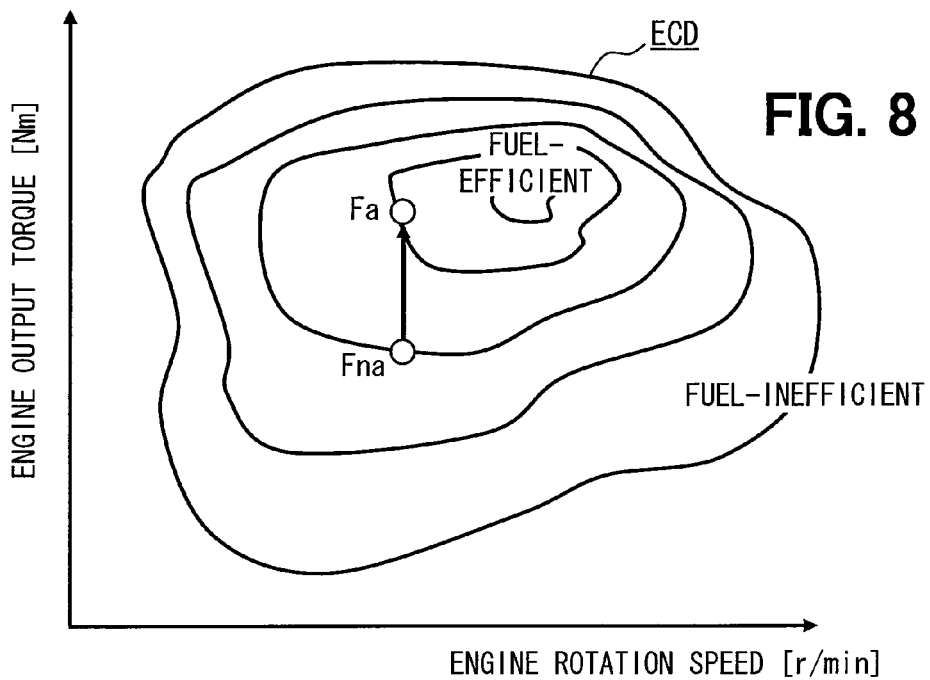
FIG. 8 is a characteristic map to show an example of an equi-fuel consumption/torque curve of the engine used in the first embodiment.

Further, FIG. 6 is a characteristic map for calculating a required fuel consumption/heat in the first embodiment. FIG. 7 is a characteristic map to show an example of estimating a drive pattern. FIG. 8 is a characteristic map to show an example of an equi-fuel consumption/torque curve forming the characteristic data (ECD) of the engine used for the first embodiment.

First, the outline of the control will be described on the basis of FIG. 3. The air conditioning control device 5 calculates a required fuel consumption/heat on the basis of a map shown in FIG. 6 in a required fuel consumption/heat calculation part 51. In this regard, the dimension or unit of the required fuel consumption/heat relates to, for example, litter L/heat quantity Q, so that in order to easily distinguish the required fuel consumption/heat from an engine required fuel consumption/torque (L/τ), which will be described later, the required fuel consumption/heat is also referred to as a required fuel consumption/heat (L/Q). However, this does not limit the unit or dimension of the required fuel consumption/heat.

As shown in FIG. 6, the required fuel consumption/heat (L/Q) tends to decrease mainly along with an increase in the amount of storage of cold energy of the cold energy storage unit. Further, the required fuel consumption/heat (L/Q) is corrected according to the required fuel consumption/heat (L/Q) in the past and a heat quantity according to the outside air temperature, the set temperature, and a temperature in the vehicle compartment at that time. For example, as the outside air temperature is higher or the set temperature is lower, the required heat quantity is determined to be larger and hence the required fuel consumption/heat (L/Q) is corrected to a higher value.

Next, a drive pattern estimation part 52 of the air conditioning control device 5 estimates a plurality of drive patterns capable of driving the compressor 1 on the basis of the state of the vehicular air conditioner 15 (set temperature Tset, outside air temperature Tam, compressor discharge volume, and gas flow rate). In this case, the estimation of the drive pattern is determined from information at the present time. Here, the drive pattern can be estimated also from the information of predicting a traveling state in the future but a prediction control is not performed in the first embodiment.

Next, in the air conditioning control device 5, a required torque calculation part 53 calculates a required torque that is the torque of the compressor 1 required for driving the compressor 1 in each of the plurality of drive patterns estimated by the drive pattern estimation part 52. The calculation of the required torque can be made by various methods and can be calculated, for example, as a function of a discharge volume, a refrigerant flow rate, a refrigerant pressure, a fin temperature of an evaporator, and an engine rotation speed.

Next, the engine required fuel consumption/torque (L/τ) of each drive pattern is calculated by an engine required fuel consumption/torque calculation part 54 on the basis of the required torque and the required fuel consumption/heat (L/Q) that is an output from a required fuel consumption/heat calculation part 51. Then, the required torque and the engine required fuel consumption/torque (L/τ) of each drive pattern are transmitted to the engine control device 38.

The unit or dimension of the engine required fuel consumption/torque relates to litter/torque (simply described as L/τ). Hence, in order to distinguish the engine required fuel consumption/torque from the required fuel consumption/heat (L/Q), the engine required fuel consumption/torque is also referred to as the engine required fuel consumption/torque (L/τ). However, this does not limit the unit or dimension of the engine required fuel consumption/torque (L/τ). Further, the engine required fuel consumption/torque (L/τ) can also be referred to as a required torque production efficiency. Still further, the required torque is also described as a required torque τ. In this regard, a heat quantity which will be described later is described as a heat quantity Q.

These engine required fuel consumption/torque (L/τ) and the required torque τ are of the same information type as various control requests in the engine control device 38 such as engine power saving by cutting the power of the compressor and are of an information type in which the request of the vehicular air conditioner 15 can be easily understood in view of the engine side.

Next, the engine control device 38 receives the required torque (τ) for driving the compressor 1 and the engine required fuel consumption/torque (L/τ) from the air conditioning control device 5. When the engine 4 is in the state where the engine 4 can accept the required torque (τ) for driving the compressor 1 (the engine 4 is not in the state of an abrupt acceleration or the like), the engine control device 38 calculates an estimated fuel consumption/torque that is an estimated fuel consumption/torque necessary for outputting the required torque (τ) for driving the compressor 1 by an estimated fuel consumption/torque calculation part 56.

This estimated fuel consumption/torque is calculated on the basis of an estimated fuel consumption, which is estimated to be consumed by the engine 4 when the engine control device 38 accepts the required torque (τ) from the air conditioning control device 5 and drives the engine 4, an estimated fuel consumption, which is estimated to be consumed by the engine 4 when the engine control device 38 does not accept the required torque (τ) from the air conditioning control device 5 and drives the engine 4, and the required torque from the air conditioning control device 5. The estimated fuel consumption/torque expresses "a fuel consumption additionally consumed by the engine 4 at the time of accepting the required torque" per unit required torque.

Next, an evaluation formula is calculated by a drive pattern selection part 57 on the basis of the estimated fuel consumption/torque and the engine required fuel consumption/torque (L/τ) from the air conditioning control device 5. The evaluation formula is a formula of multiplying a value acquired by subtracting the estimated fuel consumption/torque from the engine required fuel consumption/torque (L/τ) by the required torque.

The evaluation formula is a value acquired by subtracting the fuel consumption required by the engine 4 in each drive pattern, which is estimated to be additionally consumed by the engine 4 at the time of accepting the required torque, from the fuel consumption required by the compressor 1 in each drive pattern, which is estimated by the use of information in the vehicular air conditioner 15. The evaluation formula shows that the larger the value of the evaluation formula is, the more efficiently the engine 4 can drive the compressor 1. Hence, a drive pattern in which an evaluation formula calculation value is the largest value is selected as an optimum drive pattern.

In this regard, that the evaluation formula calculation value becomes minus shows the state in which the fuel consumption estimated to be additionally consumed by the engine 4 when the compressor 1 is driven as required is larger than the fuel consumption required by the compressor 1, which is estimated by the vehicular air conditioner 15 side. When the compressor 1 is controlled in a drive pattern of this state, the compressor 1 is driven as required when the engine efficiency is not high. Hence, in the case where the evaluation formula calculation value becomes minus, the compressor 1 is stopped until the next calculation period.

After the optimum drive pattern is selected, the drive pattern selection part 57 transmits information to a compressor drive part 58 via CAN communication or the like to thereby control a discharge volume in the compressor 1 of a variable displacement type (or, as a modified example, to thereby perform an ON/OFF control of a clutch for coupling the engine 4 to the compressor 1 directly or via the compressor drive part 58).

Next, the flow of control will be described in more detail by the use of the flow charts shown in FIG. 4 and FIG. 5. In step S41 shown in FIG. 4, the air conditioning control device 5 calculates a required fuel consumption/heat (L/Q) from an air conditioning state. FIG. 6 is a characteristic map for calculating a required fuel consumption/heat (L/Q). As shown in FIG. 6, basically, the more the amount of storage of cold energy of the cold energy storage unit 40 is, the lower the required fuel consumption/heat (L/Q) is set. When a required heat quantity becomes large (when the target blowoff temperature TAO is low, the outside air temperature is high, or the set temperature is low), the air conditioning control device 5 corrects the required fuel consumption/heat (L/Q) in such a way that the required fuel consumption/heat (L/Q) becomes high.

Further, when a fuel consumption/heat for storing cold energy in the cold energy storage unit 40 is low in the past, that is, a required fuel consumption/heat in the past is low, the air conditioning control device 5 corrects the calculated required fuel consumption/heat (L/Q) in such a way that the calculated required fuel consumption/heat (L/Q) becomes low. In this way, basically, the more the amount of storage of cold energy of the cold energy storage unit 40 becomes, the lower the required fuel consumption/heat (L/Q) is set.

Next, in step S42 shown in FIG. 4, a plurality of drive patterns of the compressor 1 are estimated from the air conditioning state. In this estimation, the plurality of drive patterns capable of driving the compressor 1 are determined on the basis of the state of the vehicular air conditioner 15 (set temperature Tset of the air conditioner, outside air temperature Tam of air temperature outside the vehicle, discharge volume of the compressor 1, flow rate of refrigerant (gas) in the refrigeration cycle, pressure of the refrigerant, temperature of fins of the evaporator 9 in the refrigeration cycle, engine rotation speed or compressor rotation speed).

In this case, the estimation of the plurality of drive patterns is made from information at the present time. Although the estimation of the plurality of drive patterns can be made also from the information of predicting a traveling state in the future but a prediction control is not performed in the first embodiment.

FIG. 7 shows estimated drive patterns. It is only necessary that at least a pattern 1 of increasing the discharge volume of the compressor 1 and a pattern 3 of decreasing the discharge volume of the compressor 1 are estimated. When the state of the vehicular air conditioner 15 is checked, it can be easily estimated at how much inclined angle of the pattern the discharge volume of the compressor 1 is to be increased or decreased. For example, when the occupant gets in the vehicle in summer and cools down the interior of the vehicle compartment, a rapid increase in the discharge volume of the compressor 1 is required and hence the inclined angle of the estimated pattern 1 becomes steep when going from left to right.

Here, in FIG. 7, a drive pattern within a given period of time in the future is estimated on the basis of the information at the present time. A pattern 1 is a pattern of increasing the discharge volume of the compressor 1 to the maximum, a pattern 2 is a pattern of keeping the present discharge volume of the compressor 1, a pattern 3 is a pattern of decreasing the discharge volume of the compressor 1 to the minimum, and a pattern 4 is a pattern of setting the discharge volume of the compressor 1 at 0 (OFF). The maximum value and the minimum value of the pattern 1 and the pattern 3 (that is, the inclined angles of the patterns) may be not fixed values or may be changed according to the traveling pattern, the engine rotation speed, or the output torque.

Next, in step S43, the air conditioning control device 5 calculates a required torque that is the torque of the compressor 1 necessary for driving the compressor 1 in each of the plurality of estimated drive patterns. The required torque can be calculated by various methods and, for example, can be calculated as a function of discharge volume, refrigerant flow rate, refrigerant pressure, fin temperature of the evaporator, and engine rotation speed (or compressor rotation speed) as shown by the following mathematical formula 2.

$$\text{Required torque} = f(\text{discharge volume, refrigerant flow rate, refrigerant pressure, fin temperature of the evaporator, and engine rotation speed}) \quad \text{(Mathematical formula 2)}$$

Next, in step S44, the air conditioning control device 5 calculates the engine required fuel consumption/torque (L/τ) when the compressor 1 is driven in each drive pattern from the required fuel consumption/heat (L/Q), the heat quantity (Q) generated in each drive pattern, and the required torque (τ) by the use of the following mathematical formula 3. In this case, of course, the characteristic data of the compressor 1 of an auxiliary is taken into account.

$$\text{Engine required fuel consumption/torque} = \text{required fuel consumption/heat} \times (\text{heat quantity generated in drive pattern})/\text{required torque} \quad \text{(Mathematical formula 3)}$$

This calculation is performed in each drive pattern, and (the heat quantity generated in the drive pattern) means a heat quantity (quantity of cold energy) generated in the refrigeration cycle of the vehicular air conditioner 15 when the compressor 1 is driven in the drive pattern for which the calculation is performed.

In step 45, the required torque (τ) in each drive pattern and the engine required fuel consumption/torque (L/τ) are transmitted to the engine control device 38. The required torque (τ) and the engine required fuel consumption/torque (L/τ) are of an information type in which the request of the vehicular air conditioner 15 can be easily understood in view of the engine 4 side (including the engine control device 38 side) and are of an information type in which it is easily determined whether or not the engine 4 can respond to the request in the light of its circumstances of the moment.

Next, the flow of control in the engine control device 38 will be described with reference to FIG. 5. In step S51 shown in FIG. 5, the engine control device 38 receives the required torque (τ) that is torque necessary for driving the compressor 1 and the engine fuel consumption/torque (L/τ) that is a fuel consumption per unit torque necessary for generating the torque in each drive pattern from the air conditioning control device 5.

Next, in step S52, the engine control device 38 determines whether or not the engine 4 is in the state in which the engine 4 accepts the request of each required torque from the air conditioning control device 5 and can output the required torque of any one of drive patterns.

For example, when the vehicle runs on a flat road without a large acceleration and hence the engine 4 is in the state in which the engine 4 can accept the required torque for driving the compressor 1 (when the vehicle is not in the state of an abrupt acceleration or climbing up a slope), the process proceeds to step S53. On the other hand, when the accelerator pedal is depressed by a given amount or more to put the vehicle into the state of a large acceleration or climbing up a slope and hence the engine 4 is in the state where the engine 4 cannot accept the required torque necessary for driving the compressor 1, it is determined that the step S52 is NO and then the process proceeds to step S54. In step S54, the compressor 1 is stopped until the next calculation timing.

In step S53, an estimated fuel consumption/torque when the engine 4 outputs the required torque is calculated. This calculation is performed by the use of a characteristic map to show an equi-fuel consumption/torque curve shown in FIG. 8. In the characteristic map to show an equi-fuel consumption/torque curve shown in FIG. 8, a horizontal axis designates the rotation speed of the engine 4 and a vertical axis designates the output torque of the engine 4.

In FIG. 8, a point Fna designates an estimated fuel consumption when the engine 4 does not accept the required torque necessary for driving the compressor 1 and does not output the required torque. This value is changed according to the traveling conditions of the vehicle and drive conditions of auxiliaries (alternator or the like) other than the compressor 1 and hence may be further corrected. A point Fa designates an estimated fuel consumption when the engine 4 accepts the required torque for driving the compressor 1 and outputs the required torque under the same traveling conditions of the vehicle or the same drive conditions of the auxiliaries other than the compressor 1 as the point Fa. Here, in the example shown in FIG. 8, the fuel consumption/torque is improved but it is not always true that when the point Fna transits to the point Fa, the fuel consumption/torque is improved.

The estimated fuel consumption/torque is calculated by dividing the difference between the estimated fuel consumption Fa (whose unit or dimension is L) of the engine 4 when the required torque is outputted and the estimated fuel consumption Fna (L) of the engine 4 when the required torque is not outputted by the required torque T (τ). The estimated fuel consumption can be found by the following mathematical formula 4.

Estimated fuel consumption/torque=
(Fa−Fna)/T (Mathematical formula 4)

This estimated fuel consumption/torque is calculated on the basis of an estimated fuel consumption, which is estimated to be consumed by the engine 4 when the engine control device 38 accepts the required torque from the air conditioning control device 5 and drives the engine 4, an estimated fuel consumption, which is estimated to be consumed by the engine 4 when the engine control device 38 does not accept the required torque from the air conditioning control device 5 and drives the engine 4, and the required torque from the air conditioning control device 5. The estimated fuel consumption/torque relates to "a fuel consumption additionally consumed by the engine 4 at the time of accepting the required torque" per unit required torque.

Next, in step S55, an evaluation formula is calculated in each drive pattern. The calculation of the evaluation formula is performed by finding an evaluation formula calculation value shown by the following mathematical formula 5.

Evaluation formula calculation value=(engine
required fuel consumption/torque−estimated fuel
consumption/torque)×required torque (Mathematical formula 5)

This evaluation formula is a formula of multiplying a value acquired by subtracting the estimated fuel consumption/torque from the engine required fuel consumption/torque (U/τ) by the required torque.

The evaluation formula is a value acquired by subtracting the fuel consumption required by the engine 4 in each drive pattern, which is estimated to be additionally consumed by the engine 4 at the time of accepting the required torque, from the fuel consumption required by the compressor 1 in each drive pattern, which is estimated by the air conditioner side by the use of information in the air conditioner. The evaluation formula shows that the larger the value of the evaluation formula is, the more efficiently the engine 4 can drive the compressor 1.

Here, in step S55, when the estimated fuel consumption/torque is smaller than the engine required fuel consumption/torque, the evaluation formula calculation value may be a value acquired by multiplying the estimated fuel consumption/torque by the required torque. In this case, a drive pattern in which a necessary energy quantity (engine output) becomes maximum is selected.

Next, in step S56, a drive pattern in which the evaluation formula calculation value becomes maximum is selected. In step S57, the compressor 1 is driven in the selected drive pattern. That is, the drive pattern in which the evaluation formula calculation value is large is selected as an optimum drive pattern.

Here, that the evaluation formula calculation value becomes minus shows the state in which the fuel consumption estimated to be additionally consumed by the engine 4 when the compressor 1 is driven as required is larger than the fuel consumption required by the compressor 1, which is estimated by the vehicular air conditioner 15. When the compressor 1 is controlled in the drive pattern of this state, the compressor 1 is driven as required when the engine efficiency is not high. Hence, in the case where the evaluation formula calculation value becomes minus, the compressor 1 is stopped until the next calculation period.

In this regard, the fuel consumption/torque of the engine required fuel consumption/torque (L/τ) in the present disclosure expresses a value acquired by dividing the fuel consumption necessary for generating a given torque by a value of the torque to be produced. In other words, the engine required fuel consumption/torque (L/τ) in the present disclosure is the fuel consumption per unit torque and hence is different from a general fuel consumption in terms of "fuel consumption rate indicating a mileage per unit fuel quantity". The fuel consumption/torque in terms of the engine required fuel consumption/torque (L/τ) can be understood as an efficiency of producing torque.

Second Embodiment

Next, a second embodiment will be described. In the respective embodiments to be described hereinafter, the same constituent elements as in the first embodiment described above are denoted by the same reference signs and their descriptions will be omitted and different constructions and features will be described.

Figure 9:
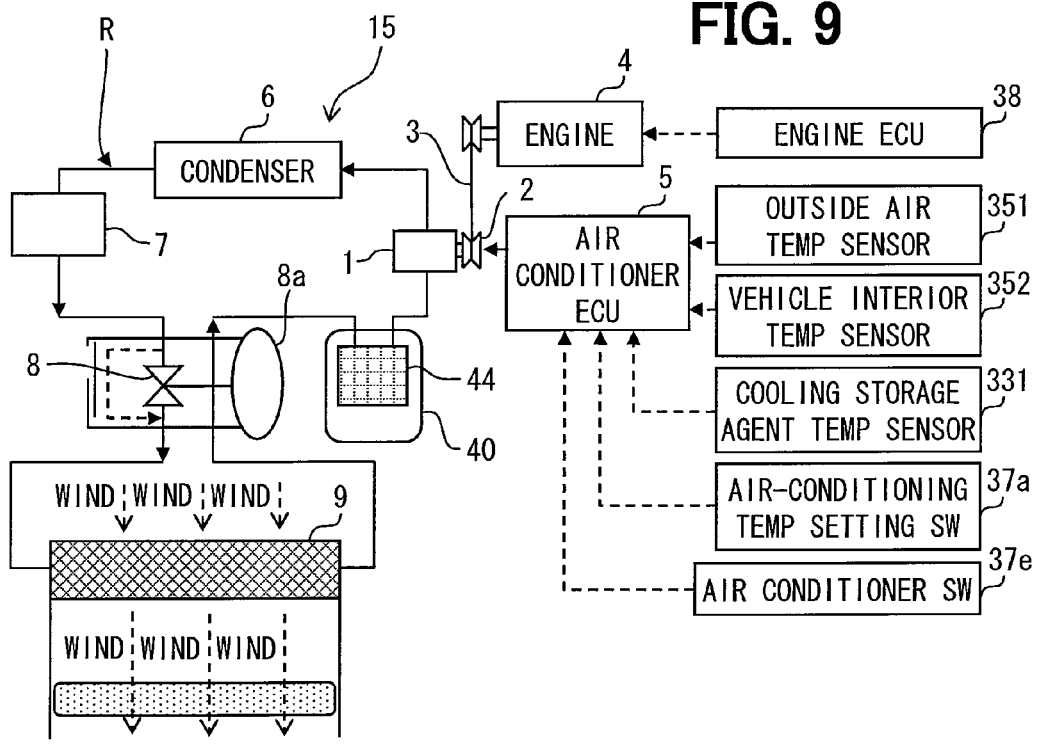
FIG. 9 is a construction diagram of a vehicular air conditioner used in a second embodiment.

In the first embodiment described above, the cold energy storage unit 40 is cooled by the air-conditioned air, but the cold energy storage unit 40 may be disposed in the refrigerant circuit as described in the patent document 2. Hereinafter, this will be described. FIG. 9 is a construction diagram of a vehicular air conditioner 15 used in the second embodiment.

In FIG. 9, the refrigeration cycle R is constructed of constituent elements coupled to each other by a refrigerant pipe in such a way that the refrigerant is circulated in the path of: discharge port of compressor 1→condenser 6→liquid reservoir 7→expansion valve 8→evaporator 9 forming heat exchanger in vehicle compartment→cold energy storage unit 40→suction port of compressor 1.

As shown by the second embodiment, it is also recommended that: the cold energy storage unit 40 having the cold energy storing agent 44 received therein is disposed in the circuit through which the refrigerant flowing through the heat exchanger (evaporator) 9 flows; the vehicle compartment is cooled via the heat exchanger 9 by the refrigerant passing through the cold energy storage unit 40; and the required fuel consumption/heat (L/Q) shown in FIG. 6 is set on the basis of the amount of storage of cold energy of the cold energy storage unit 40.

The cold energy storing agent 44 is set in the cold energy storage unit 40 and the refrigerant flowing out of the evaporator 9 when the compressor 1 is driven flows into the cold energy storage unit 40 and exchanges heat with the cold energy storing agent 44, whereby the cold energy of the refrigerant is stored in the cold energy storing agent 44. The refrigerant, which exchanges heat with the cold energy storing agent 44 in the cold energy storage unit 40 and has its temperature increased, flows out of the cold energy storage unit 40 and is sucked by the compressor 1.

Here, a reference numeral 38 denotes an engine control device (engine ECU), 351 denotes an outside air temperature sensor, 352 denotes a vehicle inside temperature sensor, and 331 denotes a cold-energy-storing-agent temperature sensor for detecting the temperature of the cold energy storing agent 44 of the cold energy storage unit 40. Further, a reference numeral 37a denotes an air conditioning temperature setting switch and 37e denotes an air conditioning switch.

Third Embodiment

Next, a third embodiment will be described. Featured parts different from the embodiments described above will be described. In the first embodiment described above, the number of compressor control patterns to be selected is reduced in order to reduce the amount of calculation. However, when calculation can be performed at a high speed, the number of alternative compressor control patterns to be selected may be increased.

Figure 10:
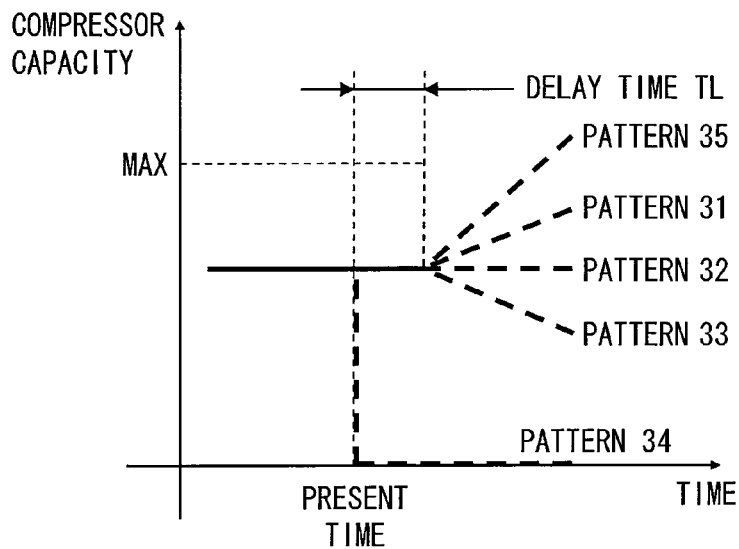
FIG. 10 is an illustration of a compressor control pattern to show a third embodiment.

FIG. 10 is an illustration of a compressor control pattern to show the third embodiment. In FIG. 10, a delay time TL may be set so as to perform patterns 31 to 33. The delay time TL may be a variable according to the rotation speed of the compressor 1, that is, the engine 4. Further, as shown by the pattern 35, an inclined angle (gradient) of increasing the discharge volume of the compressor 1 may be set larger than the pattern 31. A pattern 34 is a pattern of stopping the compressor 1.

Fourth Embodiment

Next, a fourth embodiment will be described. Featured parts different from the embodiments described above will be described. It is also recommended that a work volume change coefficient P of a numerical value that can be arbitrarily selected is set as a value having an effect on the drivability of the vehicle or on the life of the vehicular air conditioner 15 and that the larger the work volume change coefficient P is, the more the work volume per a given period of the compressor 1 is reduced.

According to this, a vehicle control system in which great value is placed on the drivability of the vehicle or on the life of the vehicular air conditioner 15 or a vehicle control system in which great value is placed on an improvement in a fuel consumption rate can be arbitrarily selected by setting the work volume change coefficient P, whereby a trade-off between the drivability and the fuel consumption rate can be optimized. For example, it is only necessary that the larger the work volume change coefficient P is, the more the work volume of the compressor 1 is reduced.

Figure 11:
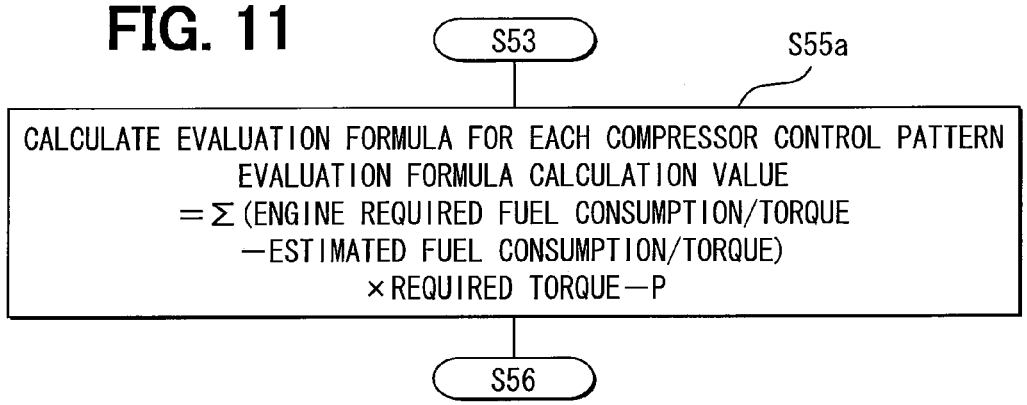
FIG. 11 is a partial flow chart of changing a part of the flow chart shown in FIG. 5 used so as to show a fourth embodiment.

Further, it is also recommended that an evaluation formula calculation value is calculated by a partial flow chart showing the fourth embodiment and shown in FIG. 11 and by the following mathematical formula 6 and that the larger the work volume change coefficient P is, the more the chances of stopping the compressor 1 is increased to thereby reduce the work volume of the compressor 1.

$$\text{Evaluation formula calculation value} = \Sigma(\text{engine required fuel consumption/torque} - \text{estimated fuel consumption/torque}) \times \text{required torque} - \text{work volume change coefficient } P \quad \text{(Mathematical formula 6)}$$

According to the mathematical formula 6, by setting the work volume change coefficient P, all of the evaluation formula calculation values become minus and hence the chances where the compressor 1 is stopped are increased, so that the trade-off between the drivability or the life of the vehicular air conditioner 15 and an improvement in the fuel consumption rate can be arbitrarily optimized. Here, step S55a shown in FIG. 11 can be replaced by step S55 shown in FIG. 5.

In this way, in this fourth embodiment, the work volume change coefficient P which is an arbitrarily selected numerical value is set as a value having an effect on the drivability of the vehicle or on the life of the vehicular air conditioner 15, and the work volume per a given period of the compressor 1 based on the selected compressor control pattern is reduced by the method of increasing a probability at which the evaluation formula calculation value becomes minus as the work volume change coefficient P becomes larger.

As a modified example of the fourth embodiment, in order to inhibit an abrupt change in the compressor discharge volume, it is also possible to use the work volume change coefficient P of the arbitrarily selected numerical value and to limit a change rate (inclined angle of the pattern described above) when the compressor discharge volume is increased to thereby correct the compressor discharge volume.

The present disclosure is not limited to the embodiments described above but can be modified or extended as follows. By excluding the required fuel consumption/heat greatly departing from the required fuel consumption/heat in the past at the time of finding the required fuel consumption/heat (L/Q), a control reflecting the history in the past can be performed.

Further, although the compressor 1 of a variable displacement type is used in the first embodiment, of course, the present disclosure can also be applied to a compressor drive control of the type in which a compressor is coupled to the engine 4 via a clutch and in which the rotation of the engine 4 is intermittently transmitted to the compressor via the clutch. In this case, when the period of time in which the clutch is on becomes long for the total period of time in which the clutch is on and off, the work volume is increased as in the case where the discharge volume of the compressor 1 of the variable displacement type is increased.

Fifth Embodiment

Figure 12:
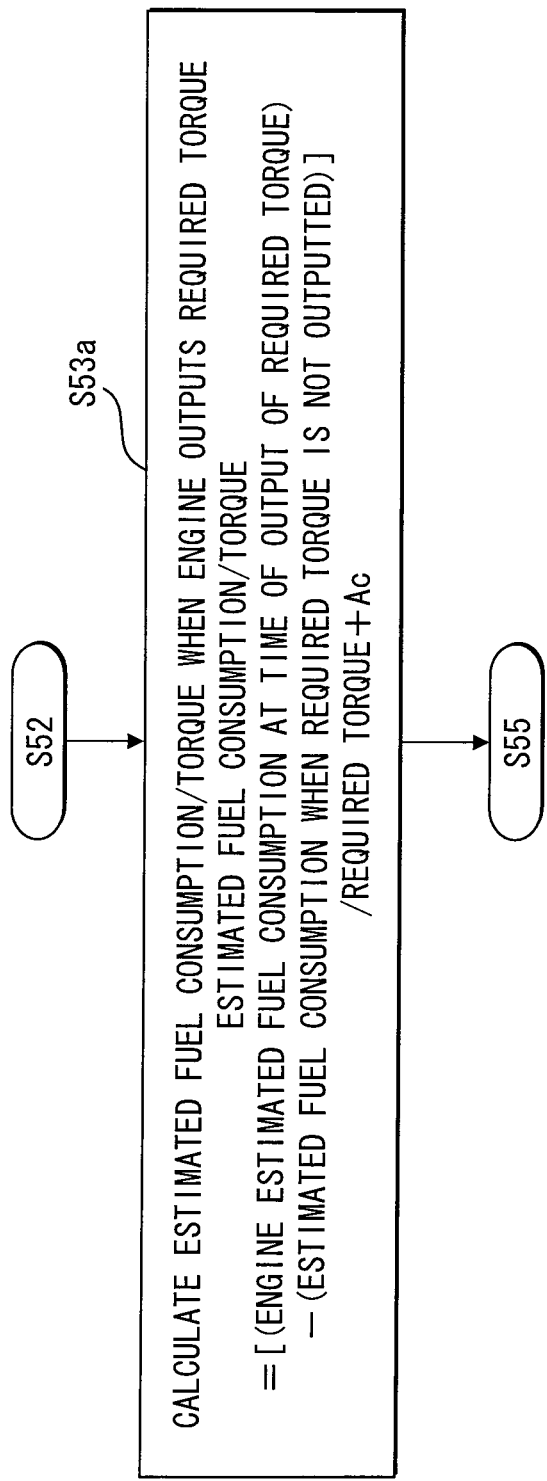
FIG. 12 is a partial flow chart of changing a part of the flow chart shown in FIG. 5 used so as to show a fifth embodiment.

Still further, it is shown that the larger the value of the evaluation formula calculation value is, the more efficiently the engine 4 can drive the compressor 1. The estimated fuel consumption/torque necessary for driving the compressor 1 in each drive pattern may be estimated according to the acceleration state of the engine 4. Here, FIG. 12 is a flow chart which shows another embodiment (referred to as a fifth embodiment) and in which the flow chart shown in FIG. 5 is partially changed. For example, a part of the flow chart shown in FIG. 5 may be changed in the manner shown in FIG. 12. That is, in order to set an estimated fuel consumption/torque, which relates to the difference between the estimated fuel consumption when the required torque is outputted and the estimated fuel consumption when the required torque is not outputted, larger as an acceleration is more abrupt, as shown in FIG. 12, the estimated fuel consumption/torque may be corrected by adding an acceleration coefficient Ac to a value calculated by the use of the characteristic map shown by an equi-fuel consumption/torque curve shown in FIG. 8. The acceleration coefficient Ac is set in such a way as to become larger as the acceleration is larger.

In this way, the more abrupt the acceleration is, the larger the estimated fuel consumption/torque becomes and the smaller the evaluation formula calculation value becomes. Hence, the chances are increased in which the power of the compressor 1 is not used at the time of acceleration, so that the compressor 1 can be controlled on the basis of the engine required fuel consumption (L/τ) while ensuring an acceleration performance.

Further, in the first embodiment described above, the drive pattern estimation part 52 of the air conditioning control device 5 (see FIG. 5) estimates the plurality of drive patterns capable of driving the compressor 1 on the basis of the state of the vehicular air conditioner 15 (set temperature Tset, outside air temperature Tam, compressor discharge volume, and gas flow rate). In this case, the estimation of the drive pattern is performed from the information at the present time. However, the drive pattern can be estimated also from the information of predicting a traveling state in a given period of time in the future.

Sixth Embodiment

Figure 13:
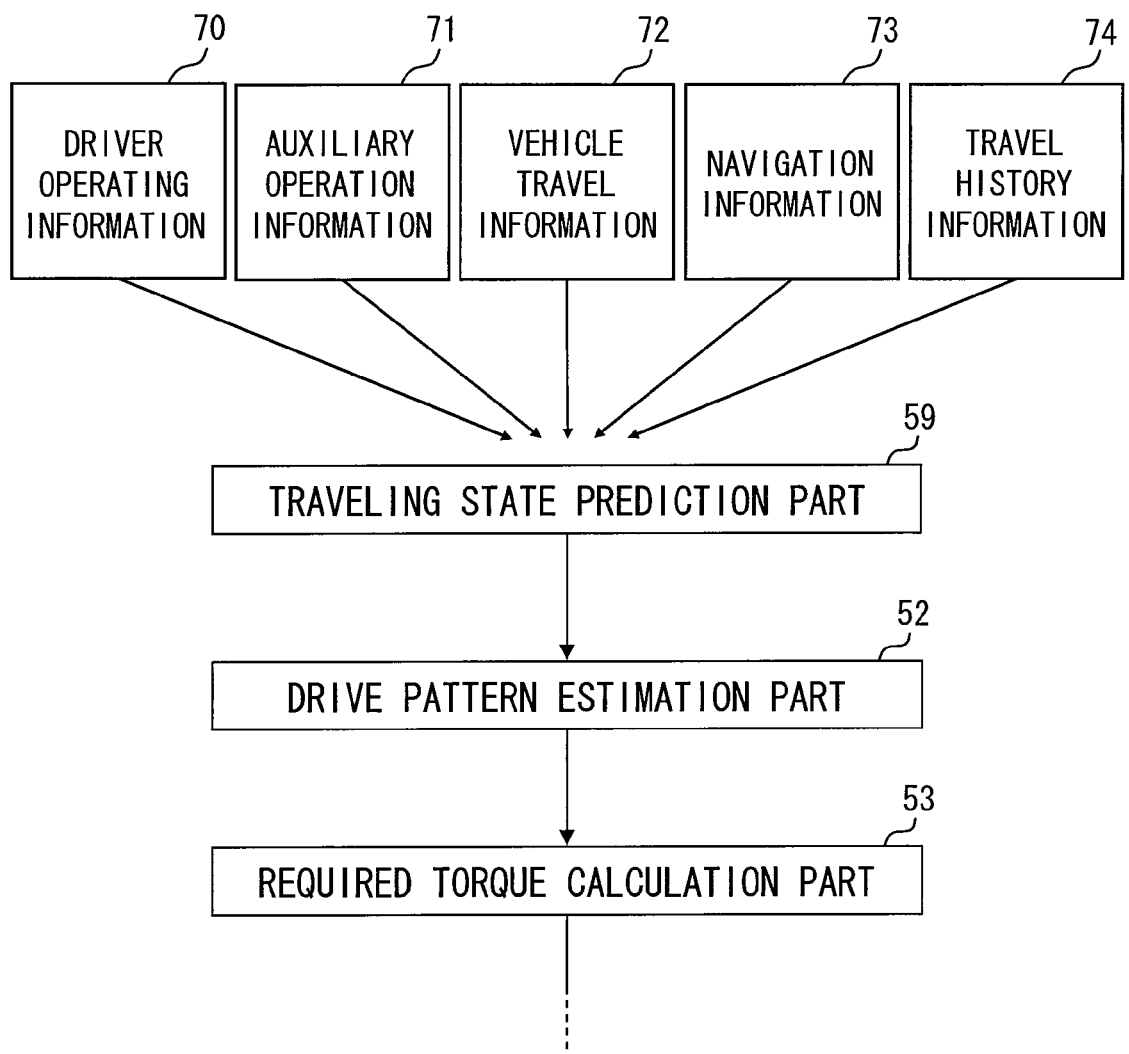
FIG. 13 is a portion of a block diagram of changing a portion of FIG. 3 used so as to show a sixth embodiment.

Here, FIG. 13 shows another embodiment (referred to as a sixth embodiment) and is a part of a block diagram in which a part of the block diagram shown in FIG. 3 is changed. In this case, as shown in FIG. 13, the drive pattern estimation part 52 shown in FIG. 3 has a signal inputted thereto from a traveling state prediction part 59.

The traveling state prediction part 59 has prediction information inputted thereto, the prediction information including driver operating information 70, auxiliary operation information 71, vehicle travel information 72, navigation information 73, and travel history information 74. The drive pattern estimation part 52 has prediction travel information inputted thereto from the traveling state prediction part 59, travel prediction information relating to the engine rotation speed and the torque at the time of prediction on the basis of the prediction information.

Of the prediction information, the driver operating information 70 is, for example, information relating to the amount of depression of the acceleration pedal or the brake pedal, and the like. Further, the auxiliary operation information 71 is, for example, information showing the magnitude of the output current of the alternator.

Further, the vehicle travel information 72 is, for example, vehicle speed information at the present time and the like. The navigation information 73 is road information such as a limit speed, a traffic jamming state, and a gradient of the slope of the road on which one's own vehicle runs. The travel history information 74 is, for example, the travel prediction information such as a probability of 80% at which one's own vehicle heading for a company can park at a parking lot of the company located 1000 meters ahead.

In this way, the traveling state prediction part 59 predicts the traveling state relating to the rotation speed of the engine and the torque of the engine at a predetermined time in the future on the basis of the travel prediction information. This predicted traveling state may include not only the vehicle speed and the like closely relating to the fuel consumption rate of the engine but also a traveling load applied by a snowy road and shift position information (also referred to as "T/M information") of an automatic transmission. Here, the T/M information is meaningful as the travel prediction information because even if the vehicle speed and the acceleration are the same, the torque of the engine 4 is changed.

A drive pattern estimation part 52 estimates a plurality of drive patterns on the basis of signal from the traveling state prediction part 59. In this way, for example, when the vehicle is due to go up a slope, the drive pattern estimation part 52 estimates a drive pattern in which the compressor discharge volume is not large. On the other hand, when it is predicted that the efficiency of the engine or the efficiency of the vehicular air conditioner becomes better, the drive pattern estimation part 52 estimates a drive pattern in which the work volume of the compressor is increased.

Further, for example, the calculation is performed by the use of the engine required fuel consumption/torque (L/τ) but the unit or dimension of the engine required fuel consumption/torque is not always limited to (L/τ). The expression of (L/τ) and the like are described just for reference and do not limit the scope of right of the disclosure. For example, a physical quantity using not (L, that is, litter) but other energy unit (for example, watt) can be employed. Hence, instead of the engine required fuel consumption/torque (L/τ), a fuel consumption or an energy consumption (L or a unit expressing other energy) necessary for driving the compressor 1 by the engine 4 can also be employed.

Seventh Embodiment

In addition, in the first embodiment has been described the embodiment relating to the control of the vehicular air conditioner, but the present disclosure can also be applied to the control of an alternator. Hereinafter, an embodiment to which an alternator is added (referred to as a seventh embodiment) will be described by the use of FIG. 1 to FIG. 8.

Figure 14:
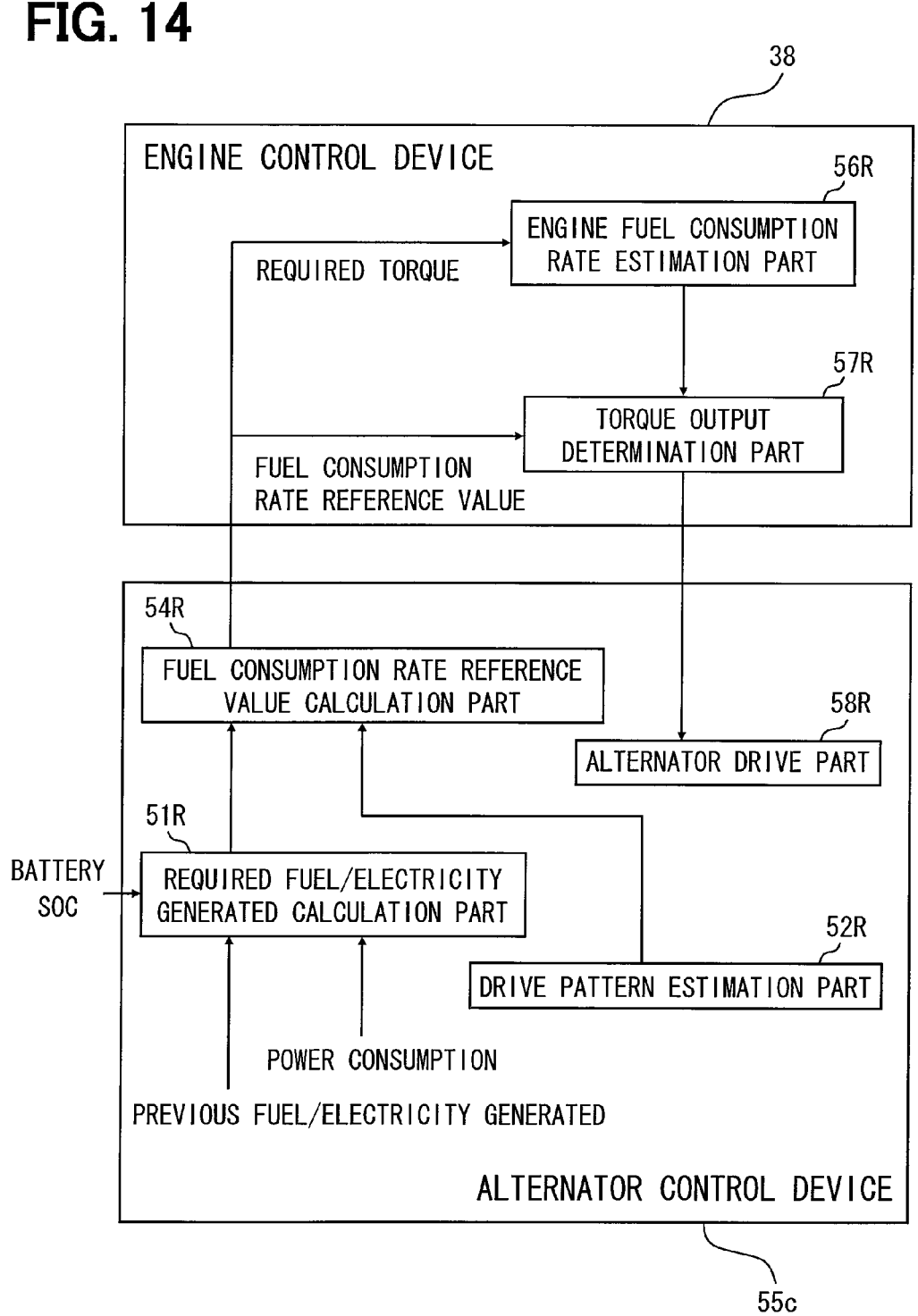
FIG. 14 is a block diagram to show a system construction of a seventh embodiment.
Figure 17:
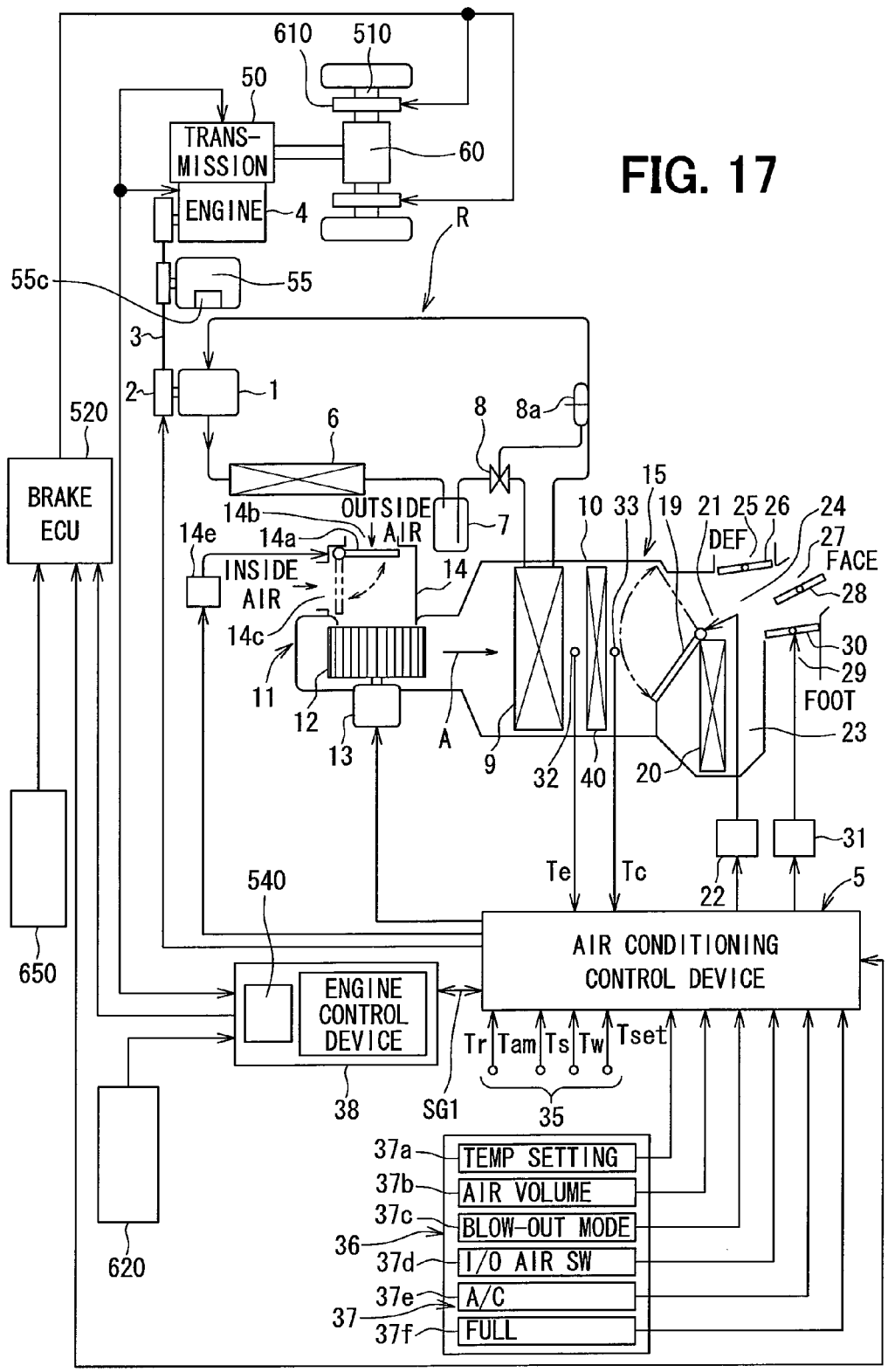
FIG. 17 is a general construction diagram of a vehicle control system including devices of an air conditioner of a vehicle, an electric power generation, and a brake control in an eighth embodiment.

Instead of the block diagram shown in FIG. 3 and showing a system construction, a block diagram shown in FIG. 14 is used for an alternator (which is the same as an alternator 55 shown in FIG. 17 and is also referred to as a generator).

First, the outline of control will be described on the basis of FIG. 14. An alternator control device 55c calculates a required fuel consumption/electricity generated on the basis of a map shown in FIG. 15 in a required fuel consumption/electricity generated calculation part 51R. Here, the fuel consumption/electricity generated means a fuel quantity necessary for generating electricity per unit electricity generated (fuel consumption/electricity generated=fuel quantity necessary for generating electricity/electricity generated).

In this case, the required fuel consumption/electricity generated is basically determined as a function of a battery SOC and is found in such a way that as the power consumption becomes larger, the required fuel consumption/electricity generated becomes larger. Further, when a fuel consumption/electricity generated in the past is low, a smaller required fuel consumption/electricity generated is found. Here, the battery SOC is a unit showing a charging state of the battery charged by the alternator and expresses the ratio (percentage) of a remaining amount of electricity charged in a battery to the capacity of the battery when the battery is fully charged. In other words, 100% of SOC shows a fully charged state, 50% of SOC shows that the remaining amount of electricity charged in the battery is a half, and 0% of SOC shows that the battery is fully discharged.

Figure 16:
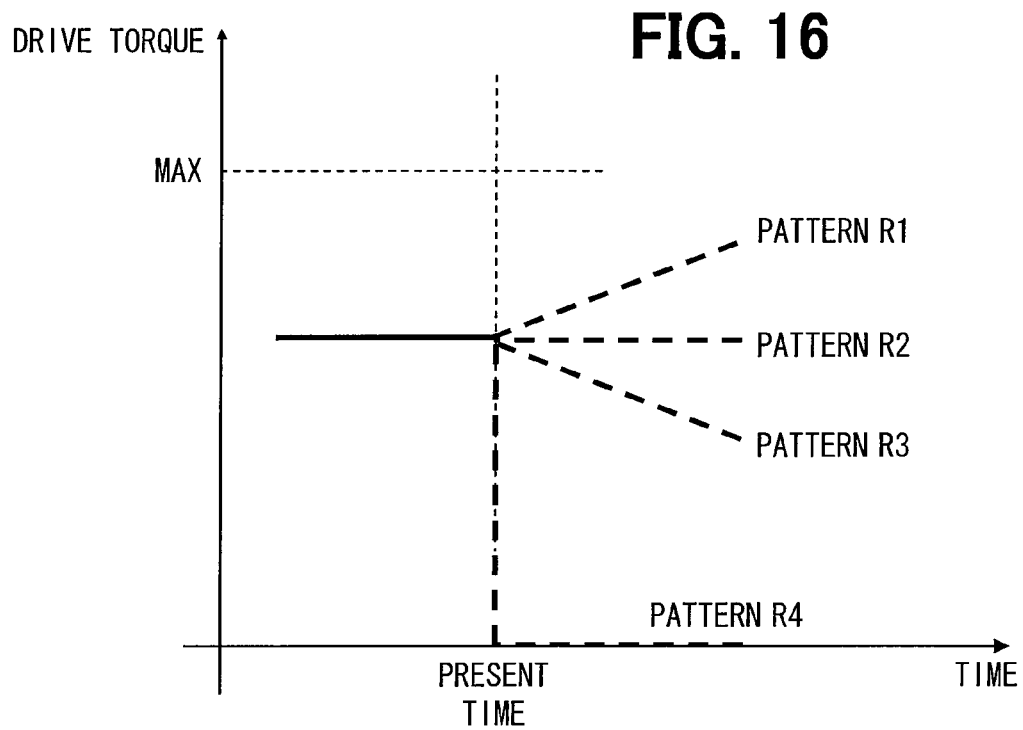
FIG. 16 is a characteristic map to show an example of estimating a drive pattern in the seventh embodiment.

Next, in a drive pattern estimation part 52R shown in FIG. 14, a drive pattern capable of controlling the alternator is estimated as shown in FIG. 16 on the basis of the state (drive torque, rotation speed) of the alternator driven by the engine 4 via a pulley. Next, a fuel consumption rate reference value for each drive pattern is calculated by a fuel consumption rate reference value calculation part 54R according to the drive torque (required torque) required on the basis of the required fuel consumption/electricity generated, which is calculated by the required fuel consumption/electricity generated calculation part 51R shown in FIG. 14, and the drive pattern.

In the fuel consumption rate reference value calculation part 54R, the fuel consumption rate reference value is calculated on the basis of the following mathematical formula 7, Fuel consumption rate reference value=(required fuel consumption/electricity generated)×estimated electricity generated/shaft output of required torque (Mathematical formula 7)

where the estimated electricity generated is estimated according to the characteristic map of the alternator (characteristic of the auxiliary) by the use of the required torque and the engine rotation speed. Further, the shaft output of the required torque is calculated on the basis of the following mathematical formula 8.

Shaft output of required torque=2π×engine rotation speed×required torque/60 (Mathematical formula 8)

The required torque and the calculated fuel consumption rate reference value for each drive pattern are transmitted to the engine control device 38.

The engine control device 38 receives the required torque and the calculated fuel consumption rate reference value. When the engine 4 can output the required torque, an engine fuel consumption rate (estimated fuel consumption rate) necessary for outputting the required torque for driving the alternator is estimated by an engine fuel consumption rate estimation part 56R on the basis of the following mathematical formula 9.

Engine fuel consumption rate=Q/shaft output of required torque (Mathematical formula 9)

where Q=(estimated fuel consumption when required torque is outputted)−(estimated fuel consumption when required torque is not outputted).

Here, when the engine 4 can output the required torque as described above, the engine fuel consumption rate necessary for outputting the required torque for driving the alternator is calculated, but when the engine 4 cannot output the required torque for all drive patterns, the driving of the alternator is stopped (the field current of the alternator is set at zero to make the output of the alternator zero).

Next, an optimum drive pattern is determined by a given determination method. To this end, in a torque output determination part 57R, an evaluation formula of the following mathematical formula 10 is calculated to acquire an evaluation formula calculation value.

Evaluation formula calculation value=(fuel consumption rate reference value−estimated fuel consumption rate)×shaft output of required torque (Mathematical formula 10)

Next, the torque output determination part 57R determines that a drive pattern in which the evaluation formula calculation value becomes a maximum value is an optimum drive pattern. This determination result is transmitted to an alternator control device 55c. An alternator drive part 58R of the alternator control device 55c controls the field current of the alternator according to the determined drive pattern.

Figure 15:
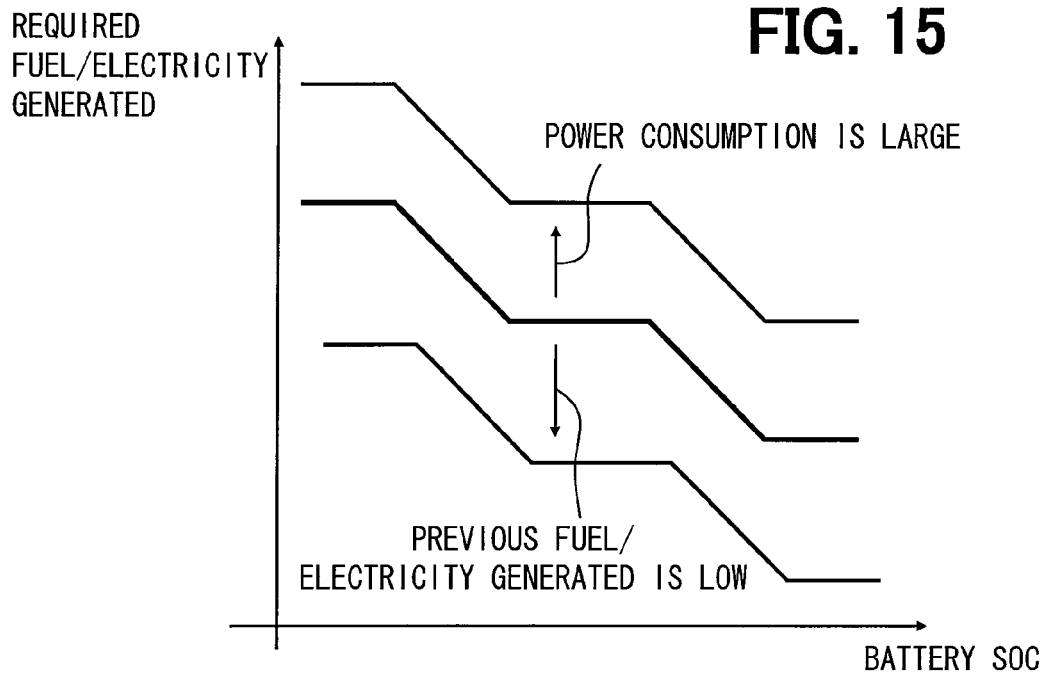
FIG. 15 is a characteristic map used for calculating a required fuel consumption/electricity generated in the seventh embodiment.

Here, in FIG. 15, basically, the higher the battery SOC is, the lower the required fuel consumption/electricity generated is set. When an electricity consumption is large, the required fuel consumption/electricity generated is corrected in such a way as to become higher. Further, when the fuel consumption/electricity generated in the past is low, the required fuel consumption/electricity generated is corrected in such a way as to become lower. Still further, in FIG. 16, as to the estimation of the drive pattern, a drive pattern within a given period of time in the future is estimated. A pattern R1 increases the drive torque of the alternator to the maximum. A pattern R2 keeps the present drive pattern. A pattern R3 decreases the drive torque to the minimum. A pattern R4 sets the drive torque at zero to put the alternator into the state of not generating electricity (the state of no load). Here, the maximum and the minimum may be not fixed values and may be variables which are varied according to the traveling pattern of the vehicle, the engine rotation speed, and the output torque.

This seventh embodiment is a vehicle control system including the engine control device 38 for controlling the engine 4 and the alternator control device (auxiliary control device) 55c for controlling the alternator (auxiliary) for supplying electricity (consumed power) consumed by an electric load in the vehicle. The vehicle control system includes: a means 52R for estimating a plurality of drive patterns for controlling the alternator (auxiliary); a means 54R for calculating an energy consumption (fuel consumption rate reference value) necessary for driving the alternator (auxiliary) by the engine 4; and a means 57R for selecting a single drive pattern for driving the alternator (auxiliary) from among the plurality of estimated drive patterns by the use of the calculated energy consumption.

According to this construction, the required torque necessary for driving the alternator by the engine 4 and the fuel consumption rate reference value are of an information type relating to the capacities of the torque and the fuel and are of an information type in which the engine 4 side can easily make a determination or a calculation. For this reason, the drive pattern of the alternator can be easily selected for the convenience of the engine 4 side according to the state of the engine 4. As a result, the power of the engine 4 can be easily saved by reducing the output of the alternator at the time of accelerating the vehicle in consideration of the convenience of the engine 4 side.

For example, when a drive pattern is selected, a damage to the performance of the engine 4, which is caused by driving the alternator of the auxiliary, can be restored only by adding a correction to the evaluation formula of the drive pattern. In this case, new communications are not developed between the engine control and the alternator control and hence a control process adapted to involve the alternator is not increased. Even if a request other than the fuel consumption/torque such as the performance of power is made for the engine 4, the optimization of trade-off for these requests can be easily realized.

In addition, by estimating the plurality of drive patterns including not only a pattern of activating or stopping the alternator but also drive patterns of driving the alternator at better efficiencies and by selecting a drive pattern from among the plurality of estimated drive patterns on the basis of the information of the fuel consumption, an effect of reducing the fuel consumption can be produced.

(Operations and Effects of Respective Embodiments Described Above)

The first to seventh embodiments described above employ the following technical means. That is, the embodiments employ the vehicle control system including the engine control device 38 for controlling the engine 4 and the auxiliary control device 5 for controlling the auxiliary 15, the vehicle control system including: the means S42, 52 for estimating the plurality of drive patterns for controlling the auxiliary 15; the means S44, 54 for calculating the energy consumption (L or a unit designating other energy) necessary for driving the auxiliary 15 by the engine 4 according to each of the plurality of estimated drive patterns; and the means S56, 57 for selecting a single drive pattern for driving the auxiliary 15 from among the plurality of estimated drive patterns by the use of the calculated energy consumption (L or a unit designating other energy).

Specifically, firstly, the vehicle control system having the engine control device 38 for controlling the engine 4 and the air conditioning control device 5 for controlling the vehicular air conditioner 15 for air-conditioning the interior of the vehicle compartment includes: the means S42, 52 for estimating the plurality of drive patterns for controlling the compressor 1 of the air conditioning control device 5; the means S44, 54 for calculating the energy consumption (L or a unit designating other energy) necessary for driving the compressor 1 by the engine 4 according to each of the plurality of estimated drive patterns; and the means S56, 57 for selecting a single drive pattern for driving the compressor 1 from among the plurality of estimated drive patterns by the use of the calculated energy consumption (L or a unit designating other energy).

According to this, the engine required fuel consumption/torque (L/$\tau$) expressing the fuel consumption per unit torque necessary for driving the compressor by the engine is of an information type relating to the capacities of the torque and the fuel and is of an information type in which the engine side can easily make a determination or a calculation. For this reason, the drive pattern of the compressor can be easily selected for the convenience of the engine side according to the state of the engine. In other words, the request of the air conditioning control device is not transmitted to the engine side in terms of the amount of storage of cold energy and the efficiency of generating a cold energy but the request of the air conditioning control device is transmitted to the engine side by the use of the engine required fuel consumption/torque (L/$\tau$) of an information type in which the engine side can easily make a determination or a calculation, so that the engine control device can respond to the request of the compressor side in the same information type as various control requests in the engine control device. As a result, the power of the engine can be easily saved by reducing the power of the compressor at the time of accelerating the vehicle in consideration of the convenience of the engine side. For example, at the time of selecting a drive patterns, damage to the performance of power can be restored only by adding a correction to the evaluation formula of the drive pattern. In this case, new communications are not developed between the engine control and the air conditioning control and hence a control process adapted to involve the vehicular air conditioner is not increased. Even if a request other than the fuel consumption/torque such as the performance of power is made for the engine 4, the optimization of trade-off for these requests can be easily realized. In addition, by estimating the plurality of drive patterns including not only a pattern of activating or stopping the compressor but also drive patterns of driving the compressor at better efficiencies and by selecting a drive pattern from among the plurality of estimated drive patterns on the basis of the information of the fuel consumption, even in the case where the compressor of a variable displacement type is used, an effect of reducing the fuel consumption can be further produced.

Secondly, in addition, from the state of the vehicular air conditioner 15, the engine required fuel consumption/torque (L/$\tau$) that becomes the energy consumption (L or a unit designating other energy) is calculated from the means S41, 51 for calculating the required fuel consumption/heat (L/Q) expressing the fuel consumption per unit heat quantity, the means S43, 53 for calculating the required torque ($\tau$) for driving the compressor 1 in each of the estimated drive patterns, the required fuel consumption/heat (L/Q) that is calculated, the heat quantity (Q) generated in the vehicular air conditioner 15 in each of the drive patterns, and the required torque ($\tau$).

According to this, the engine required fuel consumption/torque (L/$\tau$) is calculated from the required fuel consumption/heat (L/Q) and the heat quantity (Q) generated in the vehicular air conditioner when the compressor is driven according to each drive pattern, and the required torque (L/$\tau$), so that the engine required fuel consumption/torque (L/$\tau$) can be calculated by the simple calculation.

Thirdly, the engine required fuel consumption/torque (L/$\tau$) is an estimated fuel consumption/torque that is the fuel consumption of the engine 4 per required torque required by the compressor 1.

According to this, the engine required fuel consumption/torque (L/$\tau$) that is the fuel consumption of the engine per unit torque is of an information type handled by the engine side. Hence, if the drive pattern of the compressor is selected on the basis of the engine required fuel/torque consumption (L/$\tau$), when a single drive pattern is selected, the state on the engine side can be easily reflected.

Fourthly, in addition, there is provided the means S53, 56 for calculating the estimated fuel consumption/torque relating to the difference between the estimated fuel consumption Fa of the engine 4 when the engine 4 outputs an engine output torque corresponding to the required torque ($\tau$) and the estimated fuel consumption Fna of the engine 4 when the engine 4 does not output the engine output torque corresponding to the required torque ($\tau$). A calculation value that is the reference of evaluation is found from the estimated fuel consumption/torque, the engine required fuel consumption/torque (L/$\tau$), and the required torque ($\tau$), and the drive pattern is selected on the basis of the calculation value that becomes the reference of evaluation.

According to this, the drive pattern is selected on the basis of the calculation value that becomes the reference of evaluation, so that a determination reference can be made clear.

Fifthly, the calculation value that becomes the reference of evaluation expresses the state of the fuel consumption/torque of the engine 4 for driving the compressor 1 according to each drive pattern, and the drive pattern is selected in which the fuel consumption/torque of the engine 4 is excellent.

According to this, the drive pattern in which the fuel consumption/torque of the engine 4 is excellent can be selected on the basis of a given reference of evaluation while reflecting the request of the vehicular air conditioner side.

Sixthly, the calculation value that becomes the reference of evaluation is found by multiplying a value, which is acquired by subtracting the estimated fuel consumption/torque from the engine required fuel consumption/torque (L/τ), by the required torque (τ).

According to this, when the estimated fuel consumption/torque is low, the drive pattern for driving the compressor can be selected by the use of a lot of engine output torque, so that the necessary heat quantity (cold energy quantity) of the vehicular air conditioner can be generated by the smaller fuel consumption of the engine.

Seventhly, the required fuel consumption/heat (L/Q) can be set on the basis of the air-conditioned environment of the vehicle detected by the vehicular air conditioner 15.

According to this, the state of the air-conditioned environment of the vehicle detected by the vehicular air conditioner (15) can be reflected to the required fuel consumption/heat (L/Q) and the engine required fuel consumption/torque (L/τ) is calculated on the basis of the required fuel consumption/heat (L/Q), so that the state of the air-conditioned environment of the vehicle detected by the vehicular air conditioner (15) can be reflected to the selection of the single drive pattern.

Eighthly, there is provided a feature in which when the vehicle is accelerated by the engine 4, as the used torque is larger, the calculation value that becomes the reference of evaluation is corrected in such a way as to become worse.

According to this, as the vehicle is accelerated and the used torque becomes larger, the calculation value that becomes the reference of the evaluation is corrected in such a way as to become worse, so that the control is performed on the basis of the engine required fuel consumption/torque (L/τ) while keeping the acceleration performance of the vehicle.

Ninthly, the means S42, 52 for estimating a drive pattern predicts a state of the engine including the acceleration and deceleration of the engine 4 and estimates the plurality of drive patterns.

According to this, the state of the engine in the future is predicted and the plurality of drive patterns are estimated from the predicted state of the engine, so that the compressor can be driven in the drive pattern matching the state of the engine in the future.

Tenthly, the means S42, 52 for estimating a drive pattern and the means S44, 54 for calculating an engine required fuel consumption/torque (L/τ) are disposed in the air conditioning control device 5 for controlling the vehicular air conditioner 15, and the means S56, 57 for selecting a single drive pattern for driving the compressor 1 from among the plurality of estimated drive patterns is disposed in the engine control device 38 for controlling the engine 4.

According to this, in the engine control device, the drive pattern of the compressor can be easily selected for the convenience of the engine by the use of the engine required fuel consumption/torque (L/τ) that is a control parameter by which the request of the vehicular air conditioner can be easily understood in view of the engine side.

Still Other Embodiments

An eighth embodiment to a fifteenth embodiment to be described below relate to a vehicle control system for distributing torque to a plurality of auxiliaries driven by the engine of the vehicle from the engine in the state of small fuel consumption according to the torque that each of the plurality of auxiliaries requires the engine side to distribute. In particular, these embodiments relate to a vehicle control system for driving a compressor for air conditioning that is an auxiliary and a generator that is another auxiliary by the engine.

Eighth Embodiment

Hereinafter, an eighth embodiment will be described in detail by the use of FIG. 17 to FIG. 24. FIG. 17 is a general construction diagram of a vehicle control system including an air conditioner of a vehicle, a generator, and a brake control device in the eighth embodiment. In this embodiment, a vehicular air conditioner 15 is provided with a cold energy storage unit 40 and a refrigeration cycle R is operated by a compressor 1 of a variable displacement type. A continuously variable transmission is used as a transmission 50 of the vehicle. Further, the vehicle control system includes an alternator 55 and the compressor 1, which are coupled to the engine 4 by a belt 3 and are rotated, as auxiliaries of the engine 4.

First, the vehicular air conditioner 15 will be described. The refrigeration cycle R of the vehicular air conditioner 15 is provided with the compressor 1 for sucking, compressing, and discharging refrigerant. The compressor 1 is of a variable displacement type and has a refrigerant flow rate controlled continuously on the basis of a discharge volume control current from an air conditioning control device (also referred to as an "air conditioner ECU") 5 for controlling the vehicular air conditioner 15.

Here, the power of the engine 4 is transmitted to the compressor 1 via a pulley 2 and the belt 3. A superheated gas refrigerant discharged from the compressor 1 and having high temperature and high pressure flows into a condenser 6 and exchanges heat with outside air sent from a cooling fan (not shown), thereby being cooled and condensed. The refrigerant condensed in the condenser 6 flows into a liquid reservoir 7 and the gas and the liquid of the refrigerant is separated from each other in the liquid reservoir 7 and the excess refrigerant (liquid refrigerant) in the refrigeration cycle R is stored in the liquid reservoir 7.

The liquid refrigerant from the liquid reservoir 7 has its pressure reduced by an expansion valve 8, thereby being brought into a gas-liquid two-phase state of low pressure. The expansion valve 8 is a temperature type expansion valve having a temperature sensing part 8a for sensing the temperature of the refrigerant at an exit of an evaporator 9 forming a heat exchanger for cooling. A low-pressure refrigerant from the expansion valve 8 flows into the evaporator 9.

The evaporator 9 is set in an air conditioner case 10 of the vehicular air conditioner 15 and the low-pressure refrigerant flowing into the evaporator 9 absorbs heat from the air in the air-conditioner case 10, thereby being evaporated. The exit of the evaporator 9 is coupled to the suction side of the compressor 1. In this way, a closed circuit is constructed of constituent parts of the refrigeration cycle described above.

A blower 11 is disposed on the upstream side of the evaporator 9 in the air conditioner case 10. The blower 11 has a centrifugal blower fan 12 and a driving motor 13. An inside/outside air switching box 14 is disposed on the suction side of the blower fan 12 and an inside/outside air switching door 14a in the inside/outside air switching box 14 selectively opens or closes an outside air introduction port 14b and an inside air introduction port 14c.

In this way, the outside air (air outside a vehicle compartment) or the inside air (air inside the vehicle compartment) is selectively introduced into the inside/outside air switching box 14. The inside/outside air switching door 14a is driven by an electric drive device 14e made of a servomotor.

In the air conditioner case 10, the cold energy storage unit 40 which will be described later and an air mixing door 19 are disposed in sequence on the downstream side of the evaporator 9. On the downstream side of the air mixing door 19 is disposed a heating heat exchanger (hot-water type heater core) 20 for heating air by using the hot water (cooling water) of the engine 4 as a heat source.

A bypass passage 21 for bypassing the hot-water type heater core 20 and flowing air (cold air) is formed on the side (upper side) of the hot water type heater core 20. The air mixing door 19 is a turnable plate-shaped door and is driven by an electric drive device 22 made of a servomotor as shown by an arrow.

The air mixing door 19 is a door for regulating a ratio of the volume of hot air passing through the hot water type heater core 20 to the volume of cold air passing through the bypass passage 21 and regulates a ratio of the volume of hot air to the volume of cold air to thereby regulate the temperature of air to be blown off into a vehicle compartment. Hence, in this embodiment, a means for regulating a temperature of air blown off into the vehicle compartment is constructed of the air mixing door 19.

A hot air passage 23 extending upward from below is formed on the downstream side of the hot water type heater core 20. The hot air from the hot air passage 23 is mixed with the cold air from the bypass passage 21 in an air mixing part 24, whereby air having a desired temperature is produced.

Further, a blowoff mode switching part is formed on the downstream side of the air mixing part 24 in the air conditioner case 10. That is, a defroster opening part 25 is formed in a top face of the air conditioner case 10. The defroster opening part 25 blows off air to the inner surface of the front glass of the vehicle via a defroster duct (not shown). The defroster opening part 25 is opened or closed by a turnable plate-shaped defroster door 26.

Further, a face opening part 27 is formed in a portion closer to the rear side of the vehicle than the defroster opening 25 in the top face of the air conditioner case 10. The face opening part 27 blows off air to the upper half body of an occupant in the vehicle compartment via a face duct (not shown). The face opening part 27 is opened or closed by a turnable plate-shaped face door 28.

Further, a foot opening part 29 is formed in a portion below the face opening part 27 in the air conditioner case 10. The foot opening part 29 blows off air to the feet of the occupant in the vehicle compartment. The foot opening part 29 is opened or closed by a turnable plate-shaped foot door 30.

Further, a temperature sensor 32 of the evaporator 9 is disposed in a portion right behind an air blowoff port of the evaporator 9 in the air conditioner case 10 and detects an evaporator blowoff temperature Te. Still further, a temperature sensor 33 of the cold energy storage unit 40 is disposed in a portion right behind an air blowoff port of the cold energy storage unit 40 and detects a cold energy storage unit blowoff temperature Tc.

A detection signal (cold energy storage unit blowoff temperature Tc) of the temperature sensor 33 of the cold energy storage unit 40 is used for determining that the storage of cold energy is completed and for an opening control of the air mixing door 19. The opening of the air mixing door 19 is corrected by the value of the cold energy storage unit blowoff temperature Tc.

The air conditioning control device (also referred to as an "air conditioner ECU") 5 has detection signals inputted thereto not only from the temperature sensor 32 of the evaporator 9 and the temperature sensor 33 of the cold energy storage unit 40 but also from a group of publicly known sensors 35 for detecting an inside air temperature Tr, an outside air temperature Tam, an amount of solar radiation Ts, a hot water temperature Tw, and the like. Further, an air conditioning control panel 36 disposed near an instrument panel in the vehicle compartment is provided with a group of operation switches 37 operated by the occupant and also the operation signals of the group of operation switches 37 are inputted to the air conditioning control device 5.

The group of operation switches 37 includes: an air conditioning temperature setting switch 37a for producing a temperature setting signal Tset; an air volume switch 37b for producing an air volume switching signal; a blowoff mode switch 37c for producing a blowoff mode signal; an inside/outside air selector switch 37d for producing an inside/outside air selecting signal; and an air conditioning switch 37e for producing an on/off signal of the compressor 1.

Here, when a full air conditioning switch 37f is turned on, the air conditioning control device 5 outputs the "ON" signal of the compressor 1 and always outputs a drive request signal of the engine 4 to thereby continue the driving state of the engine 4 even when the vehicle is stopped. In contrast to this, when the air conditioning switch 37e is turned on, the air conditioning control device 5 outputs only the "ON" signal of the compressor 1 and does not output the drive request signal of the engine 4.

Further, the air conditioning control device 5 is connected to an engine control device (also referred to as "an engine ECU") 38, and the air-conditioning control device 5 has SG1 inputted thereto from the engine control device 38, the SG1 including a rotation speed signal of the engine 4, a vehicle speed signal, a signal of the amount of depression of an accelerator pedal, and the like.

The engine control device 38, as is publicly known, controls the amount of fuel injected into the engine 4, an ignition timing, and the like in a comprehensive manner on the basis of signals from a group of sensors (not shown) for detecting the driving conditions of the engine 4 and controls also the transmission 50. Further, in an economy running vehicle and a hybrid vehicle, in the case where the full air conditioning switch 37f is not turned on, when the engine control device 38 determines that the vehicle is in the state of a halt on the basis of the rotation speed signal of the engine 4, the vehicle speed signal, and a brake signal, the engine control device 38 intercepts power to the ignition units and stops injecting fuel, thereby automatically stopping the engine 4.

Further, when a driver performs a starting operation such as depressing an accelerator pedal after the engine 4 is stopped, the engine control device 38 determines the state of a starting operation of the vehicle on the basis of an accelerator signal from an accelerator pedal sensor 620, thereby automatically starting the engine 4. Here, when the full air conditioning switch 37f is turned on, the air conditioning control device 5 outputs a signal of restarting the engine on the basis of an increase in the cold energy storage unit blowoff temperature Tc after the halt of the engine 4. Further, each of the air conditioning control device 5 and the engine control device 38 is constructed of a publicly known microcomputer made of a CPU, a ROM, and a RAM and a peripheral circuit of the microcomputer.

Next, in FIG. 17, the engine 4 transmits power to an axle 510 via the continuously variable transmission 50 and a differential gear unit 60. The continuously variable transmission 50 changes a speed reducing ratio (transmission gear ratio) by a signal from the engine control device 38. An accelerator pedal (not shown) depressed by the occupant when the occupant accelerates the vehicle is provided with an accelerator pedal sensor 620. The signal of the accelerator pedal sensor 620 is inputted to the engine control device 38.

Further, a brake pedal (not shown) depressed by the occupant when the occupant decelerates the vehicle speed is provided with a brake pedal sensor 650 and the signal of the brake pedal sensor 650 is inputted to a brake ECU 520. The brake ECU 520 controls a hydraulic pressure to thereby activate a brake 610 near the axle 510. Next, the continuously variable transmission 50 that changes speed to transmit the power of the engine 4 to the axle 510 of the vehicle is controlled by a transmission control part 540 constructed of a microprocessor and the like in the engine control device 38. The output of the transmission 50 is transmitted to the axle 510 through a differential gear in the differential gear unit 60.

Figure 18:
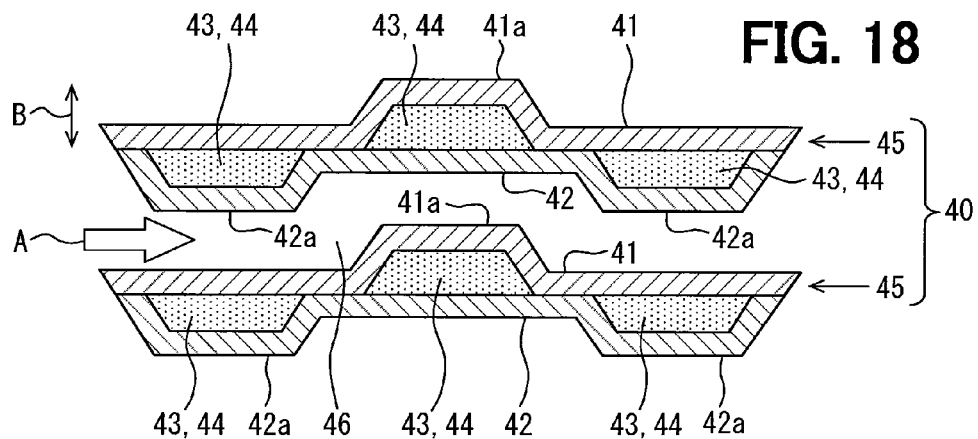
FIG. 18 is a partial section view to show a structure of a cold energy storage unit used for the eighth embodiment.

FIG. 18 is a partial section view to show the structure of the cold energy storage unit 40 used in the eighth embodiment. In FIG. 18, a specific construction of the cold energy storage unit 40 will be described. The cold energy storage unit 40, as shown in FIG. 17, is constructed of a heat exchanger that has the shape of the same front area as the evaporator 9 and through which the total amount of cold air passing through the evaporator 9 (total amount of air in the air conditioner case 10) passes. In this way, the cold energy storage unit 40 can be formed in a thin structure having a thin thickness with respect to an air flow direction A in the air conditioner case 10.

FIG. 18 illustrates a specific heat exchanger construction of the cold energy storage unit 40. Two heat transfer plates 41, 42 have projected parts 41a, 42a formed thereon respectively alternately along the air (cold air) flow direction A. The faces (plane faces) of the heat transfer plates 41, 42, on which the projected parts 41a, 42a are not formed, are made to abut on and joined to the faces of the opposite heat transfer plates 41, 42 by brazing or the like. In this way, a tube 45 having a closed space 43 is formed inside the projected parts 41a, 42a and a cold energy storing agent 44 is received in the closed space 43.

Further, only two sets of tubes 45 are shown in FIG. 18, but actually, the cold energy storage unit 40 has the same front area as the evaporator 9, so that many sets of tubes 45 are stacked in a direction shown by an arrow B (in a direction perpendicular to the air flow direction A) in FIG. 18.

On the upper/lower end portions of each tube 45 of the many sets of tubes 45 are formed abutting parts abutting on other tube 45 opposite thereto, whereby an air passage 46 having a given gap is formed between the tubes 45. The heat transfer plates 41, 42 of each of the tubes 45 and the abutting parts of each of the tubes 45 are integrally joined (brazed) to each other, whereby the whole of the cold energy storage unit 40 is integrated as a heat exchanger structure.

Next, in the above construction, the operation of the vehicular air conditioner 15 of the eighth embodiment will be described. In FIG. 17, when the compressor 1 is driven by the engine 4, the refrigeration cycle R is operated and the gas-liquid two-phase refrigerant, which has pressure reduced by the expansion valve 8 and is hence brought into low temperature and low pressure, flows into the evaporator 9. In the evaporator 9, the refrigerant having low pressure absorbs heat from air sent from the blower 11, thereby being evaporated. In this way, the air sent from the blower 11 is cooled and dehumidified, thereby being brought into cold air.

The cold air passing through the evaporator 9 passes through the air passages 46 formed between the many sets of tubes 45 of the cold energy storage unit 40 and having the given gap. In the air passage 46, a cold air flow is disturbed by a snaked shape of the air passage 46 and hence a heat transfer coefficient on the air side is improved. Thus, while the cold air passes through the air passages 46, the cold energy storing agent 44 is effectively cooled via the heat transfer plates 41, 42.

In the vehicular air conditioner 15, firstly, the air sent from the blower 11 is cooled and dehumidified by the evaporator 9, and then the cold air is mixed with the hot air by regulating the opening of the air mixing door 19, whereby a blowoff temperature into the vehicle compartment is controlled to a target blowoff temperature TAO. In this case, for example, even if TAO is as a comparatively high temperature as 12° C., in order to complete the storage of cold energy by the cold energy storing agent 44 in a short period of time, a target evaporation temperature TEO needs to be set at as a low temperature as possible.

Next, the alternator 55 shown in FIG. 17 will be described. The alternator 55, as is publicly known, has a rotor having a field system, through which a direct current from an alternator control device 55c integrated with the alternator 55 and doubling as a voltage regulator is passed, and a stator disposed around the rotor. The stator has three-phase windings wound around itself and generates three-phase alternating current. The three-phase alternating current is transformed into direct current by a rectifier circuit in the alternator and a battery in the vehicle is charged with the direct current.

Further, a generator having a permanent magnet as the field system, a generator of the type in which voltage is regulated by the use of a transistor, and a motor generator (MG) in which an electric motor assisting engine power is integrated with a generator are also included by a generator described in the present disclosure. The auxiliary driven by the engine 4 includes a water pump and a vacuum pump other than this but the descriptions of them will be omitted here.

(Control of Air Conditioning Control Device)

Next, the specific control of the air conditioning control device 5 according to the eighth embodiment will be described. When an ignition switch of the engine 4 is turned on and an air conditioning switch 37e of the group of operation switches 37 of the air conditioning control panel 36 shown in FIG. 17 is turned on in the state where electric power is supplied to the air conditioning control device 5, the control is started. First, flags and timers are initialized, and then the air conditioning control device 5 reads detection signals from the group of sensors, operation signals of the group of operation switches, and vehicle driving signals (the amount of depression of the accelerator pedal) from the engine control device 38.

Next, the target blowoff temperature TAO of the air-conditioned air blown off into the vehicle compartment is calculated. The target blowoff temperature TAO is a blowoff temperature necessary for keeping the interior of the vehicle compartment at the set temperature Tset of the temperature setting switch even if the air conditioning heat load conditions of the vehicle are changed and is calculated on the basis of the following mathematical formula 11, $$TAO = Kset \times Tset - Kr \times Tr - Kam \times Tam - Ks \times Ts + C \quad \text{(Mathematical formula 11)}$$

where Tr: inside air temperature detected by an inside air temperature sensor, Tam: outside air temperature detected by an outside air temperature sensor, Ts: amount of solar radiation detected by a solar radiation sensor, Kset, Kr, Kam, Ks: control gain, and C: constant for correction. Here, the target blowoff temperature TAO, as is publicly known, is used for the control of switching the respective blowoff port doors and for the control of the opening of the air mixing door 19.

(Block Construction of System)

Figure 19:
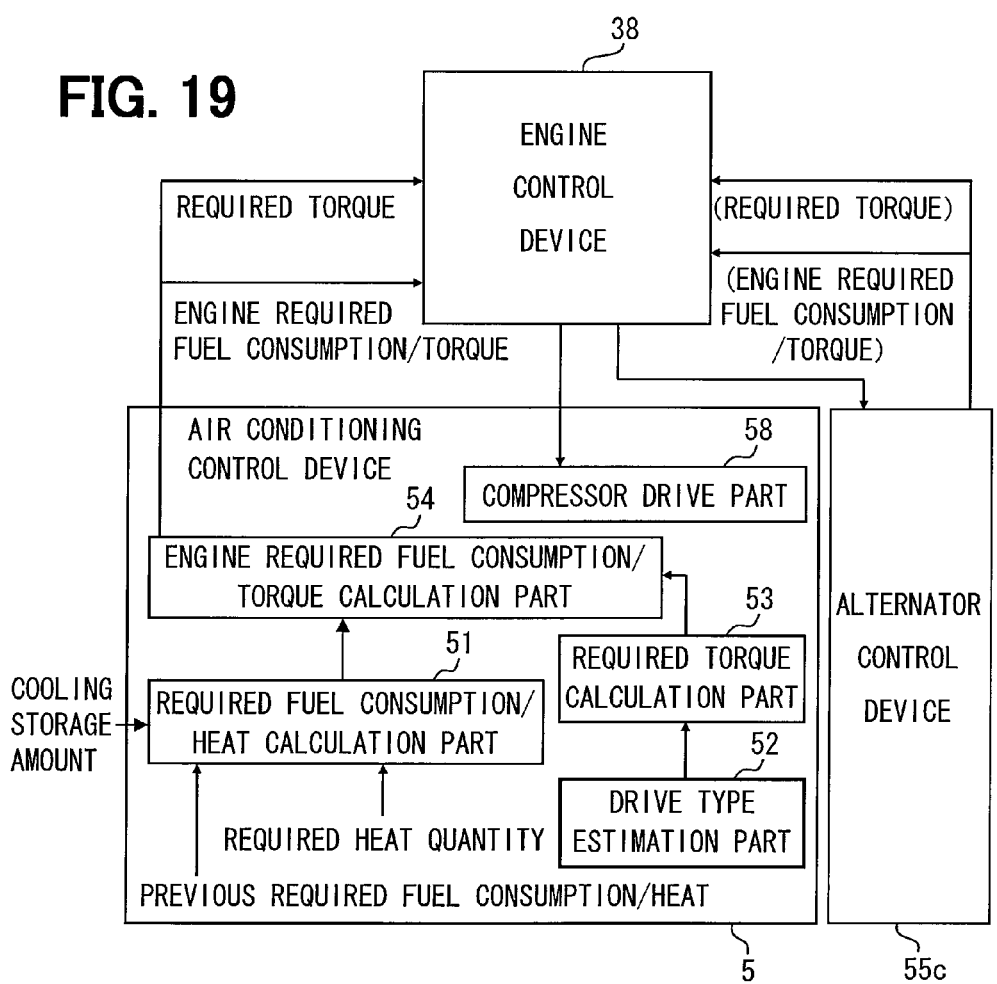
FIG. 19 is a block diagram to show a system construction relating to the control of a vehicular air conditioner of the eighth embodiment.
Figure 20:
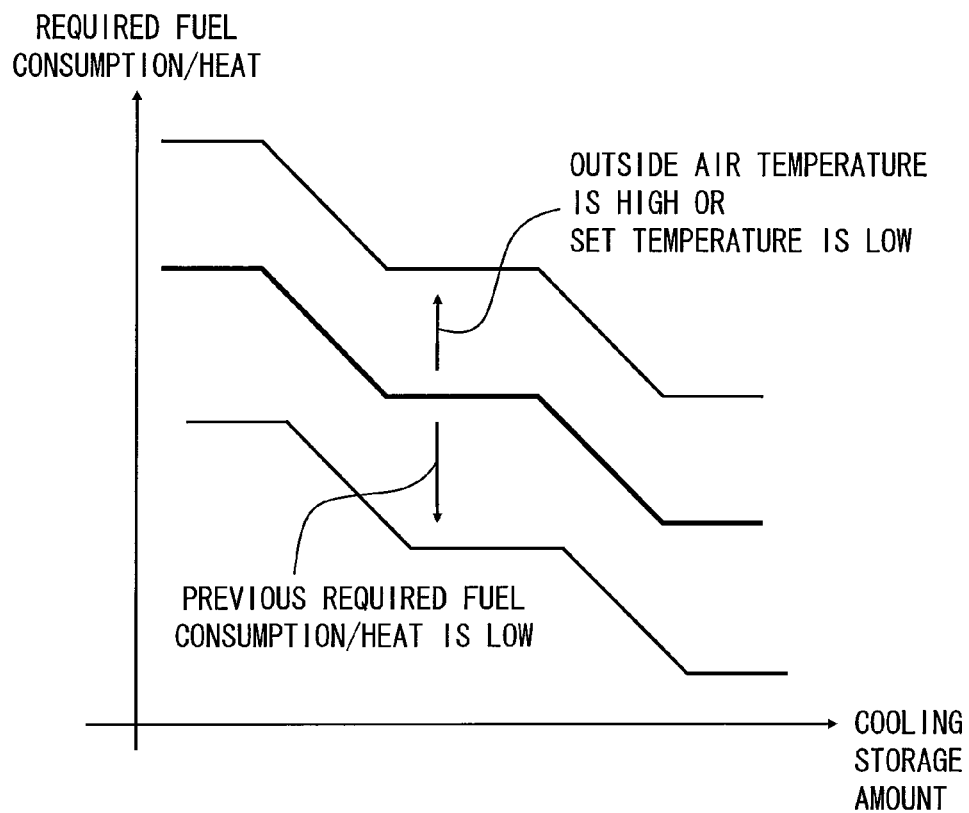
FIG. 20 is a characteristic map used for calculating a required fuel consumption/heat in the eighth embodiment.

FIG. 19 is a block diagram to show a system construction relating mainly to the control of the vehicular air conditioner 15 of the eighth embodiment. Here, in FIG. 19, a required torque from the alternator control device 55c and an input to the engine control device 38 of the engine required fuel consumption/torque will be described later. FIG. 20 is a characteristic map used for calculating a required fuel consumption/heat in this eighth embodiment. The air conditioning device 5 calculates the required fuel consumption/heat on the basis of the map shown in FIG. 20 in a required fuel consumption/heat calculation part 51 shown in FIG. 19.

In this regard, the dimension or unit of the required fuel consumption/heat relates to, for example, litter L/heat quantity Q, so that in order to distinguish the required fuel consumption/heat from an engine required fuel consumption/torque (L/τ), which will be described later, the required fuel consumption/heat is also referred to as a required fuel consumption/heat (L/Q). However, this does not limit the unit or dimension of the required fuel consumption/heat.

As shown in FIG. 20, the required fuel consumption/heat (L/Q) tends to decrease mainly along with an increase in the amount of storage of cold energy of the cold energy storage unit 40. Further, the required fuel consumption/heat (L/Q) is corrected according to the required fuel consumption/heat (L/Q) in the past and a heat quantity required from the outside air temperature, the set temperature, and a temperature in the vehicle compartment. For example, as the outside air temperature is higher or the set temperature is lower, the required heat quantity is determined to be larger and hence the required fuel consumption/heat (L/Q) is corrected to a higher value.

Next, a drive type estimation part 52 of the air conditioning control device 5 shown in FIG. 19 estimates a plurality of drive types capable of driving the compressor 1 on the basis of the state of the vehicular air conditioner 15 (set temperature Tset, outside air temperature Tam, compressor discharge volume, and gas flow rate). In this case, the estimation of the drive type is determined from information at the present time. Here, the drive pattern can be estimated also from information of predicting a traveling state in the future but a prediction control is not performed in the eighth embodiment.

Next, in the air conditioning control device 5, a required torque calculation part 53 calculates a required torque that is the torque of the compressor 1 required for driving the compressor 1 in each of the plurality of drive types estimated by the drive type estimation part 52. The calculation of the required torque can be made by various methods and can be calculated, for example, as a function of a discharge quantity, a refrigerant flow rate, a refrigerant pressure, a fin temperature of an evaporator, and an engine rotation speed.

Next, the engine required fuel consumption/torque (L/τ) of each drive type is calculated by an engine required fuel consumption/torque calculation part 54 on the basis of the required torque and the required fuel consumption/heat (L/Q) that is an output from the required fuel consumption/heat calculation part 51. Then, the required torque and the engine required fuel consumption/torque (L/τ) of each drive type are transmitted to the engine control device 38.

The unit or dimension of the engine required fuel consumption/torque relates to litter/torque (simply described as L/τ). Hence, in order to distinguish the engine required fuel consumption/torque from the required fuel consumption/heat (L/Q), the engine required fuel consumption/torque is also referred to as the engine required fuel consumption/torque (L/τ). However, this does not limit the unit or dimension of the engine required fuel consumption/torque (L/τ). Further, the engine required fuel consumption/torque (L/τ) can also be referred to as a required torque production efficiency. Still further, the required torque is also described as a required torque τ. In this regard, the heat quantity produced by operating the compressor 1 is described as a heat quantity Q.

These engine required fuel consumption/torque (L/τ) and the required torque (τ) are of the same information type as various control requests in the engine control device 38 such as engine power saving by cutting the power of the compressor and are of an information type in which the request of the vehicular air conditioner 15 can be easily understood in view of the engine 4 side.

A set of required torque and the engine required fuel consumption/torque (L/τ) for each of the plurality of drive types is transmitted to the engine control device 38 from the air conditioning control device 5. Hence, there are a plurality of sets. The plurality of sets are evaluated in the engine control device 38 shown in FIG. 19 and selection is made, which will be described later.

Next, the alternator control device 55c doubling as the voltage regulator in the alternator 55 shown in FIG. 17 (FIG. 19) also calculates a required fuel/electricity generated (L/Kwh) corresponding to the required fuel consumption/heat and estimates the drive type to thereby calculate the required torque (τ) and further calculates the engine required fuel consumption/torque.

A plurality of sets of required torque and engine required fuel consumption/torque (L/τ) of the alternator 55 are transmitted to the engine control device 38 from a CPU in the alternator control device 55c. Further, the plurality of sets are evaluated in the engine control device 38 and the selection of the drive type is made, which will be described later. The detailed description of these will be described later.

Further, in the engine control device 38, calculations are separately made for each of the auxiliaries. For example, after the calculation is made for the first auxiliary, the process returns to the original flow and the similar calculation is repeated to make the calculation for the second auxiliary. In other words, the calculation is made by dividing the loop of the flow chart for each auxiliary. For example, first, the calculation of the compressor 1 of the first auxiliary may be made and then the calculation of the alternator of the second auxiliary may be made in a latter loop, or the order of the calculations may be reversed.

Figure 21:
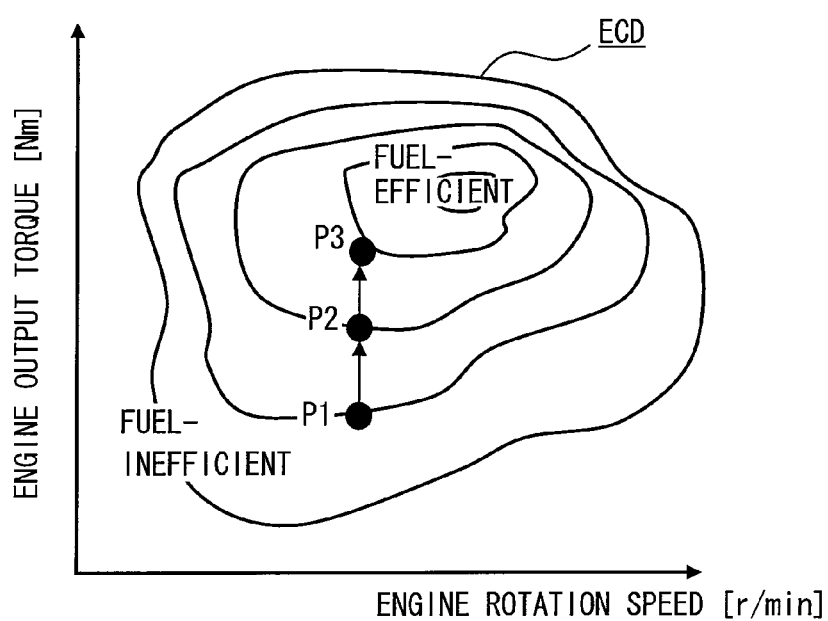
FIG. 21 is a characteristic map for estimating a fuel consumption of an engine in a case where torque is distributed to a plurality of auxiliaries in the eighth embodiment.

FIG. 21 is a characteristic map for estimating the fuel consumption of the engine 4 in the case where torque is distributed to the plurality of auxiliaries in the eighth embodiment. In a former loop, a fuel consumption at a point P2 shown in FIG. 21 is calculated by the use of the map, the point P2 showing a state in which torque is supplied to the first auxiliary from a state in which torque is not supplied to the first auxiliary. In a latter loop, because the torque of the first auxiliary is determined in the former loop, the torque of itself is added to the determined torque of the point P2, whereby the fuel consumption of the total torque at a point P3 is calculated.

Figure 22:
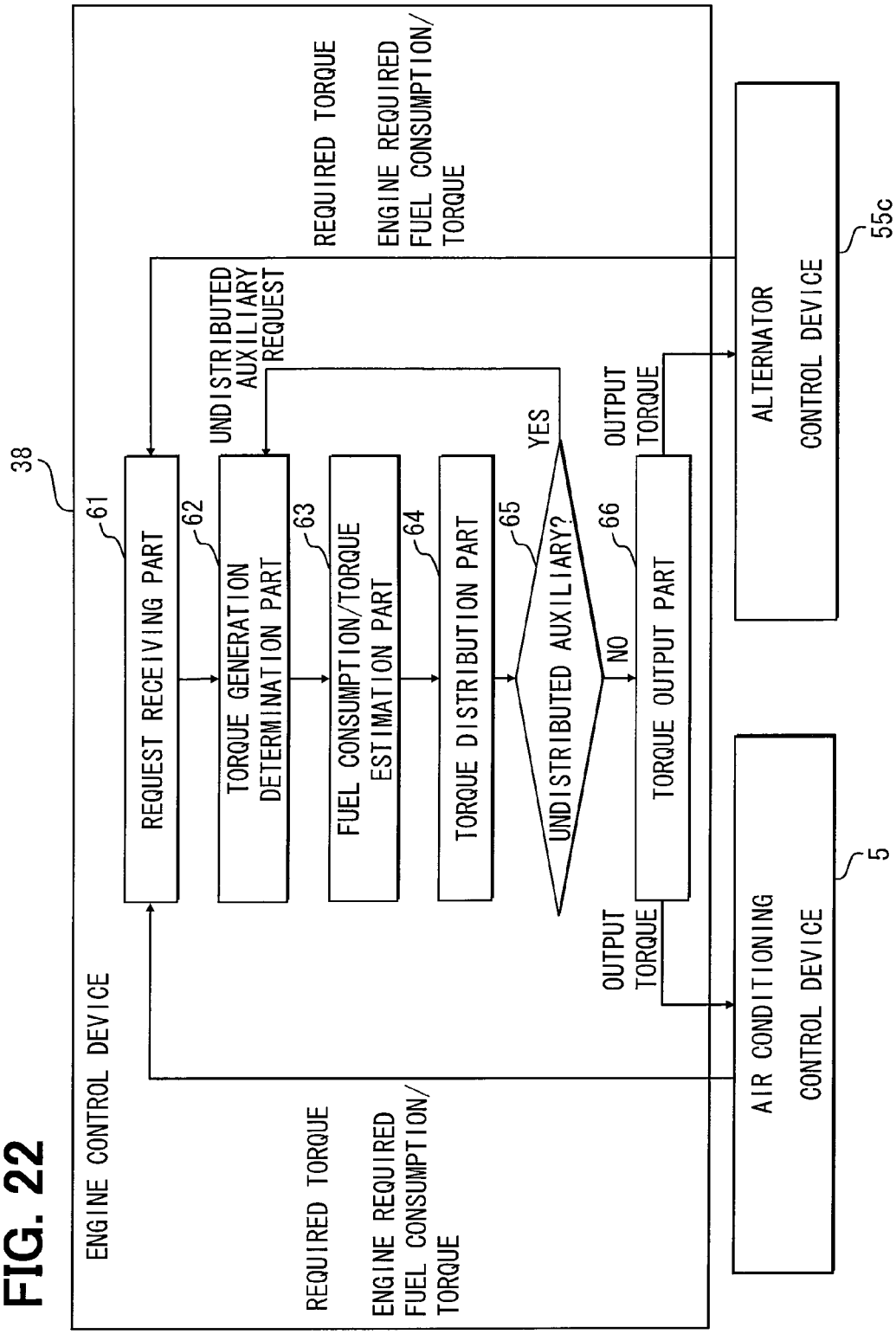
FIG. 22 is a block diagram to show a general construction of the eighth embodiment.

Hereinafter, the calculation of the fuel consumption will be described specifically by the use of FIG. 22. FIG. 22 is a block diagram to show the general construction of the eighth embodiment. In this FIG. 22, in the engine control device 38, a request receiving part 61 receives a plurality of request sets of required torque (τ) and engine required fuel consumption/torque (L/τ) from the air conditioning control device 5 for controlling the compressor 1 that becomes an auxiliary. Further, in the engine control device 38, the request receiving part 61 receives a plurality of request sets of required torque (τ)

and engine required fuel consumption/torque (L/τ) from the alternator control device 55c that becomes another auxiliary side.

In this way, the engine control device 38 receives the plurality of request sets of required torque (τ) and engine required fuel consumption/torque (L/τ) from each of the plurality of auxiliaries, that is, the first auxiliary and the alternator control device 55c. In the engine control device 38, a torque generation determination part 62 determines whether or not torque can be generated for the request set for driving the auxiliary of either the compressor 1 or the alternator 55 (for example, a plurality of request sets from the compressor 1) on the basis of the state of the engine 4. In other words, the torque generation determination part 62 primarily determines whether or not such a request can be accepted in the present state of the engine 4.

When the engine control device 38 determines that the engine 4 cannot respond to any request of the plurality of request sets, the engine control device 38 stops driving the compressor 1. The case where the engine 4 cannot respond to any request of the plurality of request sets means, for example, the case where a accelerator pedal 620 (FIG. 17) is depressed by a given amount or more to make an abrupt acceleration or to climb up the slope.

When it is determined that the engine 4 can generate the required torque (for example, the engine 4 is not in the state of an abrupt acceleration), a fuel consumption/torque estimation part 63 estimates an estimated fuel consumption/torque for each required torque T of the respective request sets for which the engine 4 can generate the torque by the use of the mathematical formula 12 described below, Estimated fuel consumption/torque=$\Delta L/T$ (Mathematical formula 12)

where $\Delta L$ is the difference between an estimated fuel consumption in the case where the required torque T is outputted (fuel consumption at the point P2 shown in FIG. 21) and an estimated fuel consumption in the case where the required torque T is not outputted (fuel consumption at the point P1 shown in FIG. 21).

Hence, the estimated fuel consumption/torque is calculated by the number of the plurality of request sets. Here, the calculation of the estimated fuel consumption/torque is performed by the use of the fuel consumption/torque characteristic map of the engine 4 shown in FIG. 21. In other words, the point P1 determined from the engine rotation speed and the engine output torque, which are the travelling conditions of the engine 4 at this timing, becomes the preconditions when a first loop calculation (in this case, the calculation of the compressor 1 that becomes the first auxiliary) is performed and shows the state where the torque is not distributed to the compressor 1. The fuel consumption in the case where each required torque T is outputted to the compressor 1 can be found by the difference between the equi-fuel consumption curve of the point P2 and the equi-fuel consumption curve of the point P1.

In FIG. 22, a torque distribution part 64 next to the fuel consumption/torque estimation part 63 evaluates each required torque by an evaluation formula. This evaluation is made by calculating a calculation value of the evaluation formula on the basis of the mathematical formula 13 described below.

Evaluation formula calculation value=(engine required fuel consumption/torque−estimated fuel consumption/torque)×required torque (Mathematical formula 13)

In this way, the evaluation formula calculation value is found for each required torque of the plurality of request sets and then a request set of the required torque for which the evaluation formula calculation value becomes maximum is selected. A request set selected for distributing a given required torque to a corresponding auxiliary (in this case, the compressor 1 for which the calculation is performed earlier) is stored. Here, in the case where all of the evaluation formula calculation values are negative, the compressor 1 is not driven. In this case, it is evaluated that the efficiency of the engine 4 is so bad that the torque is not to be distributed to the compressor 1 and hence the distribution of the torque (output of the torque) to the alternator 55 that is the other auxiliary is also reduced to zero and the calculation is not performed in the next loop.

Next, the process proceeds to a determination part 65. The determination part 65 determines whether or not there remains an auxiliary for which the calculation of the estimated fuel consumption/torque and the calculation of the evaluation formula are not performed. In this case, there are two auxiliaries of the compressor 1 and the alternator 55 and the alternator 55 remains to be calculated. Thus, the result of determination in the determination part 65 corresponds to YES (there is an undistributed auxiliary) and hence the process returns to the torque generation determination part 62. In other words, the calculation is performed by changing the loop for each auxiliary. Thus, if there are three auxiliaries, the calculation is performed for three loops.

In the next loop, in the engine control device 38 receiving the plurality of request sets of required torque (τ) and engine required fuel consumption/torque (L/τ) from the alternator 55, which is a remaining auxiliary, the torque generation determination part 62 determines whether or not the torque can be generated for one request set for driving the alternator 55 on the basis of the state of the engine. When the engine control device 38 determines that the engine 4 cannot respond to any one of the plurality of request sets, the engine control device 38 stops driving the alternator 55. The case where the engine 4 cannot respond to any one of the plurality of request sets means, for example, the case where the accelerator pedal is depressed by a given amount or more to make an abrupt acceleration or to climb up the slope.

When it is determined that the engine 4 can generate the required torque (for example, the engine 4 is not in the state of the abrupt acceleration or the like), the fuel consumption/torque estimation part 63 estimates an estimated fuel consumption/torque for each required torque T of the respective request sets for which the engine 4 can generate the torque by the use of the mathematical formula described above. The estimated fuel consumption/torque is calculated by the number of the plurality of request sets from the alternator control device 55c.

Here, the calculation of the estimated fuel consumption/torque is performed by the use of the fuel consumption/torque characteristic map of the engine 4 shown in FIG. 21. In other words, the point P1 determined from the engine rotation speed and the engine output torque, which are the travelling conditions of the engine 4 at this timing, becomes the preconditions when a first loop calculation (in this case, the calculation of the compressor 1 that becomes the first auxiliary) is made and hence shows the state where the torque is not distributed to the compressor 1.

The fuel consumption in the case where each required torque T is outputted to the compressor 1 can be found by the difference between the equi-fuel consumption curve of the point P2 and the equi-fuel consumption curve of the point P1. The required torque to be distributed to the compressor 1 is determined in the first loop calculation (required torque to be distributed to the single compressor 1 for which the evaluation formula calculation value becomes a maximum value is selected), so that the torque at the point P3, which is the sum of the torque at the point P2 and the determined torque to be distributed to the compressor 1, becomes the basis at the time of performing the second loop calculation for determining the required torque of the alternator 55 (the point P2 becomes a prerequisite for the second loop calculation). Hence, the calculation of the estimated fuel consumption/torque is performed by reading the fuel consumption of the total torque at the point P3, which is the sum of the torque at the point P2 and the required torque for calculating the estimated fuel consumption/torque.

Hence, the estimated fuel consumption/torque of the alternator 55 becomes a value acquired by dividing ΔL by T. Here, ΔL is the difference between the estimated fuel consumption of the engine 4 in the case where the required torque T is outputted with the point P3 set as a basic point and the estimated fuel consumption of the engine 4 at the point P1 in the case where the required torque T is not outputted.

In FIG. 22, in the torque distribution part 64 next to the fuel consumption/torque estimation part 63 in the second loop calculation, the evaluation is made for each required torque by the use of the evaluation formula. In this evaluation, the evaluation formula calculation value is found for each required torque on the basis of the mathematical formula described above.

The evaluation formula calculation value is acquired by multiplying the difference between the engine required fuel consumption/torque and the estimated fuel consumption/torque by the required torque. In this way, the evaluation formula calculation value is found for each required torque of the plurality of request sets relating to the alternator 55 and then the request set for which the evaluation formula calculation value becomes a maximum value is selected. Then, the request set selected for distributing a given required torque to the corresponding auxiliary (in this case, alternator 55) is stored.

Here, in the case where all of the evaluation formula calculation values are negative, the alternator 55 and the compressor 1 are not driven. In this case, it is evaluated the state of the engine 4 is so bad that the torque is not to be distributed to the alternator 55, so that the torque to be distributed (torque to be outputted) to the compressor 1 of the auxiliary of the first loop is also reduced to zero (in this case, the result of the calculation of the first loop is eliminated).

In other words, that all of the evaluation formula calculation values are minus shows the state where the fuel consumption additionally consumed by the engine 4 when the engine 4 drives the auxiliary as required is larger than the fuel consumption which the auxiliary estimates and normally requires. When the auxiliary is controlled for the request in this state, the auxiliary is driven as required when the efficiency of the engine 4 is not good. Hence, in the case where all of the evaluation formula calculation values are minus, the torque of the auxiliary is virtually reduced to zero until the next calculation period.

Next, the process proceeds to the determination part 65. The determination part 65 determines whether or not there remains an auxiliary for which the calculation of the estimated fuel consumption/torque and the calculation of the evaluation formula are not performed. In this case, there are two auxiliaries of the compressor 1 and the alternator 55 and there remains no auxiliary for which the calculation of the evaluation formula is not yet performed, so that the process proceeds to a torque output part 66. Here, if there are three auxiliaries, a third loop calculation is performed.

The torque output part 66 transmits the information of an output torque to the control device of each auxiliary so as to distribute the required torque which is selected and stored to the corresponding auxiliary. In this case, the torque output part 66 transmits the information of the output torque to the air conditioning control device 5 for controlling the compressor 1 and to the alternator control device 55c (or voltage regulator) for controlling the alternator 55 by CAN communication or the like.

The air conditioning control device 5 receiving the information of the output torque controls the discharge volume of the compressor 1 so as to regulate the torque of the compressor 1 of a variable displacement type on the basis of the information (or, in an modified example, performs a duty control of turning on or off a clutch for coupling the engine 4 to the compressor 1 directly or via a compressor drive part 58). Further, the alternator control device 55c performs the duty control of the field current of the alternator 55 to regulate the output of the alternator 55, eventually, to regulate the output torque of the alternator 55 to the distributed amount of torque.

Figure 23:
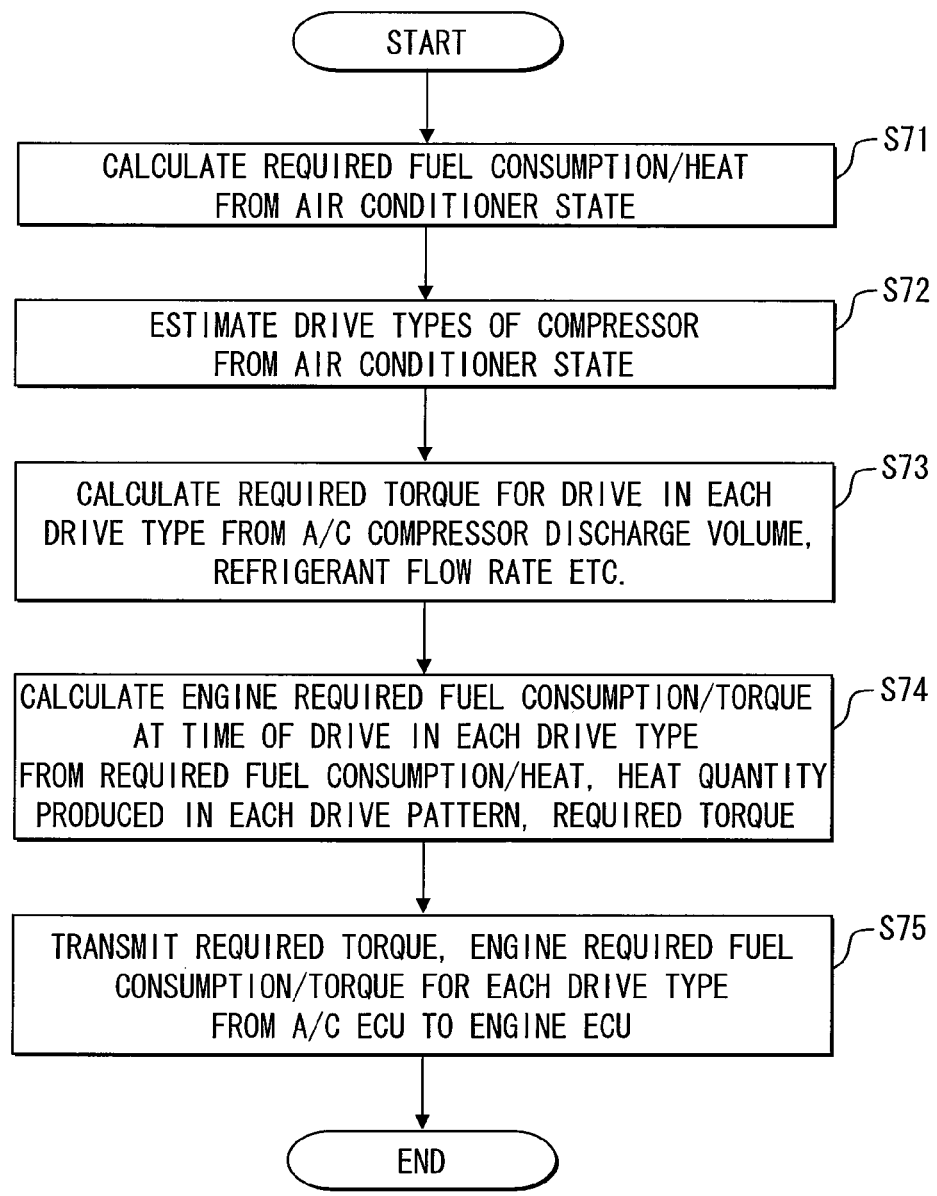
FIG. 23 is a flow chart to show a flow of control on an air conditioning control device side in the eighth embodiment.

Next, the flow of control of the compressor 1 will be described in more detail by the use of flow charts shown in FIG. 23 and FIG. 24. FIG. 23 is a flow chart to show control in the air conditioning control device 5 in the eighth embodiment. In step S71 shown in FIG. 23, the air conditioning control device 5 calculates the required fuel consumption/heat (L/Q) from an air-conditioning state. FIG. 20 described above is a characteristic map for calculating the required fuel consumption/heat (L/Q). As shown in FIG. 20, basically, as the amount of storage of cold energy of the cold energy storage unit 40 is more, the required fuel consumption/heat (L/Q) is set lower. Further, as the required heat quantity becomes larger (required heat quantity becomes larger as the target blowoff temperature TAO is lower, the outside air temperature is higher, or the set temperature is lower), the required fuel consumption/heat (L/Q) is corrected in such a way as to become higher. Still further, when the fuel consumption/heat for storing cold energy in the cold energy storage unit 40 is low in the past, that is, when the required fuel consumption/heat in the past is lower, the required fuel consumption/heat (L/Q) that is found is corrected in such a way as to become lower.

Next, in step S72 shown in FIG. 23, a plurality of drive types of the compressor 1 are estimated from the air conditioning state. In this estimation, the plurality of drive types capable of driving the compressor 1 are estimated on the basis of the state of the vehicular air conditioner 15 (set temperature Tset of the air conditioner, outside air temperature Tam of the air temperature outside the vehicle, discharge volume of the compressor 1, flow rate of the refrigerant (gas) in the refrigeration cycle, pressure of the refrigerant, temperature of fin of the evaporator 9 in the refrigeration cycle, and engine rotation speed or compressor rotation speed). As a result, a plurality of request sets are determined as the drive types. The request set includes a fixed value to show a required torque and a fixed value to show an engine required fuel consumption/torque. In other words, each of the plurality of request sets is the information of requiring this much of torque by this much of fuel consumption/torque. In this case, the estimation of the plurality of drive types is performed from the information at the present time. Here, the estimation of the plurality of drive types can be performed also from the information of predicting the traveling state or the like in the future, but a prediction control is not performed in this eighth embodiment.

It is only necessary that the estimated drive types, that is, the sets of required torque and engine required fuel consumption/torque, at least a drive type (1t) of increasing the discharge volume of the compressor 1 to increase a required torque and a drive type (2t) of decreasing the discharge volume of the compressor 1 to decrease a required torque are estimated. When the state of the vehicular air conditioner 15 is checked, it can be estimated how much the discharge volume of the compressor 1 is to be increased or decreased. For example, when an occupant gets in the vehicle in the summer and cools down the interior of the vehicle, the discharge volume of the compressor 1 needs to be quickly increased and hence the required torque of the estimated drive type (1t) abruptly becomes larger.

Next, in step S73, the air conditioning control device 5 calculates the required torque, which is the torque of the compressor 1 necessary for driving the compressor 1, for each of the plurality of estimated drive types. The calculation of the required torque can be made by various methods and, for example, as shown by the mathematical formula 14 described below, as a function of a compressor discharge volume, a refrigerant flow rate, a refrigerant pressure, a fin temperature of the evaporator, and an engine rotation speed (or a compressor rotation speed).

Required torque=$f$(compressor discharge volume, refrigerant flow rate, refrigerant pressure, fin temperature of the evaporator, engine rotation speed)     (Mathematical formula 14)

Next, in step S74, the engine required fuel consumption/torque (L/τ) is calculated from the required fuel consumption/heat (L/Q), the heat quantity produced in each drive type (Q), and the required torque (τ) by the use of the mathematical formula 15 described below.

Engine required fuel consumption/torque=required fuel consumption/heat×(heat quantity produced in drive type)/required torque     (Mathematical formula 15)

Here, this calculation is performed for each drive type and (heat quantity produced in drive type) means a heat quantity (amount of cold energy) produced in the refrigeration cycle of the vehicular air conditioner 15 when the compressor 1 is driven in the drive type for which the calculation is performed.

In step S75, the required torque (τ) and the engine required fuel consumption/torque (L/τ) of each drive type is transmitted to the engine control device 38. The required torque (τ) and the engine required fuel consumption/torque (L/τ) are of an information type in which the request of the vehicular air conditioner 15 can be easily understood in view of the engine 4 side (including the engine control device 38 side) and of an information type in which it is easily determined in the light of the state of the moment of the engine 4 whether or not the engine 4 can respond to the request.

Next, the flow of control of calculation in the first loop in the engine control device 38 will be described on the basis of FIG. 24. FIG. 24 is a flow chart to show the control of the engine control device 38 in the eighth embodiment. In step S81 shown in FIG. 24, the engine control device 38 receives the required torque (τ), which is torque necessary for driving the compressor 1, and the engine required fuel consumption/torque (L/τ), which is a fuel consumption per unit torque necessary for producing the torque, for each request set forming the drive type from the air conditioning control device 5.

Next, in step S82, the engine control device 38 determines whether or not the engine 4 can accept the requests of the respective required torques from the air conditioning control device 5 and can output the required torque of any one of the drive types.

For example, in the case where the vehicle runs on a flat road without a large acceleration and hence the engine 4 can accept the required torque for driving the compressor 1 (in the case where the vehicle is not in the state of a given abrupt acceleration or climbing up a slope), the process proceeds to step S83. On the other hand, the accelerator pedal is depressed by a given amount or more to make the vehicle bring into the state of a large acceleration or of climbing up the slope and hence the engine 4 cannot accept the required torque for driving the compressor 1, it is determined that step S82 is NO and the process proceeds to step S84. In step 84, the compressor 1 is stopped until the next calculation timing.

In step S83, the engine control device 38 calculates the estimated fuel consumption/torque in the case where the engine 4 outputs the required torque. This calculation is performed by the use of the characteristic map to show an equi-fuel consumption/torque curve shown in FIG. 21. In FIG. 21, the characteristic map to show an equi-fuel consumption/torque curve has the rotation speed of the engine 4 as the horizontal axis and the output torque of the engine 4 as the vertical axis.

The point P1 shown in FIG. 21 shows an estimated fuel consumption when the required torque for driving the compressor 1 is not accepted and hence the required torque is not outputted. The point P2 shows an estimated fuel consumption of the engine 4 when the required torque for driving the compressor 1 is accepted and the required torque is outputted. Here, when the point P1 moves to the point P2 in one example shown in FIG. 21, the fuel consumption/torque becomes more efficient, but it is not always true that when the point P1 moves to the point P2, the fuel consumption/torque become more efficient.

Figure 24:
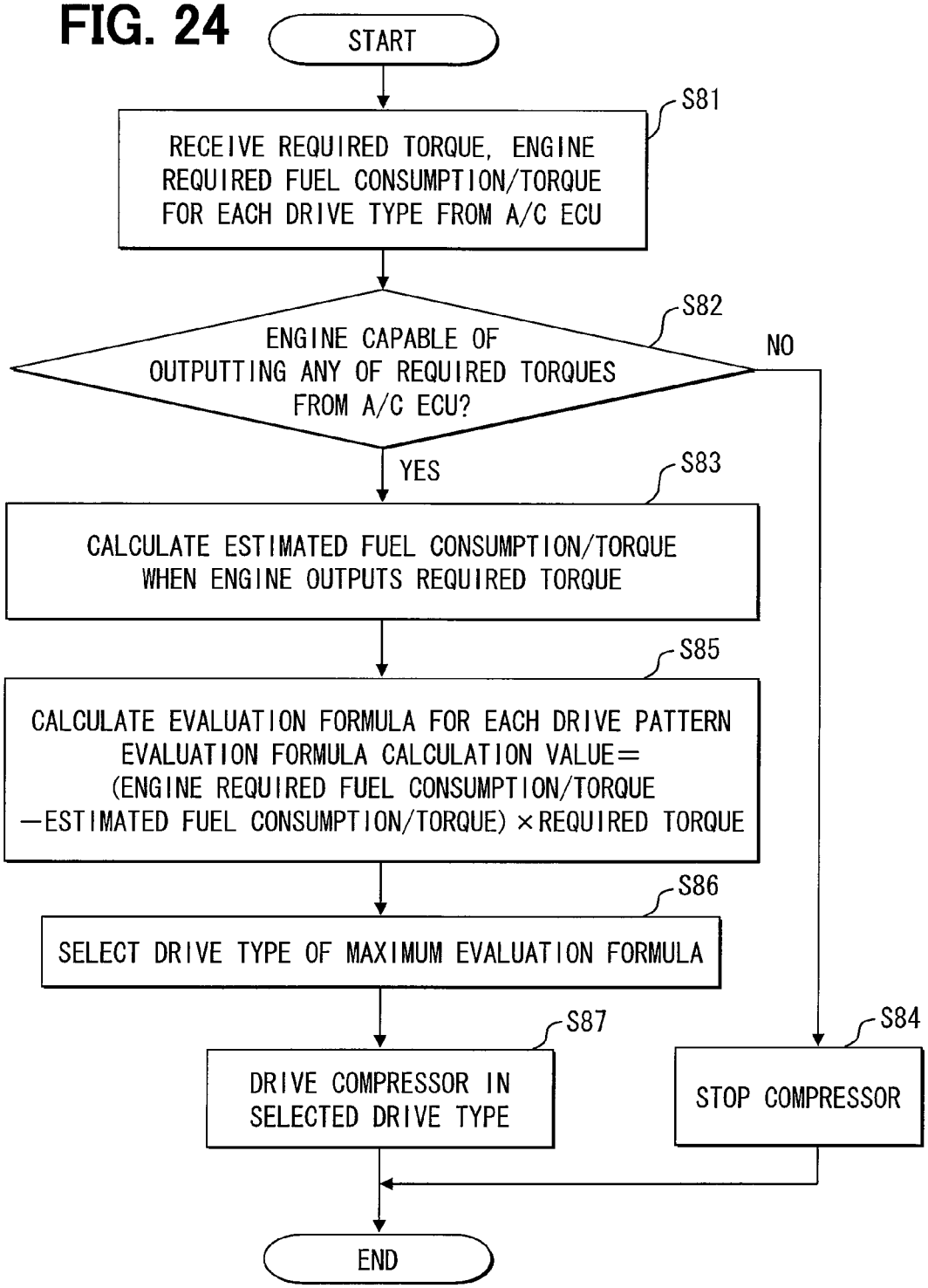
FIG. 24 is a flow chart to show a flow of control on an engine control device side in the eighth embodiment.

The estimated fuel consumption/torque in step S83 shown in FIG. 24 can be found as a value acquired by dividing "the difference between the estimated fuel consumption of the engine 4 when the required torque is outputted (unit or dimension is L) and the estimated fuel consumption of the engine 4 when the required torque is not outputted" by the required torque T by the use of the mathematical formula described above.

This estimated fuel consumption/torque is calculated on the basis of: the estimated fuel consumption estimated to be consumed by the engine 4 in the case where the required torque from the air conditioning control device 5 is accepted and the engine 4 is driven; the estimated fuel consumption estimated to be consumed by the engine 4 in the case where the required torque from the air conditioning device 5 is not accepted and the engine 4 is driven; and the required torque from the air conditioning control device 5. That is, the estimated fuel consumption/torque relates to "the fuel consumption additionally consumed by the engine 4 at the time of responding to the required torque" per unit required torque.

Next, in step S85 shown in FIG. 24, the evaluation formula is calculated for each drive type. The calculation of the evaluation formula is performed by finding an evaluation formula calculation value of the mathematical formula described above. The evaluation formula calculation value is found by multiplying the difference between the engine required fuel consumption/torque and the estimated fuel consumption/torque by the required torque.

The evaluation formula is a value acquired by subtracting the fuel consumption required by the engine 4 for each drive type, which is estimated to be additionally consumed by the engine 4 side when the engine 4 responds to the required torque, from the fuel consumption required by the compressor 1 for each drive type which is estimated by the air conditioner side in terms of the information in the air conditioner.

The evaluation formula shows that the larger the evaluation formula calculation value becomes, the more efficiently the engine 4 can drive the compressor 1.

Here, in step S85, in the case where the estimated fuel consumption/torque is smaller than the engine required fuel consumption/torque, the evaluation formula calculation value may be made a value acquired by multiplying the estimated fuel consumption/torque by the required torque. In this case, a drive pattern is selected in which the necessary amount of energy (engine output) becomes maximum.

Next, in step S86, a drive type in which the evaluation formula calculation value becomes maximum is selected and, in step S87, the compressor 1 is driven in the selected drive type.

In this regard, that the evaluation formula calculation value becomes minus shows the state in which the fuel consumption additionally consumed by the engine 4 when the engine 4 drives the compressor 1 as required is larger than the fuel consumption required by the compressor 1, which is estimated by the vehicular air conditioner 15 side. When the compressor 1 is controlled in the drive type of this state, there is brought about a state in which the engine 4 drives the compressor 1 as required when the efficiency of the engine 4 is not good. Hence, in the case where the evaluation formula calculation value becomes minus, the compressor 1 is stopped until the next calculation period.

Here, the fuel consumption/torque of the engine required fuel consumption/torque (L/τ) in the present disclosure shows a value acquired by dividing the fuel consumption required for producing a given torque by the value of the given torque to be produced. In other words, the fuel consumption/torque of the engine required fuel consumption/torque (L/τ) in the present disclosure means the fuel consumption per unit torque and hence is different from an ordinary fuel consumption in terms of "a fuel consumption rate to show a mileage per a unit amount of fuel". The fuel consumption/torque in terms of engine required fuel consumption/torque (L/τ) may be understood as the efficiency of producing torque.

Further, in the case of the alternator 55, in a flow chart similar to FIG. 23 and FIG. 24, a set of the required torque of the alternator 55 and the engine required fuel consumption/torque is transmitted to the engine control device 38 as shown in FIG. 22. In this case, when describing by the use of FIG. 23, the required fuel consumption/electricity generated (L/Kwh) is calculated by the use of a map from the states of the alternator 55 and the battery. This required fuel consumption/electricity generated (L/Kwh) is a standard (reference) fuel consumption estimated to be required for generating unit electricity.

According to step S71 shown in FIG. 23 or to FIG. 20, a required fuel consumption/electricity generated (L/Kwh) that is estimated to be required for generating unit electricity is calculated by the map.

The required fuel consumption/electricity generated (L/Kwh) corresponding to the required fuel consumption/torque is a reference fuel consumption estimated to be required for generating a given amount of electricity. Hence, the required fuel consumption/electricity generated (L/Kwh) can also be referred to as a reciprocal number of the efficiency of generating electricity and can be basically found from the remaining amount of electricity of the battery (which corresponds to the amount of storage of cold energy shown in FIG. 20) and may be corrected according to the voltage of the battery, the temperature around the alternator 55, and the conditions of the main electric load.

Further, as the remaining amount of electricity of the battery is more, when the efficiency of the engine 4 is better, the alternator 55 can be driven to charge the battery with electricity, so that the required fuel consumption/electricity generated (L/Kwh) that can be referred to as a reciprocal number of the efficiency of generating electricity of the alternator 55 becomes small. Hence, in the case where the required fuel consumption/electricity generated (L/Kwh) is found from the map, the amount of storage of cold energy shown in FIG. 20 can be replaced by the remaining amount of electricity of the battery or a battery SOC and hence FIG. 15 can be used. When the required fuel consumption/electricity generated (L/Kwh) in the past is low, the required fuel consumption/electricity generated (L/Kwh) to be calculated may be corrected in such a way as to become lower. Further, in the situations in which an abrupt increase in the electricity generated is required according to an increase in the electric load in the vehicle, even if the efficiency is bad, the electricity needs to be generated and hence the required fuel consumption/electricity generated (L/Kwh) may be corrected in such a way as to become higher.

Next, according to step S72 shown in FIG. 23 or to the drive type estimation part 52 shown in FIG. 19, a plurality of drive types of the alternator 55 are estimated from the electric load in the vehicle and the state of the battery. In this estimation, the plurality of drive types capable of driving the alternator 55 are estimated on the basis of the state of the alternator 55 (situations of the electric load, battery voltage, temperature around the alternator 55, battery temperature, and engine rotation speed or alternator rotation speed). In this case, the plurality of drive types are estimated from the information at the present time. In this regard, the plurality of drive types can be estimated also from the information of predicting the traveling state in the future but a prediction control is not performed in the eighth embodiment.

It is only necessary that at least a drive type (U) of increasing the output of the alternator 55 to increase torque and a drive type (D) of decreasing the output of the alternator 55 to decrease the torque are estimated as the estimated drive type.

When checking the states of the electric load and the battery, it can be estimated how much the output of the alternator 55 is to be increased or decreased in the next step. For example, when a wiper switch is turned on or a heater switch is turned on, a quick increase in the output of the alternator 55 is required and hence a plurality of drive types (U) capable of quickly increasing the torque are estimated.

Next, according to step S73 shown in FIG. 23, the alternator control device 55c calculates a required torque that is the torque of the alternator 55 necessary for driving the alternator 55 in each of the plurality of estimated drive types. The calculation of the required torque can be performed by various methods and, for example, can be calculated as a function of alternator output (Kw) in the drive type, output voltage, output current, temperature around the alternator, engine rotation speed, and alternator rotation speed.

Next, according to step S74, the engine required fuel consumption/torque (L/τ) when the engine 4 is driven in each drive type is calculated from the required fuel consumption/electricity generated (L/Kwh), the electricity generated in each drive type (Kwh), and the required torque (τ) by the use of the mathematical formula 16 described below.

Engine required fuel consumption/torque=the required fuel consumption/electricity generated×(electricity generated in drive type)/required torque    (Mathematical formula 16)

Here, this calculation is performed for each drive type and (the electricity generated in drive type) means the electricity generated in a given time (an interval from a calculation to the next calculation) by the alternator 55 when the alternator 55 is driven in the drive type for which the calculation is performed.

According to step S75, a plurality of request sets of the required torque (τ) and the engine required fuel consumption/torque (L/τ) of each drive type are transmitted to the engine control device 38. The required torque (τ) and the engine required fuel consumption/torque (L/τ) of these request sets are of an information type in which the requests of the alternator 55 can be easily understood in view of the engine 4 side (including the engine control device 38 side) and of an information type having a dimension in which the engine 4 side can easily determine whether or not the engine 4 can respond to the requests in the light of the situations at the moment.

Next, the flow of calculation control for the alternator 55 in the second loop in the engine control device 38 will be described with reference to FIG. 24. According to step S81 shown in FIG. 24, the engine control device 38 receives the required torque (τ) that is torque necessary for driving the alternator 55 and the engine required fuel consumption/torque (L/τ) that is a fuel consumption per unit torque necessary for producing the torque for each request set of the drive type from the alternator 55. Next, in step S82, the engine control device 38 determines whether or not the engine 4 is in the state where the engine 4 can accept the request of the required torque of each of the drive types from the alternator 55 and can output the required torque of any one of the drive types.

For example, in the case where the vehicle runs on a flat road without a large acceleration and hence the engine 4 is in the state where the engine 4 can accept the required torque for driving the alternator 55 (that is, in the case where the engine 4 is not in the state of an abrupt acceleration or climbing up a slope), step S83 is performed. On the other hand, in the case where the accelerator pedal is depressed by a given amount or more to bring the engine 4 into the state of a large acceleration or climbing up the slope and hence the engine 4 is in the state where the engine 4 cannot accept the required torque for driving the alternator 55, that is, in the case where it is determined that the answer of step S82 is No, according to step S84, the field current of the alternator 55 is reduced to zero until the next calculation timing or an output current is intercepted and reduced to zero. Alternatively, the clutch between the alternator 55 and the engine 4 may be brought into an uncoupled state, thereby being prevented from transmitting power.

Next, according to step S83, the estimated fuel consumption/torque in the case where the engine 4 outputs the required torque of the alternator 55 is calculated. This calculation is performed by the use of the characteristic map showing the equi-fuel consumption/torque curve of the engine 4 as shown in FIG. 21. In FIG. 21, the characteristic map showing the equi-fuel consumption/torque curve has the rotation speed of the engine 4 on the horizontal axis and has the output torque of the engine 4 on the vertical axis.

The point P1 shown in FIG. 21 shows the estimated fuel consumption of the engine 4 when the engine 4 does not accept a required torque for driving an auxiliary and hence does not output the required torque. The point P2 shows the estimated fuel consumption of the engine 4 when the engine 4 accepts a required torque for driving the compressor under the same traveling conditions of the vehicle as the point P1 and hence outputs the required torque. Hence, the reading of the fuel consumption relating to the alternator 55 starts from the point P2.

The estimated fuel consumption/torque is found as a value acquired by dividing the difference between the estimated fuel consumption of the engine 4 when the engine 4 outputs the required torque relating to the alternator 55 (fuel consumption at the point P3 whose unit is litter) and the estimated fuel consumption when the engine 4 does not output the required torque relating to the alternator 55 (fuel consumption at the point P2) by the required torque T(τ).

This estimated fuel consumption/torque can be calculated on the basis of: the estimated fuel consumption estimated to be consumed by the engine 4 in the case where the required torque from the alternator 55 is accepted and the engine 4 is driven; the estimated fuel consumption estimated to be consumed by the engine 4 in the case where the required torque from the alternator 55 is not accepted and the engine 4 is driven; and the required torque from the alternator 55. Hence, the estimated fuel consumption/torque expresses "the fuel consumption additionally consumed by the engine 4 when the engine 4 responds to the required torque from the alternator 55" per unit required torque.

Next, according to step S85 shown in FIG. 24, the evaluation formula is calculated for each drive type. The calculation of this evaluation formula is performed by finding the evaluation formula calculation value of the mathematical formula described above, and the evaluation formula calculation value can be found by multiplying the difference between the engine required fuel consumption/torque and the estimated fuel consumption/torque by the required torque.

The evaluation formula relates to a value acquired by subtracting (a fuel consumption per unit torque required by the engine 4 for the respective drive types), which is estimated to be additionally consumed by the engine 4 when the engine 4 accepts the required torque, from a standard fuel consumption per unit torque required by the alternator 55 for each drive type, which is estimated by the alternator 55 in terms of information relating to the alternator 55. Hence, this evaluation formula shows that the larger the evaluation formula calculation value is, the more efficiently the engine 4 can drive the alternator 55. Next, according to step S86, a drive type in which the evaluation formula calculation value becomes maximum is selected. Further, according to step S87, the alternator 55 is driven in the selected drive type.

In this regard, that the evaluation formula calculation value becomes minus shows the state in which the fuel consumption additionally consumed by the engine 4 when the engine 4 drives the alternator 55 as required is larger than a standard (reference) fuel consumption required by the alternator 55, which is estimated by the alternator 55 side. When the alternator 55 is controlled in the drive type of this state, there is brought about a state in which the engine 4 drives the alternator 55 as required when the efficiency of the engine 4 is not good. Hence, in the case where the evaluation formula calculation value becomes minus, the field current of the alternator 55 is reduced to zero or an output current is intercepted until the next calculation period.

Hereinafter, effects in the eighth embodiment will be described. The fuel consumption/torque characteristic of the engine is not linear, so that the fuel consumption/torque is changed according to torque used for the auxiliary. In other words, the fuel consumption/torque consumed by the engine for producing a given torque is changed according to the operating state of the auxiliary. In an ordinary engine control device, when the fuel consumption/torque information of the engine is reported to an auxiliary control device such as an air conditioning control device, the operating states of all auxiliaries corresponding to the fuel consumption/torque information to be reported are not thought nor comprehended.

Figure 33:
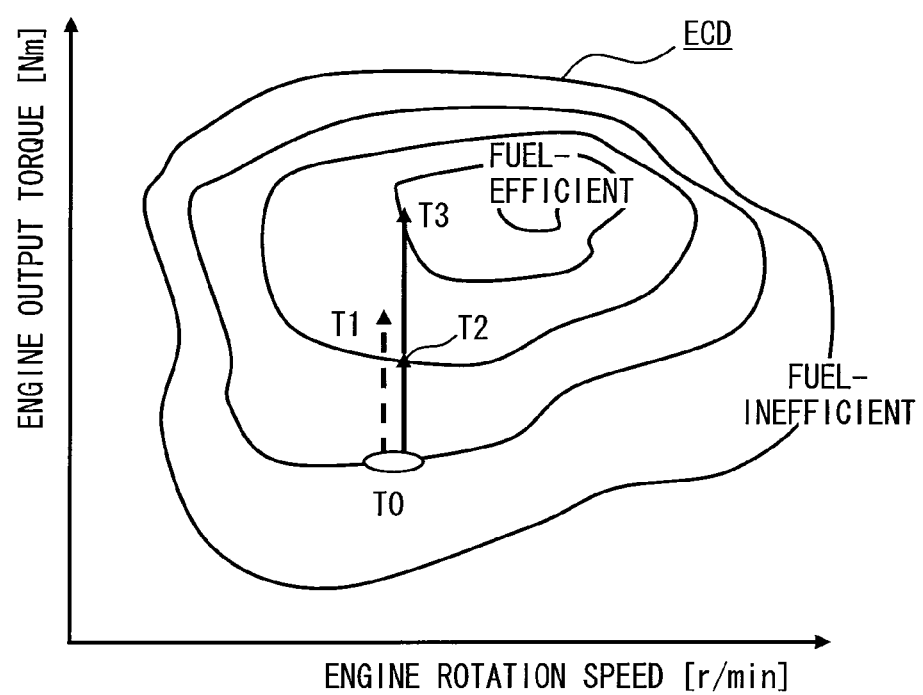
FIG. 33 is a characteristic map of an equi-fuel consumption/torque curve of an engine to illustrate an issue in the conventional technology.

Hence, there is the possibility that the reported fuel consumption/torque information does not estimate correct fuel consumption/torque information for controlling the compressor and the other auxiliaries in a comprehensive manner. FIG. 33 is an equi-fuel consumption/torque characteristic map of an engine to illustrate an issue in the conventional technology. For example, in the case where in FIG. 33, an alternator is taken as an example of an auxiliary other than a compressor, when the state in which an engine is rotated in the state where neither the alternator nor the compressor applies load to the engine, that is, the state in which the engine neither outputs torque to the alternator nor to the compressor is assumed to be T0, a change in the fuel consumption/torque when the engine is rotated in the state where only the compressor applies load to the engine, that is, a change in the fuel consumption/torque when the engine outputs torque only to the compressor can be calculated as a change from T0 to T1.

However, not only the compressor but also the alternator is actually rotated. For this reason, a change in the actual fuel consumption/torque becomes a change from T0 to T3. A change from T0 to T3 is the addition of a change from T0 to T2 and a change from T2 to T3. The change from T0 to T2 is a change in the fuel consumption/torque caused by outputting torque to the alternator. Further, the change from T2 to T3 is a change in the fuel consumption/torque caused by outputting torque only to the compressor. In other words, even if the outputting of torque to the compressor is not changed, depending on whether or not torque is outputted to the alternator, the fuel consumption/torque required for producing the torque to the compressor is actually changed.

However, in the eighth embodiment, the signals (required torque, engine required fuel consumption/torque) transmitted to the engine control device 38 from the air conditioning control device 5 and the signals (required torque, engine required fuel consumption/torque) transmitted to the engine control device 38 from the alternator control device 55c are of the same type. For this reason, a cooperative control of optimizing a fuel consumption/torque between all auxiliaries and the engine can be easily realized so as to distribute the torque of the engine on the basis of not an efficiency for a given amount of work such as a cold energy generation efficiency of the vehicular air conditioner but a required torque unified between the air conditioning control device 5 and the alternator control device 55c.

Ninth Embodiment

Next, a ninth embodiment will be described. Here, in the respective embodiments described below, the same constituent element as in the eight embodiment described above are denoted by the same reference signs and their descriptions will be omitted and different elements and features will be described. In the case where the number of requests from the plurality of auxiliaries is small, in the ninth embodiment described below, all combinations can be exhaustively evaluated, so that the ninth embodiment described below is recommended.

Figure 25:
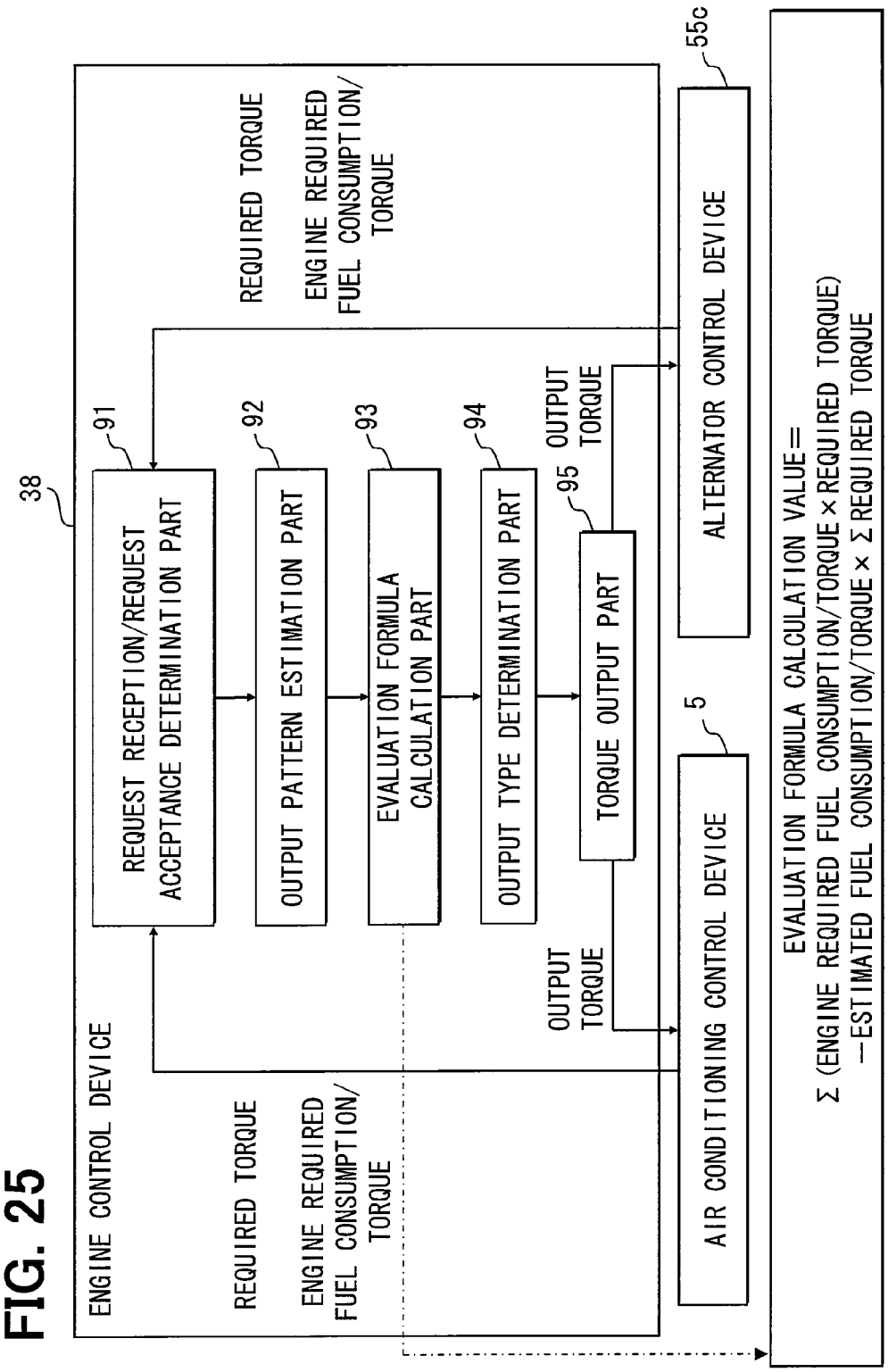
FIG. 25 is a block diagram to show a general construction of a ninth embodiment.

FIG. 25 is a block diagram to show the general construction of the ninth embodiment. In FIG. 25, a request reception/request acceptance determination part 91 receives requests (request sets of the required torque and the engine required fuel consumption/torque) from the air conditioning control device 5 and the alternator control device 55c which are control devices of respective auxiliaries. For example, the request reception/request acceptance determination part 91 receives a request A1 (=a request set of required torque A1 and engine required fuel consumption/torque A1) and a request A2 (=a request set of required torque A2 and engine required fuel consumption/torque A2) from the air conditioning control device for controlling the compressor 1 of an auxiliary A (also referred to as a compressor side). Further, the request reception/request acceptance determination part 91 receives a request B1 (=a request set of required torque B1 and engine required fuel consumption/torque B1) and a request B2 (=a request set of required torque B2 and engine required fuel consumption/torque B2) from the alternator 55 side of an auxiliary B.

Next, in the case where it is determined that the engine 4 is not in the state of a given abrupt acceleration or more and that the respective requests can be accepted, an output pattern estimation part 92 exhaustively estimates output types to show a group of required torques, into which the required torques to all auxiliaries are collected, as shown by the mathematical formula 17 described below.

Output type="output to first auxiliary, output to second auxiliary, . . . output to N-th auxiliary" (Mathematical formula 17)

The output pattern estimation part 92 exhaustively estimates output types of the acceptable required torques to all auxiliaries, for example, in the manner described below.

Output type 1: "required torque A1, required torque B1"
Output type 2: "required torque A1, required torque B2"
Output type 3: "required torque A2, required torque B1"
Output type 4: "required torque A2, required torque B2"
Output type 5: "required torque A1, 0"
Output type 6: "required torque A2, 0"
Output type 7: "0, required torque B1"
Output type 8: "0, required torque B2"

Next, an evaluation formula calculation part 93 calculates an evaluation formula calculation value according to the mathematical formula 18 described below for each of the output types.

Evaluation formula calculation value=$\Sigma$(engine required fuel consumption/torque×required torque)−estimated fuel consumption/torque× $\Sigma$required torque (Mathematical formula 18)

Here, the estimated fuel consumption/torque is calculated according to the mathematical formula 19 described below.

Estimated fuel consumption/torque=$\Delta Lp/Tp$ (Mathematical formula 19)

Here, $\Delta Lp$ is a difference between an estimated fuel consumption of the engine 4 when a torque Tp determined by an output type (the sum of all torques of the auxiliaries) is outputted and an estimated fuel consumption/torque of the engine 4 when the torque Tp is not outputted.

Figure 26:
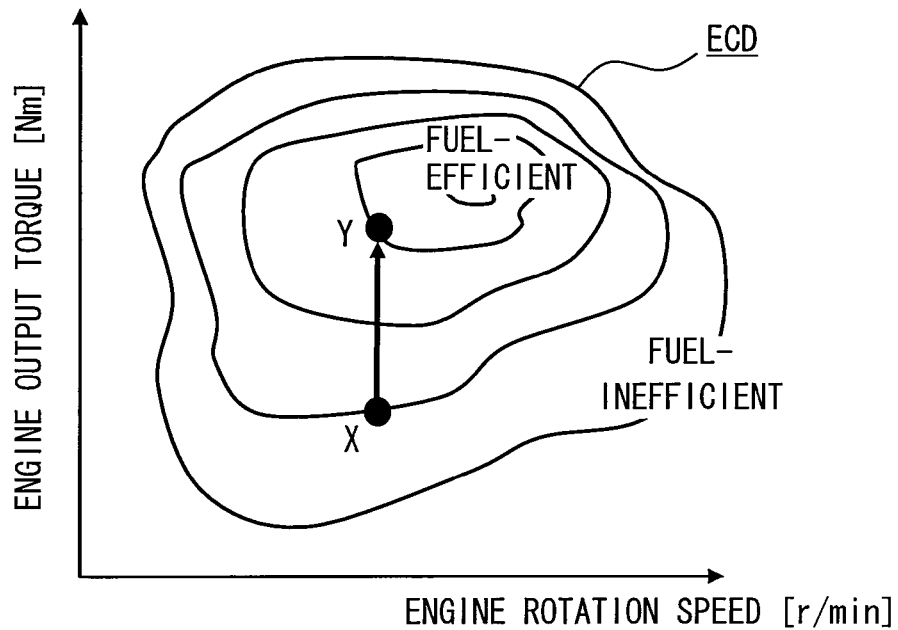
FIG. 26 is a characteristic map for illustrating a change in a fuel consumption of the engine from when an auxiliary is not driven to when the auxiliary is driven in the ninth embodiment.

FIG. 26 is a characteristic map to illustrate a change in the fuel consumption of the engine 4 from when the auxiliary is not driven to when the auxiliary is driven in the ninth embodiment. Here, the estimated fuel consumption is calculated by the use of an equi-fuel consumption/torque characteristic map of the engine 4 shown in FIG. 26. In other words, a point Y determined by an engine rotation speed and an engine output torque, which are traveling conditions of the engine 4 at this time, shows an estimated fuel consumption of the engine 4 when a torque Tp of a given output type is outputted. Then, a point X shows an estimated fuel consumption of the engine 4 when the torque Tp of the given output type is not outputted (that is, when the torques of all auxiliaries are zero).

For example: in the case of the output type 1 of (required torque A1, required torque B1)

Estimated fuel consumption/torque 1=(estimated fuel consumption of engine 4 when engine 4 outputs torques(required torque $A1$+required torque $B1$) to auxiliaries−estimated fuel consumption of engine 4 when engine 4 does not output the torques to auxiliaries)/(torque $A1$+torque $B1$)

Evaluation formula=(engine required fuel consumption/torque A1×required torque A1+engine required fuel consumption/torque B1×required torque B1)−estimated fuel consumption/torque× (required torque A1+required torque B1)

Further, for example: in the case of the output type 2 of (required torque A1, required torque B2)

Estimated fuel consumption/torque 2=(estimated fuel consumption of engine 4 when engine 4 outputs torques(required torque A1+required torque B2) to auxiliaries−estimated fuel consumption of engine 4 when engine 4 does not output the torques to auxiliaries)/(torque A1+torque B2)

Evaluation formula=(engine required fuel consumption/torque A1×required torque A1+engine required fuel consumption/torque B2×required torque B2)−estimated fuel consumption/torque× (required torque A1+required torque B2)

In this way, evaluation formula calculation values are found for all output types from the output type 1 to the output type 8. Further, an output type determination part 94 shown in FIG. 25 selects an output type in which an evaluation formula calculation value becomes a maximum value. The selected output type is transmitted to the control devices of the respective auxiliaries from a torque output part 95.

Here, in the case where all evaluation formula calculation values are minus, a type of "0, 0" is selected as an output type. In the case where the type of "0, 0" is selected as the output type, the air conditioning control device 5 substantially stops driving the compressor 1 to thereby reduce the discharge volume of the compressor 1 to zero or a minimum volume. Further, the alternator control device 55c reduces the field current of the alternator 55 to zero or intercepts the output current of the alternator 55 to thereby bring the alternator 55 into the state of no load. Alternatively, the alternator control device 55c may stop driving the alternator 55 by a clutch.

Here, in the case of the alternator 55, the output current of the alternator 55 is controlled according to output torque information outputted from the torque output part 95. In this way, the output (P=τ×ω) of the alternator 55 is controlled, where ω is an angular speed at which the alternator 55 is rotated.

Tenth Embodiment

Figure 27:
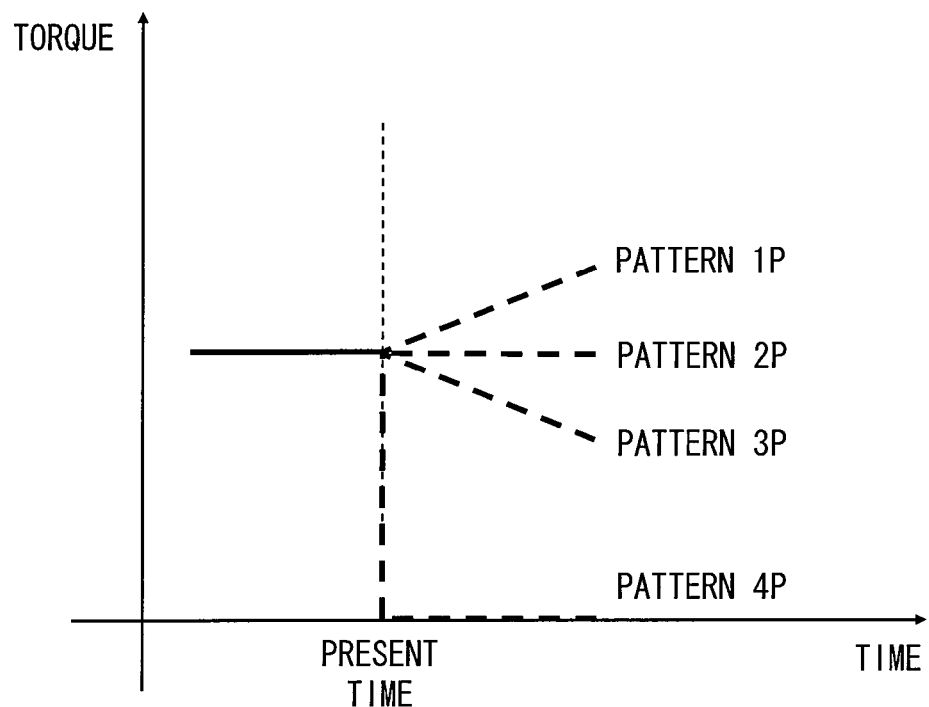
FIG. 27 is an illustration to show an example of a pattern that is a type of a required torque in a tenth embodiment.

Next, a tenth embodiment will be described. Featured parts different from the embodiments described above will be described. In the eighth embodiment and the ninth embodiment, the required torque is a fixed number (fixed value). However, in the case where it is possible to respond to an increased amount of calculation, the required torque may be not a fixed value but a variable (a pattern having a given waveform) for a given period (an interval of calculation in the case of performing calculation repeatedly). FIG. 27 shows a pattern example of a drive type in the tenth embodiment. In FIG. 27, four estimated drive types will be shown as a pattern 1P to a pattern 4P.

It is only necessary that at least the pattern 1P of increasing torque and a pattern 3P of decreasing torque can be estimated as the drive types. By checking the states of the vehicular air conditioning control device 15 and the alternator 55, it can be easily estimated how much angle of pattern is to be selected so as to increase or decrease torque. For example, in the case of compressor 1, when the occupant gets in the vehicle in summer and cools down the temperature in the vehicle compartment, a rapid increase in the discharge volume of the compressor is required, so that the estimated pattern 1P rises diagonally right up at a steep angle.

Here, in FIG. 27, a drive type within a given period of time in the future is supposed on the basis of information at the present time. The pattern 1P is a pattern of increasing a required torque to the maximum, the pattern 2P is a pattern of keeping a present required torque, the pattern 3P is a pattern of decreasing the torque to the minimum, and the pattern 4P is a pattern of reducing the torque to zero. Here, the maximum of the pattern 1P and the minimum of the pattern 3P (that is, inclined angles of the patterns) may be not fixed values but may be changed according to the traveling state of the vehicle and the engine rotation speed.

Eleventh Embodiment

Figure 28:
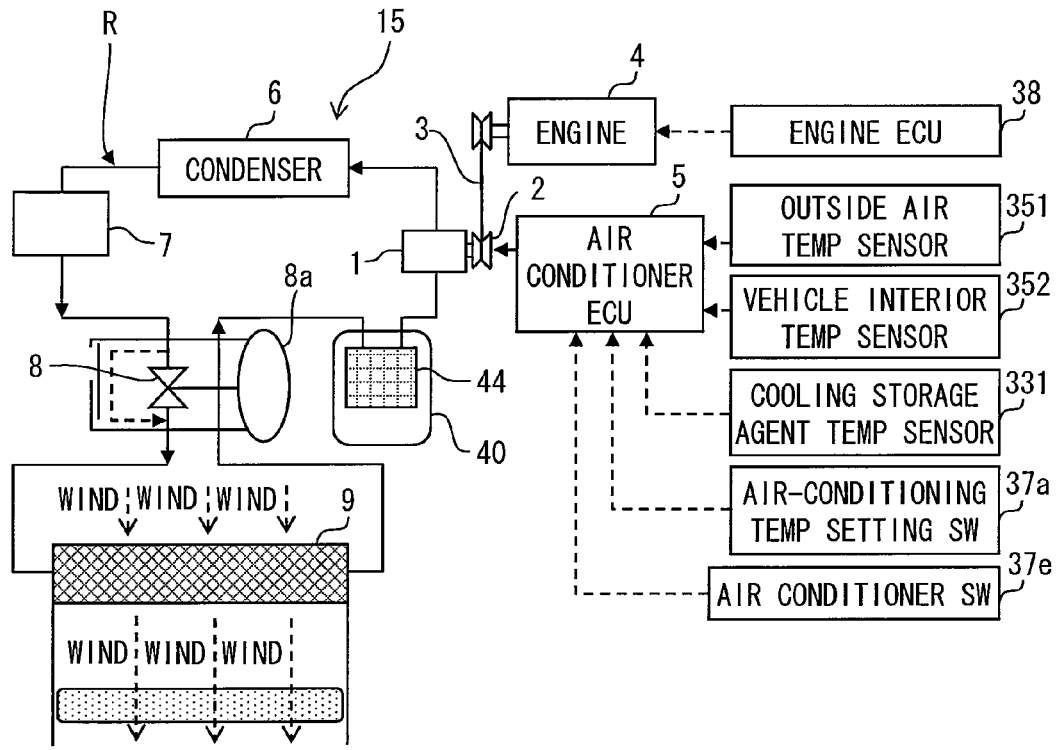
FIG. 28 is a construction diagram of a vehicular air conditioner used in an eleventh embodiment.

Next, an eleventh embodiment will be described. Featured parts different from the embodiments described above will be described. In the eighth embodiment, the cold energy storage unit 40 is cooled by the air-conditioned air but the cold energy storage unit 40 may be disposed in the refrigerant circuit as described in patent document 2. Hereinafter, this will be described. FIG. 28 is a construction diagram of a vehicular air conditioner 15 used for the eleventh embodiment.

In FIG. 28, the refrigeration cycle R is constructed of a path of: discharge port of the compressor 1→condenser 6→liquid reservoir 7→expansion valve 8→evaporator 9 forming the heat exchanger in the vehicle compartment→cold energy storage unit 40→suction port of the compressor 1, where these parts are coupled to each other by refrigerant piping in such a way that the refrigerant is circulated.

Like this eleventh embodiment, it is also recommended that the cold energy storage unit 40 having the cold energy storing agent 44 is disposed in the refrigerant circuit having the heat exchanger (evaporator) 9 and that the refrigerant passing through the cold energy storage unit 40 cools the interior of the compartment via the heat exchanger 9 and that the fuel consumption/heat (L/Q) shown in FIG. 20 is set mainly on the basis of the amount of storage of cold energy of the cold energy storage unit 40.

The cold energy storing agent 44 is disposed in the cold energy storage unit 40 and the refrigerant, which flows out of the evaporator 9 while the compressor 1 is operated, flows into the cold energy storage unit 40 to exchange heat with the cold energy storing agent 44, whereby the cold energy of the refrigerant is stored in the cold energy storing agent 44. The refrigerant, which exchanges heat with the cold energy storing agent 44 in the cold energy storage unit 40 and hence has its temperature increased, flows out of the cold energy storage unit 40 and is sucked by the compressor 1.

Here, a reference numeral 38 denotes an engine control device (engine ECU), 351 denotes an outside air temperature sensor, 352 denotes a vehicle compartment temperature sensor, and 331 denotes a cold energy storing agent temperature sensor for detecting the temperature of the cold energy storing agent 44 in the cold energy storage unit 40. A reference numeral 37a denotes an air conditioning temperature setting switch and 37e denotes an air conditioning switch.

Twelfth Embodiment

Next, a twelfth embodiment will be described. Featured parts different from the embodiments described above will be described. In FIG. 27, the number of patterns of the required torque that can be selected is reduced. However, if the calculation can be performed at a high speed, the number of patterns of the required torque that can be selected may be increased.

Figure 29:
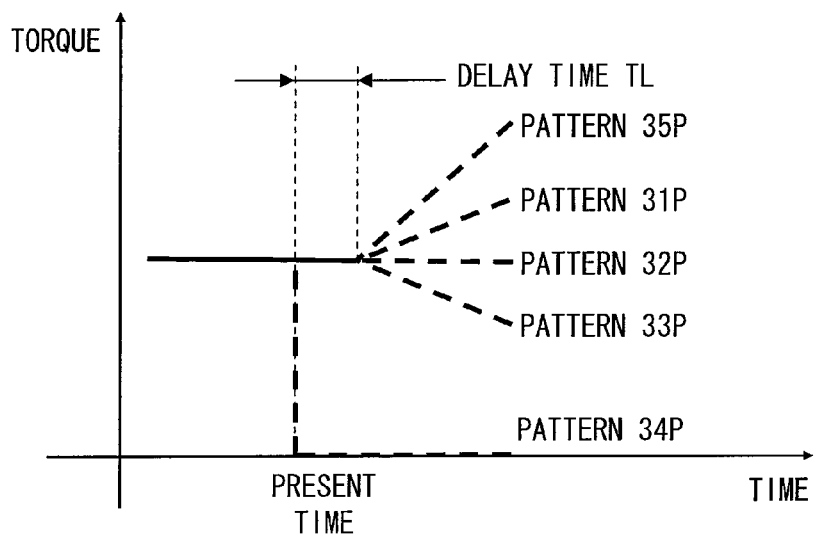
FIG. 29 is an illustration to show an example of a pattern of a required torque to show a twelfth embodiment.

FIG. 29 illustrates drive types to show the twelfth embodiment. In FIG. 29, a delay time TL may be set so as to perform patterns 31P to 33P. The delay time TL may be a variable according to the rotation speed of the engine 4 or the like. Further, as shown by a pattern 35P, an inclined angle (gradient) at which torque is increased may be set larger than the pattern 31P. A pattern 34P is a pattern to stop the compressor 1.

Thirteenth Embodiment

Next, a thirteenth embodiment will be described. Featured parts different from the embodiments described above will be described. An amount-of-work change coefficient P, which is a numerical value to be arbitrarily selected, may be set as a value having an effect on the drivability of the vehicle or the life of an auxiliary such as the compressor 1, and as the amount-of-work change coefficient P is larger, the amount of work per a given period of the compressor 1 or the like may be reduced.

According to this, it is possible to provide a vehicle control system in which an emphasis is arbitrarily selectively placed on the drivability of the vehicle, the life of the auxiliary such as the compressor 1, or an improvement in the fuel consumption rate. A trade-off between the drivability and the fuel consumption rate can be optimized. For example, when an emphasis is placed on an improvement in the drivability of the vehicle and the life of the auxiliary such as the compressor 1, it is recommended that the amount-of-work change coefficient P is increased to thereby reduce the amount of work of the auxiliary such as the compressor 1.

Figure 30:
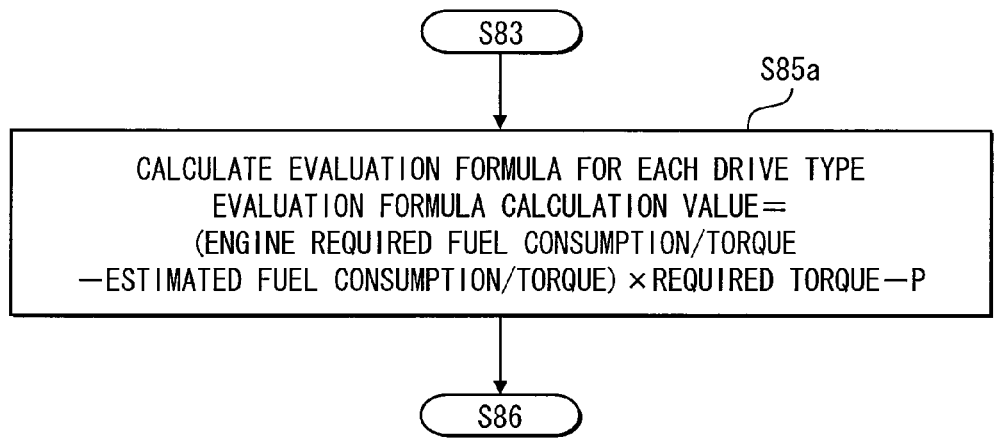
FIG. 30 is a portion of a flow chart to show a portion changed in FIG. 24 used in a thirteenth embodiment.

FIG. 30 is a part of a flow chart shown in FIG. 24 used in the thirteenth embodiment. It is also recommended that an evaluation formula calculation value is calculated for each drive type by the use of FIG. 30 and the mathematical formula 20 shown below and that as the amount-of-work change coefficient P is larger, the chances when the compressor 1 is stopped are reduced to thereby reduce the amount of work of the compressor 1.

Evaluation formula calculation value=(engine required fuel consumption/torque−estimated fuel consumption/torque)×required torque−amount-of-work change coefficient $P$     (Mathematical formula 20)

According to this, when the amount-of-work change coefficient P is set, all of the evaluation formula calculation values become minus and hence the chances when the auxiliary is stopped are increased. Thus, the trade-off between the drivability or the life of the auxiliary (the compressor 1 or the alternator 55) and an improvement in the fuel consumption rate can be arbitrarily optimized. Here, step S85a shown in FIG. 30 can be replaced by step S85 shown in FIG. 24.

In this way, in this thirteenth embodiment, the amount-of-work change coefficient P, which is an arbitrarily selected numerical value, is set as a value having an effect on the drivability of the vehicle or the life of the auxiliary to thereby increase a probability at which the evaluation formula calculation value becomes minus as the amount-of-work change coefficient P becomes larger. In this way, the amount of work of the auxiliary is decreased.

Here, as a modified example of the thirteenth embodiment, in order to inhibit an abrupt change in the discharge volume of the compressor and in the output (or torque) of the alternator 55, by using the amount-of-work change coefficient P of an arbitrarily selected numerical value, a limitation can be placed on the rate of change (inclined angle of the pattern) in the case where the discharge volume of the compressor or the output of the alternator 55 is increased to thereby correct the discharge volume of the compressor and the output of the alternator 55.

Fourteenth Embodiment

Next, a fourteenth embodiment will be described. Featured parts different from the embodiments described above will be described. In the embodiments described above has been shown the fact that as the evaluation formula calculation value becomes larger, the engine 4 can drive the auxiliary such as the compressor 1 more efficiently. Hence, the estimated fuel consumption/torque required for driving the auxiliary in each drive type or pattern may be estimated according to the acceleration state of the engine 4.

Figure 31:
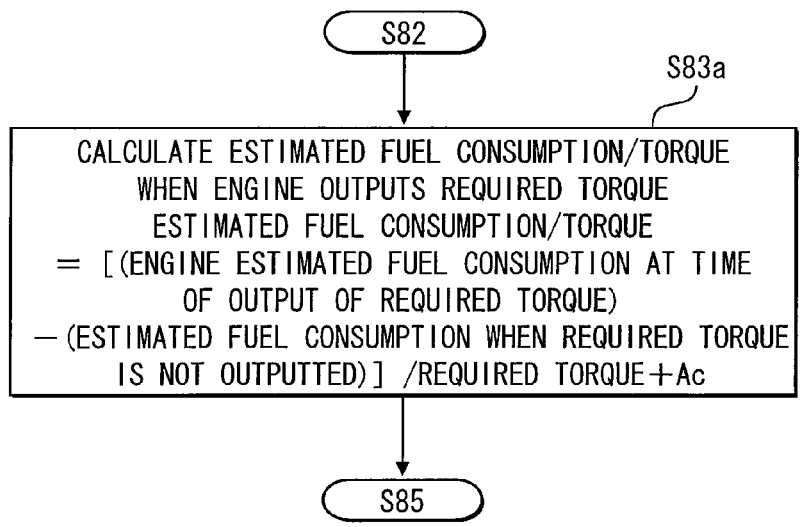
FIG. 31 is a portion of a flow chart to show a portion changed in FIG. 24 used in a fourteenth embodiment.

FIG. 31 shows the fourteenth embodiment and is a portion of a flow chart to show a portion in which the flow chart shown in FIG. 24 is changed. As shown in FIG. 31, a portion of the flow chart shown in FIG. 24 may be changed to construct a flow chart in which the more abrupt an acceleration is, the larger the estimated fuel consumption/torque is set.

Hereinafter, this will be further described. In the eighth embodiment, the estimated fuel consumption/torque relating to the difference between the estimated fuel consumption/torque when the required torque is outputted and the estimated fuel consumption/torque when the required torque is not outputted is found by the calculation using the characteristic map shown by the equi-fuel consumption/torque curve shown in FIG. 21. However, in the fourteenth embodiment, a value found by the calculation using the characteristic map shown by the equi-fuel consumption/torque curve shown in FIG. 21 is corrected to set the estimated fuel consumption/torque at a larger value. In order to set the estimated fuel consumption/torque at the larger value in this way, as shown in FIG. 31, an acceleration coefficient Ac is added to the estimated fuel consumption/torque. This acceleration coefficient Ac is set at a larger value as the acceleration becomes larger.

In this way, as the acceleration is more abrupt, the evaluation formula calculation value becomes larger and hence the evaluation formula calculation value becomes smaller. As a result, the chances when the engine power is not used for the auxiliary at the time of acceleration are increased, which makes it possible to ensure acceleration characteristics arbitrarily and at the same time to reduce the fuel consumption.

Fifteenth Embodiment

Next, a fifteenth embodiment will be described. Featured parts different from the embodiments described above will be described. In the fifteenth embodiment, torque is distributed to at least one or all of the plurality of auxiliaries on the basis of prediction information of predicting the state of the engine 4 in a given period in the future. In the eighth embodiment, the drive type estimation part 52 of the air conditioning control device 5 (FIG. 19) estimates the plurality of drive types or patterns capable of driving the compressor 1 on the basis of the state of the vehicular air conditioner 15 (set temperature Tset, outside air temperature Tam, discharge volume of compressor, and gas flow rate). In this case, the drive type is determined from the information at the present time. However, the drive type can be estimated also from the information of predicting the traveling state in a given period in the future.

Figure 32:
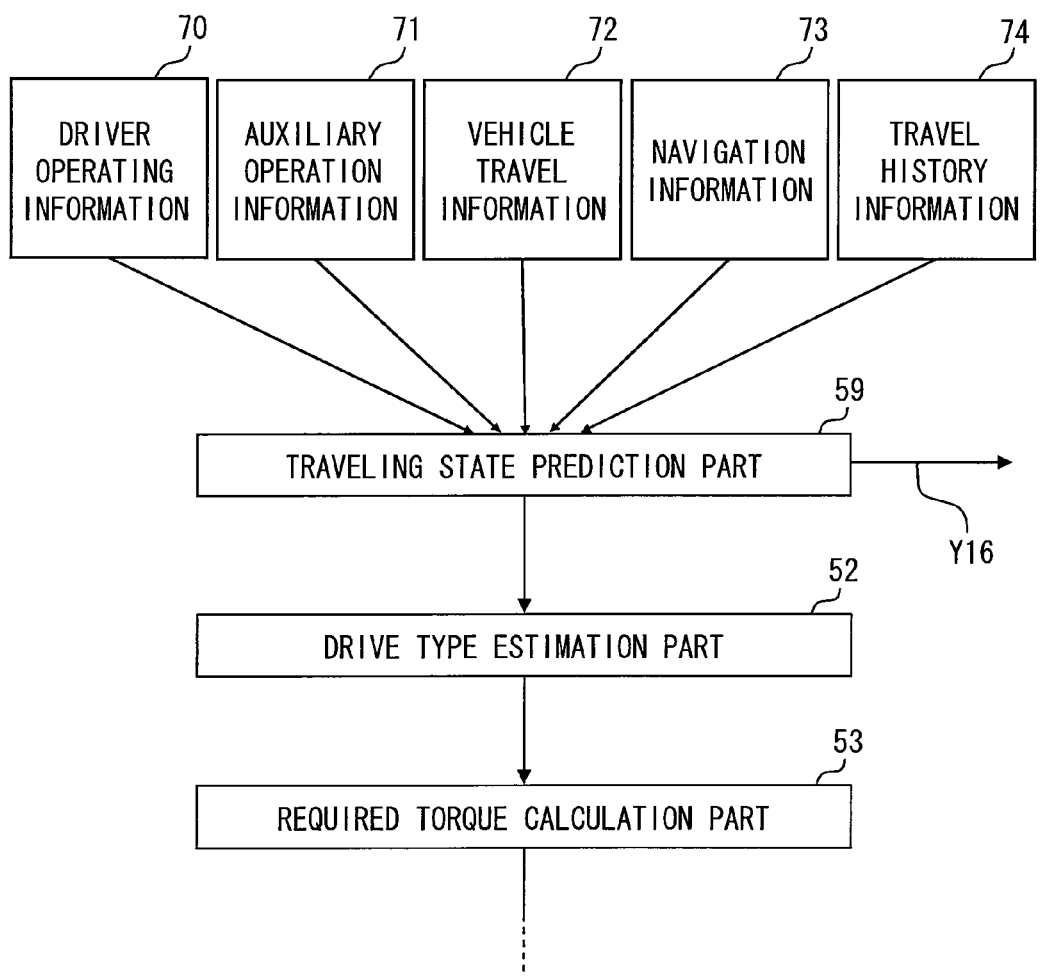
FIG. 32 is a portion of a flow chart to show a portion changed in FIG. 19 used in a fifteenth embodiment.

FIG. 32 shows the fifteenth embodiment and is a part of a block diagram to show a portion in which FIG. 19 is changed.

In this case, as shown in FIG. 32, the drive type estimation part 52 has a signal inputted thereto from the traveling state prediction part 59.

To the traveling state prediction part 59 is inputted prediction information including driver operating information 70, auxiliary operation information 71, vehicle travel information 72, navigation information 73, and travel history information 74. The drive type estimation part 52 has travel prediction information inputted thereto from the traveling state prediction part 59 on the basis of the prediction information described above, the travel prediction information relating to the engine rotation speed and the engine output torque at a predicted time.

Of the information, the driver operating information 70 is, for example, information relating to the amount of depression of the accelerator pedal or the brake pedal. The auxiliary operation information 71 is, for example, information showing the magnitude of an output current of the alternator 55.

Further, the vehicle travel information 72 is, for example, information such as a present vehicle speed of the vehicle. The navigation information 73 is road information including a speed limit, a traffic jam, the length and gradient of the slope of the road on which the vehicle runs. The travel history information 74 is travel information such as a probability of 80% at which a vehicle running for a company can park in a company's parking lot located 1000 meters ahead.

In this way, the traveling state prediction part 59 predicts a traveling state relating to the engine rotation speed and the engine output torque at a predetermined predicted time in the future on the basis of the travel prediction information. This predicted traveling state may include not only the vehicle speed greatly relating to the fuel consumption rate of the engine 4 but also a traveling load by a snowy road or the like and a shift position information of an automatic transmission (also referred to as T/M information). Here, depending on the T/M information, the engine output torque can be changed even if the vehicle speed and the acceleration or the deceleration are the same, so that the T/M information is significant as the travel prediction information.

The drive type estimation part 52 shown in FIG. 19 estimates the plurality of drive types on the basis of the information from the traveling state prediction part 59. In this way, for example, in the case where the vehicle is due to climb up a slope, the drive type estimation part 52 estimates a drive type in which the discharge volume of the compressor is not large. Further, when the efficiency of the engine 4 or the efficiency of the auxiliary is predicted to be better, the drive type estimation part 52 estimates a drive type in which the amount of work of the auxiliary is increased. Here, the prediction information from the traveling state prediction part 59 is transmitted also to the alternator 55 of the second auxiliary as shown by an arrow Y16.

Modifications to the eighth to fifteenth embodiments will be described below. The present is not limited only to the embodiments described above but can be modified or expanded in the following manner. When the required fuel consumption/heat (L/Q) is found, by excluding the required fuel consumption/heat greatly separated from the required fuel consumption/heat in the past, a control reflecting a history in the past can be performed.

Further, in the eighth embodiment is used the compressor 1 of a variable displacement type. However, of course, the present disclosure can be applied also to the drive control of a compressor of the type in which the compressor 1 is coupled to the engine 4 via a clutch and in which the rotation of the engine 4 is intermittently transmitted to the compressor 1 via the clutch. In this case, the increasing of the period of time in which the clutch is on with respect to the total period of time in which the clutch is on and off leads to the increasing of the amount of work of the compressor 1 as is the case in which the discharge volume of the compressor 1 of the variable displacement type is increased.

Here, in step S85a shown in FIG. 30, the amount-of-work change coefficient P is subtracted from the evaluation formula calculation value. There has been described the following: that is, in this way, the evaluation formula calculation value is more likely to become minus and hence the auxiliary is more likely to be not driven as required, which can increase a tendency to use the torque of the engine 4 for the travel and hence can perform the control of placing an emphasis on the traveling performance.

However, on the contrary, it is also recommended that the amount-of-work change coefficient P is added to the evaluation formula calculation value to thereby increase a tendency in which the evaluation formula calculation value does not become minus, thereby increasing a tendency in which the auxiliary is driven as required. According to this, the driving of the vehicle can be switched from a drive type in which an emphasis is placed on the traveling performance to a drive type in which an emphasis is placed on the performance of the auxiliary, for example, the comfort of the air conditioning and the protection of the battery when the voltage of the battery is lowered.

Further, in place of subtracting the amount-of-work change coefficient P from the evaluation formula calculation values of all drive types as shown in FIG. 30 to thereby uniformly correct the evaluation formula calculation values of all drive types, by subtracting the amount-of-work change coefficient P only from the evaluation formula calculation value of a specific drive type, a tendency in which the specific drive type is not selected can also be strengthened. In this way, when the auxiliary is heated, the upper limit of the output of the auxiliary can also be limited.

Still further conversely, by adding the amount-of-work change coefficient P to the evaluation formula calculation value of only a specific drive type to thereby increase the evaluation formula calculation value of the specific drive type, a tendency in which the specific drive type is selected can also be strengthened. Further, by adding or subtracting the same amount-of-work change coefficient P to or from the evaluation formula evaluation value shown by the mathematical formula 18 relating to the ninth embodiment, the same advantage can be produced.

In addition, in the embodiment described above, the information used for selecting the drive type of the auxiliary does not depend on a specific auxiliary and the number of the auxiliaries, so that a first auxiliary may be a generator and a second auxiliary may be a compressor and a third auxiliary may be a water pump.

Further, in the embodiment described above, the output of the engine is expressed by the torque, but power (Pc) of the output can be converted into torque (Tc) by (Pc=2π×n×Tc/60), so that the output of the engine may be expressed by the power. Here, the unit of Pc is W and the unit of Tc is N·m and n is the number of revolutions whose unit is rpm.

Still further, in the embodiment described above, the drive type is selected in which the evaluation formula calculation value of the evaluation formula shown by S85 in FIG. 24 and by S85a in FIG. 30 becomes maximum. However, a method of selecting the drive type is not limited to the method described above. For example, a method of selecting a drive type in which the estimated fuel consumption/torque is low may be employed as an easier selection method.

(Operations and Effects of the Eighth to Fifteenth Embodiments)

In order to achieve the object of the present disclosure, the embodiments described above employs the following technical means. That is, firstly, each of the embodiments described above is a vehicle control system including the engine control device 38 for controlling the engine 4, a first auxiliary control means 5 for controlling a first auxiliary driven by the engine 4, and a second auxiliary control means 55c for controlling a second auxiliary driven by the engine 4. The vehicle control system includes: a reception means 61 for receiving the required torque for driving the first auxiliary 1 from the first auxiliary control means 5 and for receiving the required torque for driving the second auxiliary 55 from the second auxiliary control means 55c; a selection means 63, 64 for selecting a drive torque for driving the first and second auxiliaries on the basis of the required torque that is received; and a drive means 66, S87 for driving the first and second auxiliaries on the basis of the selected drive torque.

According to this, it is possible to receive the required torque relating to the plurality of auxiliaries and of the same dimension and to easily distribute the drive torques for driving the respective auxiliaries. That is, the drive required torque can be easily arbitrated or cooperated between the auxiliaries.

Secondly, the required torque include a plurality of kinds of required torques and the selection means 63, 64 includes an estimated fuel consumption/torque calculation means 63, S83 for estimating an estimated fuel consumption/torque required for driving the engine by the required torque that is received from the characteristic of the engine and selects the drive torque on the basis of the estimated fuel consumption/torque that is calculated.

According to this, it is possible to select the drive torque in which the fuel consumption/torque is excellent in order to calculate the fuel consumption/torque necessary for producing the respective required torques.

Thirdly, the selection means 63, 64 selects the drive torques to be distributed to the respective auxiliaries for the respective auxiliaries on the basis of the evaluation formula which is formed of the estimated fuel consumption/torque estimated by the estimated fuel consumption/torque calculation means S83, the required torque, and the engine required fuel consumption/torque to express the fuel consumption/torque that is a reference of the respective auxiliaries and which forms an evaluation reference.

According to this, the estimated fuel consumption/torque required for producing the required torque is estimated from the characteristics of the engine, and a single drive type to be distributed to the respective auxiliaries is selected for each of the auxiliaries on the basis of the evaluation formula formed of the estimated fuel consumption/torque, the required torque, and the engine required fuel consumption/torque to express the fuel consumption/torque that is the reference of the respective auxiliaries, so that the respective auxiliaries can be driven in the single drive type capable of most saving the fuel consumption for each of the auxiliaries.

Fourthly, the reception means 61 receives a plurality of first requests, each of which is formed of a set of a required torque for driving the first auxiliary 1 and an engine required fuel consumption/torque to express an estimated fuel consumption per unit torque, from the first auxiliary control means 5 and receives a plurality of second requests, each of which is formed of a set of a required torque for driving the second auxiliary 55 and an engine required fuel consumption/torque to express an estimated fuel consumption per unit torque, from the second auxiliary control means 55c; the selection means 63, 64 has a plurality of drive types to show a drive torque for driving the first and second auxiliaries and includes the estimated fuel consumption/torque calculation means 63, S83 and an evaluation formula calculation means S85, the estimated fuel consumption/torque calculation means 63, S83 finding an estimated fuel consumption/torque, which relates to the difference between a fuel consumption in the case where the respective required torques of the first request and the second request are accepted and the engine 4 is driven and a fuel consumption in the case where the respective required torques are not accepted and the engine 4 is driven, for each of the drive types, the evaluation formula calculation means S85 calculating an evaluation formula forming an evaluation reference relating to an amount of fuel saved for each drive type from the engine required fuel consumption/torque for each of the auxiliaries and from the estimated fuel consumption/torque for each of the auxiliaries to thereby find an evaluation formula calculation value; and the drive means 66, S87 drives the first auxiliary 1 and the second auxiliary 55 on the basis of the drive type selected by the selection means 63, 64 on the basis of the evaluation formula calculation value.

According to this, the estimated fuel consumption/torque relating to the difference between the fuel consumption in the case where the respective required torques of the first request and the second request are accepted and the engine 4 is driven and the fuel consumption in the case where the respective required torques are not accepted and the engine 4 is driven is found for each of the drive types, and an evaluation relating to the amount of fuel saved for each of the drive types is made from the engine required fuel consumption/torque and the estimated fuel consumption/torque, so that the drive type capable of saving the fuel of the engine can be easily found.

Fifthly, the evaluation formula is calculated for each of the auxiliaries, and the evaluation formula is formed of a formula of multiplying a value acquired by subtracting the estimated fuel consumption/torque from the engine required fuel consumption/torque by the required torque, and a drive type in which the calculation value of the evaluation formula becomes maximum is selected for each of the auxiliaries, and the respective auxiliaries are driven according to the selected drive type.

According to this, when the estimated fuel consumption/torque is low and hence the fuel consumption required for outputting the required torque is small, a request of using a lot of torque of the engine can be preferentially satisfied to achieve a high effect of fuel consumption.

Sixthly, an output type expressing a group of required torques that is a set of required torques to be outputted to each of all auxiliaries are calculated for each of all auxiliaries including the first auxiliary and the second auxiliary; the evaluation formula is formed of a formula described below for each output type, the formula subtracting a value acquired by multiplying the estimated fuel consumption/torque of all auxiliaries by the sum of the required torques of the respective auxiliaries from the sum of values each of which is acquired by multiplying the engine required fuel consumption/torque of each auxiliary by the required torque of each auxiliary; an output type in which the evaluation formula calculation value becomes maximum is selected; and each of the auxiliaries is driven in a single drive type according to the selected output type.

According to this, the output type is calculated from the received drive type for each of all auxiliaries. The output type shows the required torque to be supplied to each of all auxiliaries. The evaluation formula is set for each of the output types. In addition, the output type in which the calculation value of the evaluation formula becomes maximum is selected. Hence, by exhaustively evaluating the requests from all auxiliaries, the output type in which a fuel consumption reduction effect is high can be selected and hence the respective auxiliaries can be efficiently driven in a single drive type specified in this output type. Further, the evaluation formula is formed of a formula described below for each output type, the formula subtracting a value acquired by multiplying the estimated fuel consumption/torque of all auxiliaries by the sum of the required torques of the respective auxiliaries from the sum of values each of which is acquired by multiplying the engine required fuel consumption/torque of each auxiliary by the required torque of each auxiliary. Hence, when the fuel consumption required for outputting the sum of the required torques is small, that is, the estimated fuel consumption/torque when all auxiliaries are driven is low, an output type in which a lot of torque of the engine is used can be preferentially selected.

Seventhly, each of the embodiments described above includes a means for estimating a drive type for driving the first auxiliary 1 or for estimating a drive type for driving the second auxiliary 55. This drive type is found on the basis of prediction information from a traveling state prediction means 59 for predicting at least the acceleration and deceleration of the engine 4, and the required torques of the first and second auxiliaries are calculated from the drive type that is found.

According to this, the drive type of driving the auxiliary is found by predicting at least the acceleration and deceleration of the engine, so that a prediction control of predicting the state of the engine in the future and determining the distribution of the torque to the auxiliaries can be performed. Hence, by reducing the difference between the estimated fuel consumption and an actual fuel consumption, the auxiliary can be driven in the drive type in which the fuel consumption is further reduced.

Eighthly, the amount-of-work change factor P is added to or subtracted from the evaluation formula to thereby operate a tendency in which the evaluation formula calculation value becomes plus or minus.

According to this, the amount-of-work change factor P is added to or subtracted from the evaluation formula to thereby operate a tendency in which the evaluation formula calculation value becomes plus or minus, so that it is possible to freely set the selection between a control mode of placing an emphasis on the traveling performance of the vehicle and a control mode of placing an emphasis on the performance of the auxiliary.

Here, the auxiliary required fuel consumption in the present disclosure is a concept including a required fuel consumption/heat in the case where the compressor of the vehicular air conditioner is an auxiliary and a required fuel consumption/electricity generated in the case where the alternator is an auxiliary and is different from the engine required fuel consumption/torque.

To sum up, the vehicle control system of the above embodiments can be described as follows.

A vehicle control system for a vehicle, includes an engine control device 38 adapted to control an engine 4, an auxiliary control device 5, 55c adapted to control an auxiliary 1, 55 driven by power of the engine 4, a means 52, S53, 56R, 92 provided for at least one of the engine control device 38 and the auxiliary control device 5, 55c, for estimating a plurality of drive patterns for controlling the auxiliary 1, 55, a fuel consumption rate relating value calculation means 56, 56R, S83, S53a, S83a, 63, and a selection means 57, 57R, 63, 64, 93, 94. The fuel consumption rate relating value calculation means 56, 56R, S83, S53a, S83a, 63 is provided for the engine control device 38, for calculating fuel consumption rate relating values (e.g., estimated fuel consumption/toque) of the engine 4 required to drive the auxiliary 1, 55 by the engine 4 according to the respective estimated plurality of drive patterns by use of characteristic data (ECD) of the engine 4. The selection means 57, 57R, 63, 64, 93, 94 is provided for the engine control device 38, for selecting a single drive pattern for driving the auxiliary 1, 55 based on the estimated plurality of drive patterns by use of the calculated fuel consumption rate relating values.

Accordingly, by calculating the drive pattern by using the fuel consumption rate relating value (for example, the estimated fuel consumption/toque) of the engine as an index, the fuel consumption/torque in a single auxiliary can be optimized so as to control the auxiliary driven by the power of the engine, and a cooperative control between the auxiliaries for producing an effect of further saving an fuel consumption/torque and a cooperation with the performance of acceleration or the like can be easily realized.

The auxiliary control device 5, 55c may include a reference value setting means 54, S74 for setting reference values (e.g., engine required fuel consumption/torque) associated with the fuel consumption rate relating values of the engine 4. The selection means 57, 63, 64 may select the single drive pattern for driving the auxiliary 55 by use of the fuel consumption rate relating values and the reference values.

Accordingly, by setting a reference value (for example, engine required fuel consumption/torque) of evaluating the drive pattern in which the fuel consumption for driving the auxiliary becomes minimum, an optimum drive pattern can be calculated by a simple method.

The reference value setting means 54, S74 may set the reference values by use of an amount of storage of energy (e.g., cooling storage amount) outputted by the auxiliary 1, 55 and a past vehicle state (e.g., past required fuel consumption/heat) associated with use of the energy outputted by the auxiliary 1, 55 or an environment condition (e.g., outside air temperature) associated with the use of the energy outputted by the auxiliary 1, 55.

Accordingly, by reflecting the amount of storage of energy, the past vehicle state relating to the use of energy outputted by the auxiliary, and the environment condition relating to the use of energy outputted by the auxiliary to the calculation of an optimum drive pattern, the fuel consumption can be minimized and at the same time a comfortable driving can be achieved.

The auxiliary control device 5, 55c may include an auxiliary required fuel consumption/torque calculation means 51, 51R for calculating an auxiliary required fuel consumption that expresses a fuel consumption per unit energy required to generate the energy outputted by the auxiliary 1, 55 based on the amount of storage of energy outputted by the auxiliary 1, 55 and the past vehicle state or the environment condition. The reference value setting means 54, S74 may set the reference values of the engine 4 in a case where the auxiliary 1, 55 is driven respectively in the estimated plurality of drive patterns by use of the calculated auxiliary required fuel consumption and characteristics of the auxiliary 1, 55.

Accordingly, by reflecting the characteristics of the auxiliary to the reference value, the fuel consumption can be minimized with high accuracy.

The engine control device 38 may include a necessary energy estimation means S55 for estimating necessary amounts of energy that are necessary for the engine 4 to drive the auxiliary 1, 55 in the estimated plurality of drive patterns. When any one of the fuel consumption rate relating values is smaller than its corresponding one of the reference values as a result of comparison between the reference values and their corresponding fuel consumption rate relating values, the selection means 57 may select one of the plurality of drive patterns that involves a maximum value of the necessary amounts of energy estimated by the necessary energy estimation means S55.

Accordingly, in the case where the fuel consumption rate relating value (for example, estimated fuel consumption/torque) is smaller than the reference value (for example, engine required fuel consumption/torque), by driving the auxiliary to the maximum extent, an amount of fuel saved with respect to the reference value can be increased and hence an effect of saving a fuel consumption can be improved.

The selection means 57 may include: a means S55, S85 for obtaining an evaluation formula calculation value for each of the plurality of drive patterns by multiplying a value obtained by subtraction of a corresponding one of the fuel consumption rate relating values from a corresponding one of the reference values by a function value (e.g., required torque) for a corresponding one of the necessary amounts of energy that is necessary for the engine 4; and a means S56, S86 for selecting one of the plurality of drive patterns having the maximum evaluation formula calculation value and for making the selected one of the plurality of drive patterns the single drive pattern for driving the auxiliary 1, 55.

Accordingly, by calculating an amount of fuel saved when an estimated amount of energy (for example, estimated fuel consumption/torque) required by the engine 4 is smaller than the fuel consumption rate relating value (for example, engine required fuel consumption/torque) by the use of the function value of the necessary amount of energy in the engine 4, the single drive pattern in which the amount of fuel saved correctly becomes maximum can be calculated.

When the vehicle is accelerated by the engine 4, the fuel consumption rate relating value calculation means S53a, S83a for calculating the fuel consumption rate relating values may correct the fuel consumption rate relating values, such that the evaluation formula calculation value for each of the plurality of drive patterns in which the necessary amounts of energy are larger becomes smaller.

Accordingly, the fuel consumption rate relating value (for example, estimated fuel consumption/torque) is corrected in such a way as to impair the evaluation result of the drive pattern in which a necessary amount of energy becomes large in the case where the vehicle is accelerated by the engine, so that the trade-off between an improvement in the output performance of the auxiliary by driving the auxiliary under good condition and an improvement in the power performance of the engine relating to the traveling performance of the vehicle can be easily adjusted.

The vehicle control system may further include a prediction means 59 for predicting a state of the engine 4 including a future acceleration/deceleration state of the engine 4. The selection means 57, 57R, 63, 64 may select the single drive pattern for driving the auxiliary 1, 55 based on the predicted state of the engine 4.

Accordingly, the state of the engine in the future is predicted and the plurality of drive patterns are estimated from the predicted state of the engine, so that the auxiliary can be driven in the drive pattern matching the state of the engine in the future.

The auxiliary 1, 55 may include a first auxiliary 1 driven by the power of the engine 4 and a second auxiliary 55 driven by the power of the engine 4. The auxiliary control device 5, 55c may include a first auxiliary control means 5 for controlling the first auxiliary 1 and a second auxiliary control means 55c for controlling the second auxiliary 55. The selection means 63, 64, 93, 94 may respectively select the single drive pattern for driving the first auxiliary 1 and the single drive pattern for driving the second auxiliary 55 based on the plurality of drive patterns estimated respectively for the first auxiliary control means 5 and the second auxiliary control means 55c.

Accordingly, the drive required torque can be easily adjusted or cooperated between the auxiliaries so as to minimize the fuel consumption for driving the auxiliaries.

The engine control device 38 may include a reception means 61 for receiving function values for necessary amounts of energy that are necessary for the engine 4 to drive the first auxiliary 1 in the plurality of drive patterns from the first auxiliary control means 5 and for receiving function values for necessary amounts of energy that are necessary for the engine 4 to drive the second auxiliary 55 in the plurality of drive patterns from the second auxiliary control means 55c. The reception means 61 may receive: a first request that includes a plurality of sets of the function values for necessary amounts of energy to drive the first auxiliary 1 and reference values (e.g., engine required fuel consumption/torque) per unit function value associated with the fuel consumption rate relating values, from the first auxiliary control means 5; and a second request that includes a plurality of sets of the function values for necessary amounts of energy to drive the second auxiliary 55 and the reference values per unit function value, from the second auxiliary control means 55c. The selection means 63, 64 may have a plurality of drive types that indicate drive torques for driving the first auxiliary 1 and the second auxiliary 55, and may include: an estimated fuel consumption/torque calculation means 63, S83 for obtaining, for each of the plurality of drive types, a corresponding one of the fuel consumption rate relating values that relates to a difference between a fuel consumption of the engine 4 when the engine 4 is driven upon reception of a corresponding one of the function values for necessary amounts of energy of the first request and the second request, and a fuel consumption of the engine 4 when the engine 4 is driven without reception of the corresponding one of the function values for necessary amounts of energy; and an evaluation formula calculation means S85 for obtaining an evaluation formula calculation value by calculating an evaluation formula, which serves as an evaluation reference that relates to an amount of fuel saved for each of the plurality of drive types based on the reference values and the fuel consumption rate relating values respectively for the first auxiliary 1 and the second auxiliary 55. The engine control device 38 may include a drive means 66, S87 for driving the first auxiliary 1 and the second auxiliary 55 based on one of the plurality of drive types, which is selected by the selection means 63, 64 based on the evaluation formula calculation value for each of the plurality of drive types.

Accordingly, the fuel consumption rate relating value (for example, estimated fuel consumption/torque), which relates to the difference between the fuel consumption in the case where the function values (for example, required torque) of the necessary amount of energy of the first request and the second request are accepted and the engine 4 is driven and the fuel consumption in the case where the function values (for example, required torque) of the necessary amount of energy of the first request and the second request are not accepted and the engine 4 is driven, is found for each of the drive types, and an evaluation relating to the amount of fuel saved for each of the drive types is made from the reference value (for example, engine required torque) and the fuel consumption rate relating value (for example, estimated fuel consumption/torque), so that the drive type capable of saving the fuel of the engine can be easily found.

The engine control device 38 may include a reception means 61 for receiving function values for necessary amounts of energy that are necessary for the engine 4 to drive the first auxiliary 1 in the plurality of drive patterns from the first auxiliary control means 5 and for receiving function values for necessary amounts of energy that are necessary for the engine 4 to drive the second auxiliary 55 in the plurality of drive patterns from the second auxiliary control means 55c. The selection means 63, 64 may select drive torques for driving the first auxiliary 1 and the second auxiliary 55 based on the received function values for necessary amounts of energy. The engine control device 38 may include a drive means 66, S87 for driving the first auxiliary 1 and the second auxiliary 55 based on the selected drive torques. The fuel consumption rate relating value calculation means 63, S83 may estimate the fuel consumption rate relating values required to drive the engine 4 based on the received function values for necessary amounts of energy by use of characteristics of the engine 4. The selection means 63, 64 may select the drive torques based on the estimated fuel consumption rate relating values. The selection means 63, 64 may select the drive torques distributed to the first auxiliary 1 and the second auxiliary 55 based on evaluation formulas, which serves as evaluation references and includes the fuel consumption rate relating values estimated by the fuel consumption rate relating value calculation means S83, the function values for necessary amounts of energy, and reference values (e.g., engine required fuel consumption/torque) associated with the fuel consumption rate relating values that express reference fuel consumption/torques of the first auxiliary 1 and the second auxiliary 55. The evaluation formulas may be calculated respectively for the first auxiliary 1 and the second auxiliary 55. Each of the evaluation formulas may be obtained by multiplying a value obtained by subtraction of a corresponding one of the fuel consumption rate relating values from a corresponding one of the reference values by a corresponding one of the function values for the necessary amounts of energy. The selection means 63, 64 may select one of a plurality of drive types indicating the drive torques for driving the first auxiliary 1 and the second auxiliary 55 that has a maximum one of the calculated evaluation formulas, for each of the first auxiliary 1 and the second auxiliary 55. The engine 4 may drive each of the first auxiliary 1 and the second auxiliary 55 in accordance with the selected one of the plurality of drive types.

Accordingly, when the fuel consumption rate relating value (for example, estimated fuel consumption/torque) is low and hence the fuel consumption required for outputting the function value of the necessary amount of energy (for example, required torque) is small, a request using a lot of torque of the engine can be preferentially satisfied and hence an effect of greatly saving the fuel consumption can be produced.

The auxiliary 1, 55 may be one of a plurality of auxiliaries 1, 55. The engine control device 38 may include a means 92 for calculating a plurality of output types each of which expresses a necessary energy amount function value group (e.g., group of required torques) which is a combination of function values for necessary amounts of energy that are capable of being outputted respectively to all of the plurality of auxiliaries 1, 55 including the first auxiliary 1 and the second auxiliary 55. The engine control device 38 may include a means 93 for calculating, for each of the plurality of output types, an evaluation formula calculation value which is a result of subtraction of a value obtained by multiplying a corresponding one of the fuel consumption rate relating values for the all of the plurality of auxiliaries 1, 55 by a sum of the function values for necessary amounts of energy for the plurality of auxiliaries 1, 55, from a sum of values that are obtained by multiplying reference values (e.g., engine required fuel consumption/torque) for the plurality of auxiliaries 1, 55 associated with the fuel consumption rate relating values by the their corresponding function values for necessary amounts of energy for the plurality of auxiliaries 1, 55. The engine control device 38 may include a means 94, 95 for selecting one of the plurality of output types having the maximum evaluation formula calculation value and for driving respectively the plurality of auxiliaries 1, 55 in one of a plurality of drive types that indicate drive torques for driving the plurality of auxiliaries 1, 55 in accordance with the selected one of the plurality of output types.

Accordingly, the output type is calculated from the received drive type for each of the auxiliaries. The output type shows the function value (for example, required torque) of the necessary amount of energy to be supplied to each of the auxiliaries and the evaluation formula is set for each of the output types. In addition, the output type in which the calculation value of the evaluation formula becomes maximum is selected, so that by exhaustively evaluating the requests from all auxiliaries, the output type of producing a large effect of reducing the fuel consumption can be selected and hence the respective auxiliaries can be efficiently driven in the single drive type specified in this output type. Further, the evaluation formula is formed of a formula for each of the output types, the formula subtracting the value acquired by multiplying the estimated fuel consumption/torque of all auxiliaries by the sum of the function value of the necessary amount of energy (for example, required torque) of each of the auxiliaries from the sum of values acquired by multiplying the reference value (for example, engine required fuel consumption/torque) of each of the auxiliaries by the function value of the necessary amount of energy of each of the auxiliaries. Hence, when the fuel consumption required for outputting the sum of the function value of the necessary amount of energy (for example, required torque), that is, when the fuel consumption rate relating value (for example, estimated fuel consumption/torque) at the time of driving all auxiliaries is low, the output type of using a lot of toque of the engine can be preferentially selected.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. A vehicle control system for a vehicle, comprising:
    an engine control device that is adapted to control an engine;
    an auxiliary control device that is adapted to control an auxiliary driven by power of the engine;
    a means that is provided for at least one of the engine control device and the auxiliary control device, for estimating a plurality of drive patterns for controlling the auxiliary;
    a fuel consumption rate relating value calculation means that is provided for the engine control device, for calculating fuel consumption rate relating values of the engine required to drive the auxiliary by the engine according to the respective estimated plurality of drive patterns by use of characteristic data (ECD) of the engine; and a selection means that is provided for the engine control device, for selecting a single drive pattern for driving the auxiliary based on the estimated plurality of drive patterns by use of the calculated fuel consumption rate relating values, wherein each of the estimated plurality of drive patterns defines both a drive amount and a drive timing.

2. The vehicle control system according to claim 1, wherein:
the auxiliary control device includes a reference value setting means for setting reference values associated with the fuel consumption rate relating values of the engine; and
the selection means selects the single drive pattern for driving the auxiliary by use of the fuel consumption rate relating values and the reference values.

3. The vehicle control system according to claim 2, wherein the reference value setting means sets the reference values by use of an amount of storage of energy outputted by the auxiliary and a past vehicle state associated with use of the energy outputted by the auxiliary or an environment condition associated with the use of the energy outputted by the auxiliary.

4. The vehicle control system according to claim 3, wherein:
the auxiliary control device includes an auxiliary required fuel consumption/torque calculation means for calculating an auxiliary required fuel consumption that expresses a fuel consumption per unit energy required to generate the energy outputted by the auxiliary based on the amount of storage of energy outputted by the auxiliary and the past vehicle state or the environment condition; and
the reference value setting means sets the reference values of the engine in a case where the auxiliary is driven respectively in the estimated plurality of drive patterns by use of the calculated auxiliary required fuel consumption and characteristics of the auxiliary.

5. The vehicle control system according to claim 2, wherein:
the engine control device includes a necessary energy estimation means for estimating necessary amounts of energy that are necessary for the engine to drive the auxiliary in the estimated plurality of drive patterns; and
when any one of the fuel consumption rate relating values is smaller than its corresponding one of the reference values as a result of comparison between the reference values and their corresponding fuel consumption rate relating values, the selection means selects one of the plurality of drive patterns that involves a maximum value of the necessary amounts of energy estimated by the necessary energy estimation means.

6. The vehicle control system according to claim 5, wherein the selection means includes:
a means for obtaining an evaluation formula calculation value for each of the plurality of drive patterns by multiplying a value obtained by subtraction of a corresponding one of the fuel consumption rate relating values from a corresponding one of the reference values by a function value for a corresponding one of the necessary amounts of energy that is necessary for the engine; and
a means for selecting one of the plurality of drive patterns having the maximum evaluation formula calculation value and for making the selected one of the plurality of drive patterns the single drive pattern for driving the auxiliary.

7. The vehicle control system according to claim 1, wherein when the vehicle is accelerated by the engine, the fuel consumption rate relating value calculation means for calculating the fuel consumption rate relating values corrects the fuel consumption rate relating values, such that the evaluation formula calculation value for each of the plurality of drive patterns in which the necessary amounts of energy are larger becomes smaller.

8. The vehicle control system according to claim 1, further comprising a prediction means for predicting a state of the engine including a future acceleration/deceleration state of the engine, wherein the selection means selects the single drive pattern for driving the auxiliary based on the predicted state of the engine.

9. The vehicle control system according to claim 1, wherein:
the auxiliary includes a first auxiliary driven by the power of the engine and a second auxiliary driven by the power of the engine;
the auxiliary control device includes a first auxiliary control means for controlling the first auxiliary and a second auxiliary control means for controlling the second auxiliary; and
the selection means respectively selects the single drive pattern for driving the first auxiliary and the single drive pattern for driving the second auxiliary based on the plurality of drive patterns estimated respectively for the first auxiliary control means and the second auxiliary control means.

10. The vehicle control system according to claim 9, wherein:
the engine control device includes a reception means for receiving function values for necessary amounts of energy that are necessary for the engine to drive the first auxiliary in the plurality of drive patterns from the first auxiliary control means and for receiving function values for necessary amounts of energy that are necessary for the engine to drive the second auxiliary in the plurality of drive patterns from the second auxiliary control means;
the reception means receives:
a first request that includes a plurality of sets of the function values for necessary amounts of energy to drive the first auxiliary and reference values per unit function value associated with the fuel consumption rate relating values, from the first auxiliary control means; and
a second request that includes a plurality of sets of the function values for necessary amounts of energy to drive the second auxiliary and the reference values per unit function value, from the second auxiliary control means;
the selection means has a plurality of drive types that indicate drive torques for driving the first auxiliary and the second auxiliary, and includes:
an estimated fuel consumption/torque calculation means for obtaining, for each of the plurality of drive types, a corresponding one of the fuel consumption rate relating values that relates to a difference between a fuel consumption of the engine when the engine is driven upon reception of a corresponding one of the function values for necessary amounts of energy of the first request and the second request, and a fuel consumption of the engine when the engine is driven without reception of the corresponding one of the function values for necessary amounts of energy;
and an evaluation formula calculation means for obtaining an evaluation formula calculation value by calculating an evaluation formula, which serves as an evaluation reference that relates to an amount of fuel saved for each of the plurality of drive types based on the reference values and the fuel consumption rate relating values respectively for the first auxiliary and the second auxiliary; and the engine control device includes a drive means for driving the first auxiliary and the second auxiliary based on one of the plurality of drive types, which is selected by the selection means based on the evaluation formula calculation value for each of the plurality of drive types.

11. The vehicle control system according to claim 9, wherein:

the engine control device includes a reception means for receiving function values for necessary amounts of energy that are necessary for the engine to drive the first auxiliary in the plurality of drive patterns from the first auxiliary control means and for receiving function values for necessary amounts of energy that are necessary for the engine to drive the second auxiliary in the plurality of drive patterns from the second auxiliary control means;

the selection means selects drive torques for driving the first auxiliary and the second auxiliary based on the received function values for necessary amounts of energy;

the engine control device includes a drive means for driving the first auxiliary and the second auxiliary based on the selected drive torques;

the fuel consumption rate relating value calculation means estimates the fuel consumption rate relating values required to drive the engine based on the received function values for necessary amounts of energy by use of characteristics of the engine;

the selection means selects the drive torques based on the estimated fuel consumption rate relating values;

the selection means selects the drive torques distributed to the first auxiliary and the second auxiliary based on evaluation formulas, which serves as evaluation references and includes the fuel consumption rate relating values estimated by the fuel consumption rate relating value calculation means, the function values for necessary amounts of energy, and reference values associated with the fuel consumption rate relating values that express reference fuel consumption/torques of the first auxiliary and the second auxiliary;

the evaluation formulas are calculated respectively for the first auxiliary and the second auxiliary; each of the evaluation formulas is obtained by multiplying a value obtained by subtraction of a corresponding one of the fuel consumption rate relating values from a corresponding one of the reference values by a corresponding one of the function values for the necessary amounts of energy;

the selection means selects one of a plurality of drive types indicating the drive torques for driving the first auxiliary and the second auxiliary that has a maximum one of the calculated evaluation formulas, for each of the first auxiliary and the second auxiliary; and the engine drives each of the first auxiliary and the second auxiliary in accordance with the selected one of the plurality of drive types.

12. The vehicle control system according to claim 9, wherein:

the auxiliary is one of a plurality of auxiliaries;

the engine control device includes a means for calculating a plurality of output types each of which expresses a necessary energy amount function value group which is a combination of function values for necessary amounts of energy that are capable of being outputted respectively to all of the plurality of auxiliaries including the first auxiliary and the second auxiliary;

the engine control device includes a means for calculating, for each of the plurality of output types, an evaluation formula calculation value which is a result of subtraction of a value obtained by multiplying a corresponding one of the fuel consumption rate relating values for the all of the plurality of auxiliaries by a sum of the function values for necessary amounts of energy for the plurality of auxiliaries, from a sum of values that are obtained by multiplying reference values for the plurality of auxiliaries associated with the fuel consumption rate relating values by the their corresponding function values for necessary amounts of energy for the plurality of auxiliaries; and the engine control device includes a means for selecting one of the plurality of output types having the maximum evaluation formula calculation value and for driving respectively the plurality of auxiliaries in one of a plurality of drive types that indicate drive torques for driving the plurality of auxiliaries in accordance with the selected one of the plurality of output types.

* * * * *